United States Patent
Nguyen et al.

(10) Patent No.: US 12,504,676 B2
(45) Date of Patent: **\*Dec. 23, 2025**

(54) MOUNTING SYSTEMS FOR IMAGE CAPTURE DEVICES

(71) Applicant: GoPro, Inc., San Mateo, CA (US)

(72) Inventors: Huy Phuong Nguyen, Alpine, UT (US); Bessy Liang, San Jose, CA (US); John George Muhlenkamp, IV, Mapleton, UT (US); Scott Alberstein, San Francisco, CA (US); Joshua T. Druker, Redwood City, CA (US); Daniel J. Coster, Oakura (NZ); Nicholas D. Woodman, Big Sky, MT (US); Jesse Patterson, Pacifica, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,753

(22) Filed: Mar. 1, 2024

(65) Prior Publication Data
US 2024/0201569 A1 Jun. 20, 2024

Related U.S. Application Data

(63) Continuation of application No. 17/470,774, filed on Sep. 9, 2021, now Pat. No. 11,953,808, which is a
(Continued)

(51) Int. Cl.
*G03B 17/56* (2021.01)
*F16M 11/06* (2006.01)
(Continued)

(52) U.S. Cl.
CPC .......... *G03B 17/561* (2013.01); *F16M 11/06* (2013.01); *F16M 11/16* (2013.01); *G03B 17/14* (2013.01)

(58) Field of Classification Search
CPC ............................................. G03B 15/56–563
See application file for complete search history.

(56) References Cited

U.S. PATENT DOCUMENTS

| D209,013 | S | 10/1967 | McElroy |
| 3,508,482 | A | 4/1970 | Taylor |

(Continued)

FOREIGN PATENT DOCUMENTS

| CN | 3009412 S | 5/1991 |
| CN | 3367593 | 5/2004 |

(Continued)

OTHER PUBLICATIONS

"Casting Process Design Manual" compiled by the Casting Teaching and Research Office of Hebei Institute of Technology, 1974, p. 140.
(Continued)

*Primary Examiner* — Leon W Rhodes, Jr.
(74) *Attorney, Agent, or Firm* — Young Basile Hanlon & MacFarlane, P.C.

(57) ABSTRACT

A mounting system for an image capture device that includes three pivotably connected arms is disclosed. The first arm includes a first fastener that is lockable and unlockable to allow for connection and disconnection of the image capture device, and a second fastener that is lockable and unlockable to regulate the position of the image capture device relative to the first arm. The mounting system further includes a third fastener that is lockable and unlockable to regulate the relative positioning between the first arm and the second arm, and a fourth fastener that is lockable and unlockable to regulate the relative positioning between the second arm and the third arm. Whereas the first fastener is removable, each of the second, third, and fourth fasteners is captive to (nonremovable from) the mounting system.

20 Claims, 22 Drawing Sheets

Related U.S. Application Data continuation-in-part of application No. 29/740,015, filed on Jun. 30, 2020, now Pat. No. Des. 982,065.

(60) Provisional application No. 63/164,292, filed on Mar. 22, 2021.

(51) Int. Cl.
  *F16M 11/16* (2006.01)
  *G03B 17/14* (2021.01)

(56) References Cited

U.S. PATENT DOCUMENTS

| | | | |
|---|---|---|---|
| 4,091,402 A | 5/1978 | Siegel | |
| 4,208,028 A | 6/1980 | Brown | |
| 4,545,660 A * | 10/1985 | Rudolf | F16M 13/04 |
| | | | 396/425 |
| 4,733,259 A | 3/1988 | Ng | |
| D349,717 S | 8/1994 | Akaike | |
| 5,384,609 A | 1/1995 | Ogawa | |
| 5,400,234 A | 3/1995 | Yu | |
| D366,887 S | 2/1996 | Wood | |
| D372,189 S | 7/1996 | Andis | |
| D373,947 S | 9/1996 | Parduhn | |
| D395,996 S | 7/1998 | Fischer | |
| D399,230 S | 10/1998 | Tenne | |
| 5,842,069 A | 11/1998 | Konno | |
| 5,887,375 A | 3/1999 | Watson | |
| 6,315,180 B1 | 11/2001 | Watkins | |
| D458,998 S | 6/2002 | Tolan | |
| 6,654,235 B2 | 11/2003 | Imsand | |
| D483,789 S | 12/2003 | Dordick | |
| D506,493 S | 6/2005 | Naito | |
| D515,613 S | 2/2006 | Holmes | |
| D532,436 S | 11/2006 | Kruse | |
| D533,578 S | 12/2006 | Oka | |
| 7,341,017 B2 | 3/2008 | Jackson | |
| D577,729 S | 9/2008 | Derry | |
| D577,731 S | 9/2008 | Altonji | |
| D582,559 S | 12/2008 | Khawaled | |
| 7,494,291 B2 | 2/2009 | Saxton | |
| 7,563,038 B2 * | 7/2009 | Hershenzon | G03B 17/561 |
| | | | 396/419 |
| D602,974 S | 10/2009 | Zen | |
| D616,286 S | 5/2010 | Foresman | |
| D631,081 S | 1/2011 | Richter | |
| D635,445 S | 4/2011 | Foresman | |
| 8,014,656 B2 | 9/2011 | Woodman | |
| D649,576 S | 11/2011 | Jannard | |
| 8,199,251 B2 | 6/2012 | Woodman | |
| 8,325,270 B2 | 12/2012 | Woodman | |
| D675,661 S | 2/2013 | Jannard | |
| D685,379 S | 7/2013 | Richter | |
| D697,570 S | 1/2014 | Samuels | |
| D704,486 S | 5/2014 | Cho | |
| D710,927 S | 8/2014 | Eynav | |
| D713,531 S | 9/2014 | Way | |
| D717,360 S | 11/2014 | Chun | |
| D719,266 S | 12/2014 | Goldstein | |
| D721,438 S | 1/2015 | Layzell | |
| D722,864 S | 2/2015 | Greenthal | |
| D722,865 S | 2/2015 | Greenthal | |
| D724,722 S | 3/2015 | Miyano | |
| 9,004,783 B1 | 4/2015 | Woodman | |
| 9,033,596 B2 | 5/2015 | Samuels | |
| D746,353 S | 12/2015 | Woodman | |
| 9,204,021 B2 | 12/2015 | Woodman | |
| D746,990 S | 1/2016 | Goldstein | |
| 9,316,346 B2 | 4/2016 | Lau | |
| D757,842 S | 5/2016 | Harrison | |
| D758,473 S | 6/2016 | Costa | |
| D759,147 S | 6/2016 | Harrison | |
| 9,369,614 B2 | 6/2016 | Woodman | |
| 9,383,630 B2 | 7/2016 | Russell | |
| 9,395,603 B2 | 7/2016 | Achenbach | |
| 9,423,673 B2 * | 8/2016 | Clearman | G03B 17/566 |
| 9,426,341 B1 | 8/2016 | Baldrige | |
| D768,755 S | 10/2016 | Thomas | |
| D776,745 S | 1/2017 | Bennett | |
| D776,746 S | 1/2017 | Bennett | |
| 9,554,639 B1 | 1/2017 | Harden | |
| D780,249 S | 2/2017 | Ramsthaler | |
| D780,827 S | 3/2017 | Costa | |
| 9,588,407 B1 | 3/2017 | Harrison | |
| 9,596,926 B1 | 3/2017 | Volmer | |
| D785,074 S | 4/2017 | Woodman | |
| 9,612,507 B2 | 4/2017 | Woodman | |
| D789,177 S | 6/2017 | Carnevali | |
| D789,178 S | 6/2017 | Carnevali | |
| D790,546 S | 6/2017 | Zhou | |
| 9,715,164 B2 | 7/2017 | Russell | |
| D795,326 S | 8/2017 | Martin | |
| D798,368 S | 9/2017 | Nakajima | |
| D798,369 S | 9/2017 | Nakajima | |
| D798,370 S | 9/2017 | Nakajima | |
| D800,204 S | 10/2017 | Harrison | |
| D800,205 S | 10/2017 | Harrison | |
| D800,822 S | 10/2017 | Costa | |
| 9,810,974 B2 | 11/2017 | Chi | |
| D806,780 S | 1/2018 | Martin | |
| D809,053 S | 1/2018 | Carnevali | |
| 9,904,148 B1 | 2/2018 | Druker | |
| D812,126 S | 3/2018 | Paterson | |
| D814,266 S | 4/2018 | Carnevali | |
| D814,549 S | 4/2018 | Carnevali | |
| D820,458 S | 6/2018 | Way | |
| D821,483 S | 6/2018 | Vitale | |
| D822,092 S | 7/2018 | Bergman | |
| 10,057,465 B2 | 8/2018 | Heine | |
| 10,066,786 B1 | 9/2018 | Cox | |
| D829,809 S | 10/2018 | Harrison | |
| D831,099 S | 10/2018 | Paterson | |
| 10,094,513 B2 | 10/2018 | Bennett | |
| D837,867 S | 1/2019 | Martin | |
| D841,721 S | 2/2019 | Muhlenkamp, IV | |
| D841,722 S | 2/2019 | Bergman | |
| D842,360 S | 3/2019 | Achenbach | |
| D852,872 S | 7/2019 | Fang | |
| D852,874 S | 7/2019 | Bergman | |
| D861,770 S | 10/2019 | Harrison | |
| D869,546 S | 12/2019 | Paterson | |
| D880,570 S | 4/2020 | Bergman | |
| D880,571 S | 4/2020 | Harrison | |
| D897,416 S | 9/2020 | Bergman | |
| D898,107 S | 10/2020 | Tan | |
| 10,808,884 B2 | 10/2020 | Shan | |
| D908,780 S | 1/2021 | Harrison | |
| D911,427 S | 2/2021 | Silva Casas | |
| 10,928,711 B2 | 2/2021 | Vitale | |
| 10,955,730 B2 | 3/2021 | Yap | |
| D921,095 S | 6/2021 | Alberstein | |
| 11,050,909 B1 | 6/2021 | Jian | |
| 11,099,462 B1 * | 8/2021 | Lee | G03B 17/561 |
| D939,014 S | 12/2021 | Matsumoto | |
| D965,669 S | 10/2022 | Li | |
| D967,244 S | 10/2022 | Matthews | |
| D989,164 S | 6/2023 | Bergman | |
| D990,546 S | 6/2023 | Harrison | |
| 11,953,808 B2 * | 4/2024 | Nguyen | F16M 11/242 |
| 2004/0223752 A1 | 11/2004 | Ghanouni | |
| 2005/0091860 A1 | 5/2005 | Watters | |
| 2005/0128347 A1 | 6/2005 | Ryu | |
| 2006/0175482 A1 | 8/2006 | Johnson | |
| 2006/0257137 A1 | 11/2006 | Fromm | |
| 2008/0117328 A1 | 5/2008 | Daoud | |
| 2008/0248703 A1 | 10/2008 | Russell | |
| 2010/0061711 A1 | 3/2010 | Woodman | |
| 2011/0042530 A1 | 2/2011 | Phillips | |
| 2011/0129210 A1 | 6/2011 | McGucken | |
| 2013/0010186 A1 | 1/2013 | Scarola | |
| 2013/0107111 A1 | 5/2013 | Campbell | |
| 2013/0186310 A1 | 7/2013 | Lymberis | |
| 2014/0027591 A1 | 1/2014 | Fountain | |
| 2014/0356048 A1 | 12/2014 | Chou | |

(56) References Cited

U.S. PATENT DOCUMENTS

| | | | |
|---|---|---|---|
| 2015/0076184 | A1 | 3/2015 | Achenbach |
| 2015/0103236 | A1 | 4/2015 | Woodman |
| 2015/0177597 | A1 | 6/2015 | Harrison |
| 2015/0189131 | A1 | 7/2015 | Woodman |
| 2015/0253651 | A1 | 9/2015 | Russell |
| 2015/0309396 | A1 | 10/2015 | Rohrer |
| 2015/0316205 | A1 | 11/2015 | Bennett |
| 2015/0316837 | A1 | 11/2015 | Maltese |
| 2016/0050344 | A1 | 2/2016 | Woodman |
| 2016/0259230 | A1 | 9/2016 | Woodman |
| 2016/0266474 | A1 | 9/2016 | Russell |
| 2017/0108759 | A1 | 4/2017 | Clearman |
| 2017/0108760 | A1 | 4/2017 | Achenbach |
| 2018/0017850 | A1 | 1/2018 | Shen |
| 2018/0106418 | A1 | 4/2018 | Anglin |
| 2019/0128469 | A1 | 5/2019 | Lu |
| 2020/0149679 | A1 | 5/2020 | Grabner |
| 2021/0112182 | A1 | 4/2021 | Crow |
| 2021/0405512 | A1 | 12/2021 | Nguyen |
| 2022/0045458 | A1 | 2/2022 | Wu |
| 2023/0280640 | A1 | 9/2023 | Wim |

FOREIGN PATENT DOCUMENTS

| | | | |
|---|---|---|---|
| CN | 300710506 | | 11/2007 |
| CN | 202132670 | U | 2/2012 |
| CN | 301939760 | S | 5/2012 |
| CN | 102883045 | A | 1/2013 |
| CN | 302309175 | S | 1/2013 |
| CN | 302309179 | S | 1/2013 |
| CN | 203193721 | U | 9/2013 |
| CN | 302630881 | S | 11/2013 |
| CN | 302790132 | S | 4/2014 |
| CN | 302889224 | S | 7/2014 |
| CN | 302917311 | S | 8/2014 |
| CN | 303033358 | S | 12/2014 |
| CN | 304408331 | S | 12/2017 |
| CN | 304732212 | | 7/2018 |
| CN | 304732212 | S | 7/2018 |
| CN | 304940439 | S | 12/2018 |
| CN | 305093209 | S | 4/2019 |
| CN | 305510540 | S | 12/2019 |
| CN | 305553326 | S | 1/2020 |
| CN | 305792205 | S | 5/2020 |
| CN | 305888103 | | 6/2020 |
| CN | 306342509 | | 2/2021 |
| CN | 306928782 | | 11/2021 |
| CN | 306972911 | | 11/2021 |
| CN | 306992555 | | 12/2021 |
| CN | 307003151 | | 12/2021 |
| CN | 307072669 | | 1/2022 |
| CN | 307095111 | | 2/2022 |
| CN | 307108151 | | 2/2022 |
| CN | 307136317 | | 3/2022 |
| EP | 0845399 | A2 | 6/1998 |
| JP | D1518880 | | 3/2015 |
| KR | 300703725 | | 8/2013 |
| SE | 523844 | C2 * | 5/2004 ............ F16M 13/00 |
| WO | 2010005976 | A1 | 1/2010 |

OTHER PUBLICATIONS

"Injection Molding Process and Mold Design," published by Harbin Engineering University Press, May 2010, a vocational college textbook for the "Eleventh Five-Year Plan," p. 25.

Bite Mouth Camera Mount, Go-Pro, https://gopro.com/en/US/shop/mounts-accessories/bite-mouth-mount-plus-floaty/ASLBM-003 html, retrieved Jan. 27, 2023 (Year: 2023) 1 page.

Extendable Selfie Stick for Gopro, product available Oct. 19, 2019 [online], pictured review Jan. 12, 2021 [online], [site visited Mar. 15, 2022]: |URL :<https://www.amazon.com/gp/product/B07ZB4MVPN/ref=sw_img_1?smid=A17QBZVUKPDUQT&psc=1> (Year: 2019) 14 pages.

Final Office Action for U.S. Appl. No. 14/054,640, May 28, 2014, 13 Pages.

Final Office Action for U.S. Appl. No. 14/926,321, Feb. 17, 2016, 12 Pages.

GoPro 3-way 2.0 Review, video review Apr. 22, 2021 [online], [site visited May 26, 2022]:URL:<https://www.youtube.com/watch?\qTOcfkDI5e4> (Year: 2021) 22 pages.

GoPro 3-Way 2.0, product available Apr. 16, 2021 [online], pictured review Feb. 8, 2022 [online], [site visited Mar. 15, 2022]:URL:<https://www.amazon.com/gp/product/B092RK7H4C/ref=ox_Sc act title 1?smid=ATVPDKIKXODER&psc=1> (Year: 2021) 13 pages.

GoPro Bite Mount & Floaty . [online] Published on Oct. 4, 2017. Retrieved Apr. 24, 2018 from URL: https://shop.gopro.com/mounts/bite-mount-plus-floaty/ASLBM-001.html, 2 pages.

GoPro Camera the Handler Floating Hand Grip, product available Sep. 13, 2017 [online], pictured review May 13, 2018 [online], [site visited Mar. 15, 2022]:URL:<https://www.amazon.com/gp/product/B0755PDKCN/ref=ewc_pr_img_1?smid=AJ99WYM3HK1F9&psc=1> (Year: 2017) 19 pages.

GoPro Grab Bag of Mounts for HERO Cameras, product available Jun. 17, 2003 [online], video review Jan. 4, 2013 [online], [site visited 3/ 4FB8TC/ref=ox_sc_act_image_1?smid=AI815W1WMD729 &psc=1> ( Year: 2003) 8 pages.

GoPro Head Strap+QuickClip Kopfbandhalterung. [online] Retrieved May 16, 2017 from URL: <https://www.bikecomponents.de/en/GoPro/HeadStrapQuickClipKopfbandhalterungp37358/> 2 pages.

GoPro Max Grip, product available Oct. 1, 2019 [online], pictured review Jan. 28, 2020 [online], [site visited Mar. 15, 2022]:URL:<https://www.amazon.com/GoPro-Max-Grip-Tripod-Official/dp/BO7WRMQD69?ref_=ast_sto_dp> (Year: 2019) 15 pages.

GoPro Shorty Mini Extension Pole Tripod, product available Sep. 14, 2017[online], pictured review Nov. 12, 2017 [online], [site visited Mar. 15, 2022]:URL:<https://www.amazon.com/gp/product/B0755G21GJ/ref=ox_sc_act_title_1?smid=A133NNBZBDZH7R &psc=1?>( Year:2017) 23 pages.

Gopro, Inc., 'Grab Bag of Mounts,' 2014, 2 Pages, [online][Archived on webarchive.org on Mar. 29, 2014][Retrieved on Aug. 31, 2015] Retrieved from the internet <URL:https://web.archive.org/web/20140329112413/http:/gopro.com/camera-mounts/grab-bag-of-mounts#features>. 2 pages.

GoPro: Introducing 3-Way Grip, video review Jun. 2, 2014 [online] , [site visited May 26, 2022]:URL:<https://www.youtube.com/watch?\ 2ZUCq3CNJNY> (Year: 2014) 22 pages.

HSU Basic Adapter Grab Bag for GoPro, productavailable Jan. 4, 2022[online], no video/pictured review available [online], [site visited Mar. 15, 2022]:URL:<https://www.amazon.com/gp/product/B09PMTWH6F/ref=sw_img_1?smid=ACSWHASORUSKH&psc=1> (Year: 2022) 14 pages.

https://www.youtube.com/watch?v=2ZUCq3CNJNY, Posted Jun. 2, 2014.

https://www.youtube.com/watch?v=ShPBMUaeWxY, Posted Aug. 21, 2014.

J-Hook Buckle Mount Quick Release Buckle 360° Rotation. [online] Published Apr. 17, 2014. Retrieved Apr. 24, 2018 from URL: https://www.miniinthebox.conn/p/telesin-360-degree-rotary-j-shape-fast-assembling-mount-buckle-for-gopro-hd-hero-2-3-3 p1278233.html, 8 pages.

New Gopro Accessories Surfing Skating Shoot Dummy Bite Mouth Mount for Gopro Hero 4S/4/3+/3/2/1 Sport Camera Accessories. [online] Retrieved Sep. 27, 2016 from URL: <https://www.aliexpress.com/item/NewGoproAccessoriesSurfingSkatingShoo-tDummyBiteMouthMountForGoproHero4S43/32664455091.html>. 10 pages.

Non-Final Office Action for U.S. Appl. No. 14/656,734, May 12, 2015, 30 Pages.

Non-Final Office Action for U.S. Appl. No. 14/054,640, Nov. 14, 2014, 17 Pages.

Non-Final Office Action for U.S. Appl. No. 14/926,321, Nov. 18, 2015, 13 Pages.

Office Action for Chinese Patent Application No. CN 201480056707.2, Nov. 15, 2016, 19 pages.

Office Action for Chinese Patent Application No. CN201480056707.2, Aug. 1, 2017, 23 Pages, (With English Translation).

(56) References Cited

OTHER PUBLICATIONS

PCT International Search Report and Written Opinion for PCT/US2014/058465, Dec. 23, 2014, 17 pages.

PCT International Search Report for Written Opinion for PCT/US2013/062061, Mar. 3, 2014, 15 Pages.

PGYTech MantisPod Pro Vlogging Tripod, product availability unknown [online], video review Sep. 1, 2021 [online], [site visited Mar. 15, 2022]:URL:<https://www.jbhifi.com.au/products/pgytech-mantispod-pro-vlogging-tripod?view=pdp> (Year:2021) 9 pages.

Polaroid 2x Vertical Surface J-hook Buckle Mount for GoPro HER04, 3+ and 3 Cameras, [online] Retrieved May 16, 2017 from URL: <https://www.adorama.com/ipdgp2jhb.html> 4 pages.

Polaroid Quick Release Buckle Mount for GoPro HER04, 3+ and 3 Cameras, 2 Pack, [online] Retrieved May 16, 2017 from URL: <https://www.adorama.com/ipdgp2bm.html?gclid=CNnnhlHc9NMCFRGHswodKWQCeg> 4 pages.

Session Quick Release Buckle. [online] Published on Jan. 8, 2017. Retrieved Apr. 24, 2018 from URL: http://wetgill.com/?p=Product&id=703, 2 pages.

Soonsun 4-in-1 Floating Selfie Stick for GoPro Hero, product available Sep. 29, 2021 [online], pictured review Oct. 23, 2021 [online], [ site visited Mar. 15, 2022]:URL:<https://www.amazon.com/gp/product/B09HG939V2/ref=sw_img_1?smid=AX3NEPOQADTLB&pSc=1> (Year: 2021) 14 pages.

Surfing Dummy Bite Mouth Gum Grill Mount for GoPro. [online] Published Jan. 21, 2017. Retrieved Apr. 24, 2018 from URL: https://www.walrnart.corn/ip/Surfing-Dummy-Bite-Mouth-Gum-Grill-Mount-for-GoPro-Hero-4-3-3-2/281185292, 6 pages.

Taisioner Mini Selfie Stick Tripod, product available Mar. 15, 2019 [online], pictured review Nov. 14, 2019 [online], [site visited Mar. 15, 2022]: URL:<https://www.amazon.com/gp/product/B07PMQVSK2/ref=sw_img_1?smid=A3NQN2OWAVKMYQ&psc=1> (Year: 2019) 15 pages.

United States Office Action, U.S. Appl. No. 15/155,336, Jul. 15, 2016, 12 pages.

United States Office Action, U.S. Appl. No. 15/155,336, Oct. 14, 2016, 8 pages.

\* cited by examiner

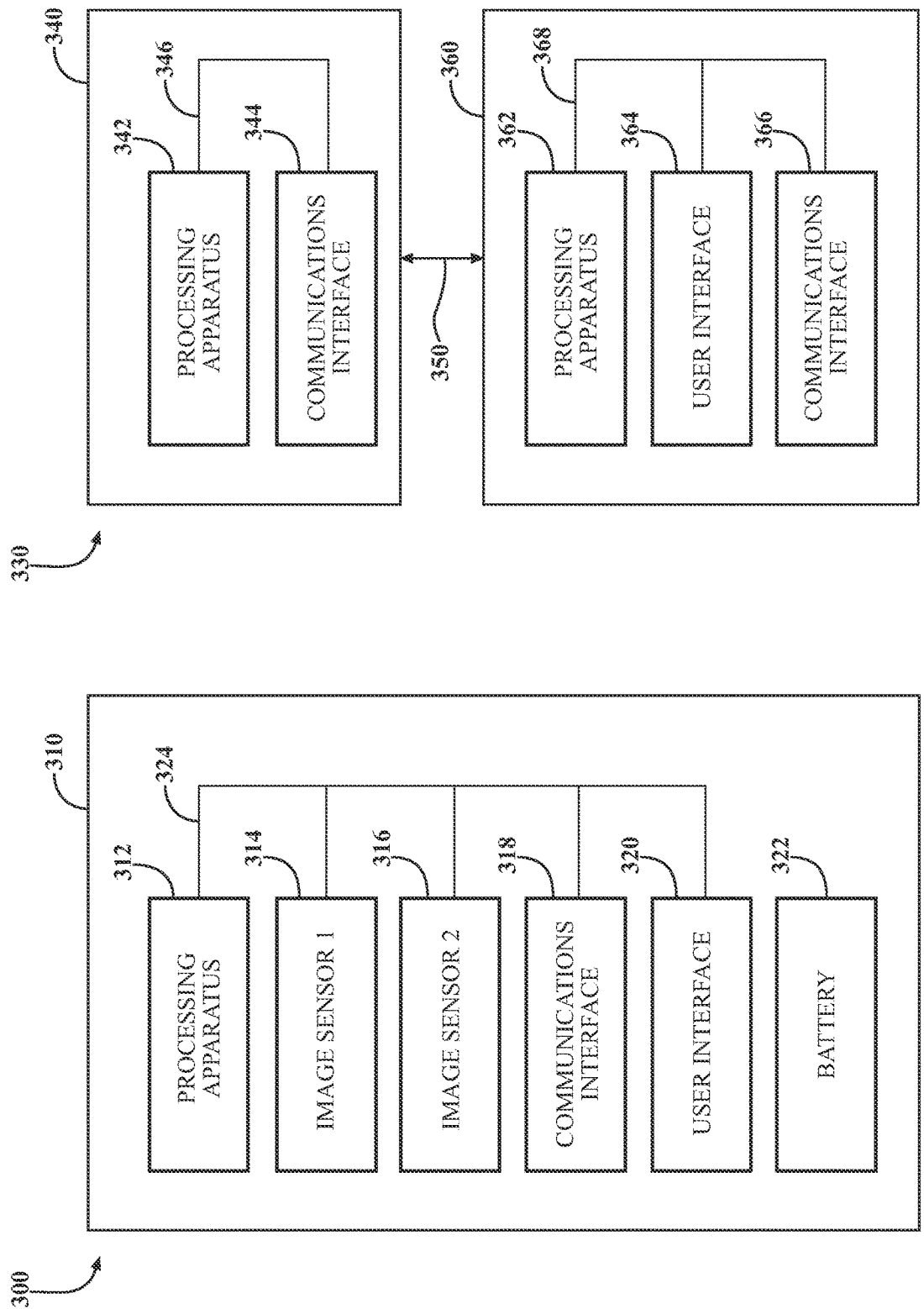

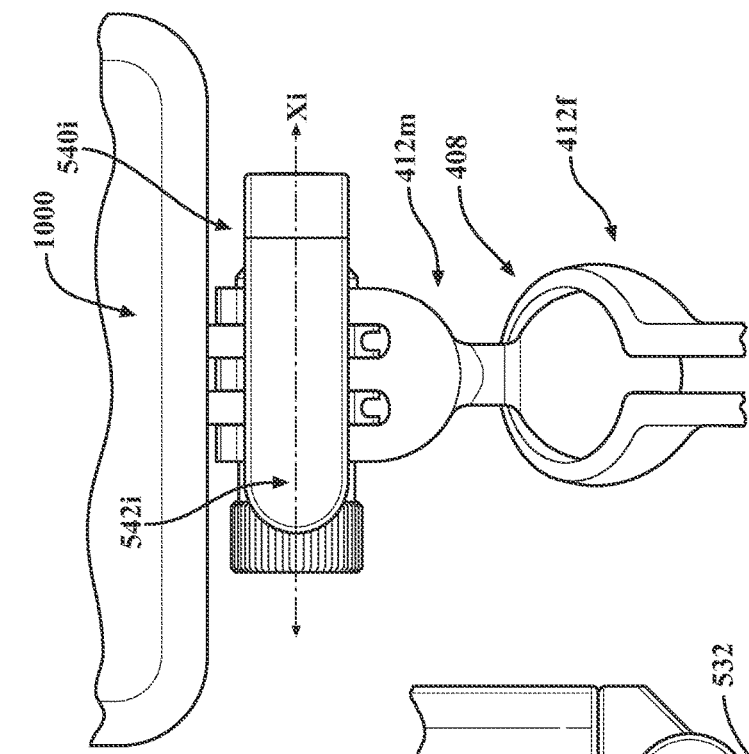
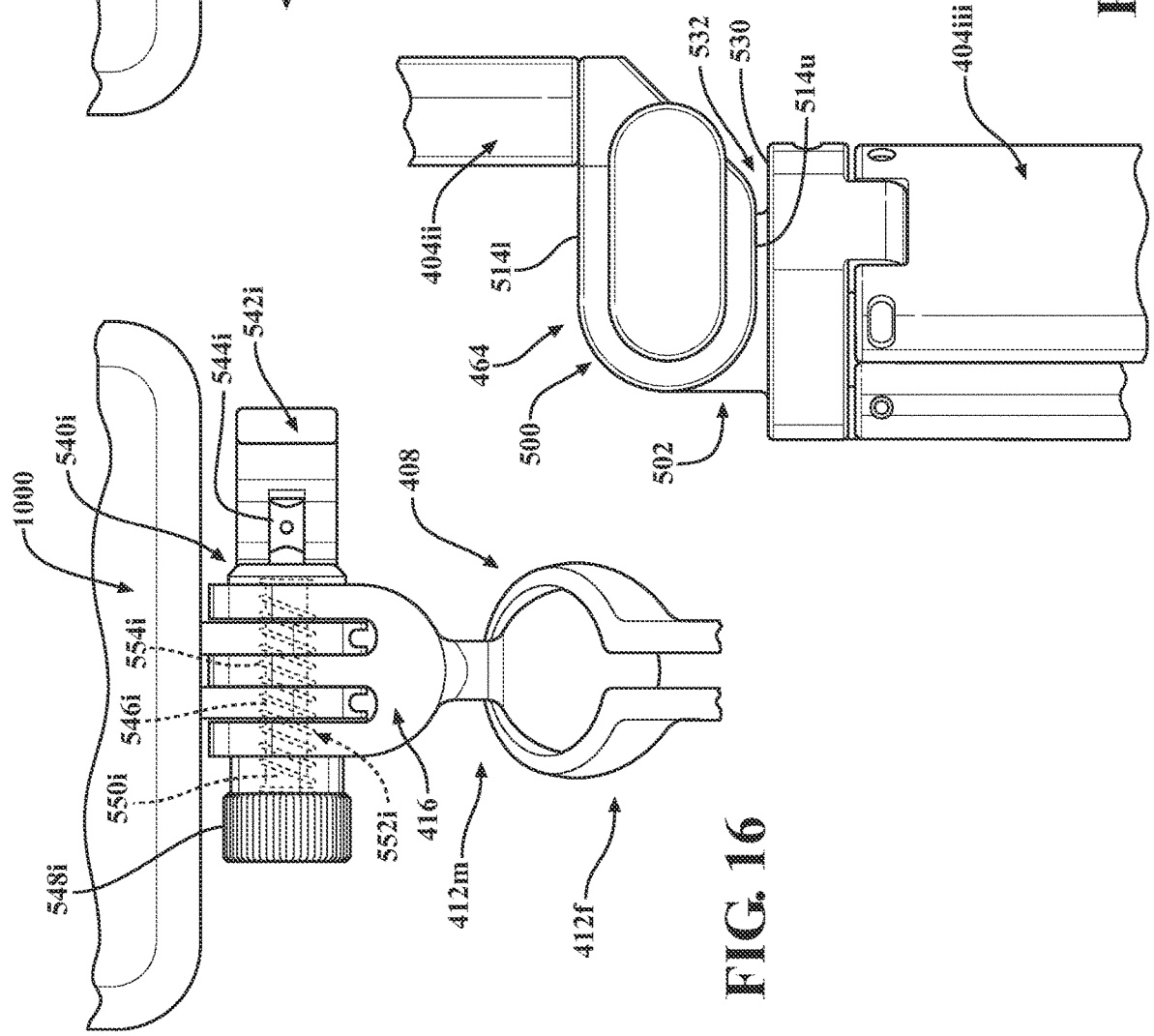

MOUNTING SYSTEMS FOR IMAGE CAPTURE DEVICES

CROSS REFERENCE TO RELATED APPLICATIONS

This application is a continuation of U.S. patent application Ser. No. 17/470,774, now U.S. Pat. No. 11,953,808, filed Sep. 9, 2021, which claims priority to and the benefit of U.S. Provisional Application Ser. No. 63/164,292, filed Mar. 22, 2021, and is a continuation-in-part of U.S. patent application Ser. No. 29/740,015, filed Jun. 30, 2020, now U.S. Pat. No. D982,065, the entire disclosure of each of the above-identified applications being hereby incorporated by reference.

TECHNICAL FIELD

The present disclosure relates generally to collapsible and expandable mounting systems for image capture devices.

BACKGROUND

Image capture devices are used in various applications, including, for example, handheld cameras and video recorders. To increase versatility, many image capture devices are configured for use with a mount that can be carried by a user or connected to a wearable support, such as a vest, a glove, a helmet, a hat, etc. Known mounts, however, are typically designed such that the image capture device is maintained in close physical proximity to the user, which can restrict maneuverability as well as the field-of-view. To address this concern, certain mounts have been developed that increase separation between the user and the image capture device, but these mounts are often rigid, which can result in visibility of the mount in captured images and video. A reconfigurable mount would, thus, be advantageous in that it would increase maneuverability and reduce presence of the mount in captured images/video.

SUMMARY

In one aspect of the present disclosure, a mounting system for an image capture device is disclosed. The mounting system includes: a first arm that is configured to support the image capture device; a second arm that is pivotably connected to the first arm; and a third arm that is pivotably connected to the second arm.

The first arm includes a first fastener that is removable from the mounting system, and a second fastener that is nonremovable from the mounting system. The first fastener is movable between an unlocked position, in which the image capture device is connectable to and disconnectable from the mounting system, and a locked position, in which the image capture device is secured to the mounting system, and the second fastener is movable between an unlocked position, in which the image capture device and the first arm are relatively movable, and a locked position, in which the image capture device and the first arm are fixed in relation to each other.

The mounting system further includes a third fastener that is supported by the first arm or the second arm, and a fourth fastener that is supported by the second arm or the third arm, wherein the third fastener and the fourth fastener are each nonremovable from the mounting system. The third fastener is movable between an unlocked position, in which the first and second arms are relatively movable, and a locked position, in which the first and second arms are fixed in relation to each other, and the fourth fastener is movable between an unlocked position, in which the second and third arms are relatively movable, and a locked position, in which the second and third arms are fixed in relation to each other.

In certain embodiments, the first arm may include a connection assembly that is configured to releasably connect the image capture device to the mounting system.

In certain embodiments, the connection assembly may include a male component, and a female component that is configured to removably receive the male component.

In certain embodiments, the male component may include a ball member, and the female component may include a socket.

In certain embodiments, the male component may include a first plurality (set) of fingers that are configured for engagement with a second plurality (set) of fingers extending from the image capture device.

In certain embodiments, the first fastener may be configured to apply a compressive force to the first plurality of fingers and to the second plurality of fingers upon movement into the locked position.

In certain embodiments, the first fastener may include: a lever; a shaft that extends from the lever through the first plurality of fingers; and an end cap that is rotatably connected to the shaft.

In certain embodiments, the shaft and the end cap may be configured for removable connection to each other to facilitate removal of the lever and the shaft from the male component upon removal of the end cap from the shaft.

In certain embodiments, the end cap may be nonremovably connected to the male component.

In certain embodiments, the first arm may extend along a longitudinal axis.

In certain embodiments, the first fastener may extend along a first axis in the locked position that is generally orthogonal in relation to the longitudinal axis of the first arm.

In certain embodiments, the second fastener may extend along a second axis in the locked position that is generally orthogonal in relation to the longitudinal axis of the first arm.

In certain embodiments, the first axis and the second axis may be generally parallel in relation.

In certain embodiments, the third fastener may extend along a third axis in the locked position that is generally parallel in relation to the longitudinal axis of the first arm.

In certain embodiments, the fourth fastener may extend along a fourth axis in the locked position that is generally orthogonal in relation to each of the first axis, the second axis, and the third axis.

In another aspect of the present disclosure, a mounting system for an image capture device is disclosed. The mounting system includes: a first arm that is configured to support the image capture device; a second arm that is pivotably connected to the first arm; a third arm that is pivotably connected to the second arm; and a knuckle assembly that pivotably connects the second arm and the third arm. The knuckle assembly defines a hard stop that is configured to prevent relative movement between the second arm and the third arm beyond a threshold position.

In certain embodiments, the hard stop may be configured to allow for approximately 180° of relative movement between the second arm and the third arm.

In certain embodiments, the knuckle assembly may include a yoke component defining a first contact surface and an eye assembly that is configured for receipt by the yoke component.

In certain embodiments, the eye assembly may include a base component defining a second contact surface that is configured for contact with the first contact surface such that the first contact surface and the second contact surface collectively define the hard stop and prevent relative movement between the second arm and the third arm beyond the threshold position.

In certain embodiments, the third arm may include: a first segment; a second segment; and a third segment.

In certain embodiments, the third arm may be repositionable between a closed configuration, in which the first segment, the second segment, and the third segment are in generally adjacent relation so as to define a handle, and an open configuration, in which the first segment, the second segment, and the third segment are separated from each other so as to define a stand.

In certain embodiments, the first segment, the second segment, and the third segment may each be pivotably connected to the knuckle assembly.

In certain embodiments, the first and second arms may include corresponding fingers that are configured for engagement about a first fastener extending therethrough and the second arm and the knuckle assembly may include corresponding fingers that are configured for engagement about a second fastener extending therethrough.

In another aspect of the present disclosure, an expandable mounting system for an image capture device is disclosed. The expandable mounting system includes: a first arm that is configured to support the image capture device; a second arm that is pivotably connected to the first arm; a third arm that is pivotably connected to the second arm; and a knuckle assembly that is supported by the second arm and the third arm. The first arm defines a longitudinal axis, and includes a first fastener and a second fastener. The first fastener is movable between an unlocked position and a locked position to allow for connection and disconnection of the image capture device to the expandable mounting system, and the second fastener is movable between an unlocked position and a locked position to allow for movement and fixation of the image capture device relative to the expandable mounting system. The first fastener extends along a first axis in the locked position that is generally orthogonal in relation to the longitudinal axis of the first arm, and the second fastener extends along a second axis in the locked position that is generally orthogonal in relation to the longitudinal axis of the first arm. The expandable mounting system further includes a third fastener that is supported by the first arm or the second arm. The third fastener is movable between an unlocked position and a locked position to allow for relative movement and fixation of the first arm and the second arm. The third fastener extends along a third axis in the locked position that is generally parallel in relation to the longitudinal axis of the first arm. The knuckle assembly is configured to pivotably connect the second arm to the third arm and includes a hard stop that is configured to prevent relative movement between the second arm and the third arm beyond a threshold position and a fourth fastener that is movable between an unlocked position and a locked position to allow for relative movement and fixation of the second arm and the third arm. The fourth fastener extends along a fourth axis in the locked position that is generally orthogonal in relation to each of the first axis, the second axis, and the third axis.

In certain embodiments, the first fastener may be removable from the expandable mounting system.

In certain embodiments, the second fastener, the third fastener, and the fourth fastener may each be nonremovable from the expandable mounting system.

In certain embodiments, the hard stop may be configured to allow for approximately 180° of relative movement between the second arm and the third arm.

In certain embodiments, the knuckle assembly may include a yoke component defining a first contact surface, and an eye assembly that is configured for receipt by the yoke component.

In certain embodiments, the eye assembly may include a base component defining a second contact surface.

In certain embodiments, the first contact surface may be configured for contact with the second contact surface to prevent relative movement between the second arm and the third arm beyond the threshold position.

In another aspect of the present disclosure, a mounting system for an image capture device is disclosed. The mounting system includes: a first arm that is configured to support the image capture and which includes a first fastener; a second arm that is pivotably connected to the first arm; a second fastener that connects the first arm and the second arm; a third arm that is pivotably connected to the second arm; and a third fastener that connects the second arm and the third arm. The first fastener is pivotable between an unlocked position, in which the image capture device is connectable to and disconnectable from the mounting system, and a locked position, in which the image capture device is secured to the mounting system. The second fastener is configured for rotation to apply a compressive force to the first and second arms and thereby fix the first and second arms in relation to each other. The third fastener is configured for rotation to apply a compressive force to the second and third arms and thereby fix the second and third arms in relation to each other.

In certain embodiments, the first fastener, the second fastener, and the third fastener may each be nonremovable from the mounting system.

In certain embodiments, the first arm may include a connection assembly that is configured to releasably connect the image capture device to the mounting system.

In certain embodiments, the connection assembly may include a male component and a female component that is configured to removably receive the male component.

In certain embodiments, the male component may include a ball member and the female component may include a socket.

In certain embodiments, the male component may include a first mount that is configured for releasable engagement with a second mount.

In certain embodiments, the second mount may be configured for engagement with the image capture device.

In certain embodiments, the second mount may be slidably insertable into the first mount.

In certain embodiments, the first fastener may include: a lever; a shaft that extends from the lever through the female component; and an end cap that is connected to the shaft.

In certain embodiments, the end cap may be nonremovably connected to the shaft.

In certain embodiments, the first arm may extend along a longitudinal axis and the first fastener may be configured such that the lever extends in generally orthogonal relation to the longitudinal axis when the first fastener is in the locked position.

In certain embodiments, the first arm may include a first set of fingers, the second arm may include a second set of fingers and a third set of fingers, and the third arm may include a fourth set of fingers.

In certain embodiments, the second set of fingers may be configured for engagement with the first set of fingers and the fourth set of fingers may be configured for engagement with the third set of fingers.

In certain embodiments, the second fastener may be configured such that, upon rotation, the second fastener compresses the first and second sets of fingers into frictional engagement to thereby fix the first and second arms in relation to each other.

In certain embodiments, the third fastener may be configured such that, upon rotation, the third fastener compresses the third and fourth sets of fingers into frictional engagement to thereby fix the second and third arms in relation to each other.

In another aspect of the present disclosure, an expandable mounting system for an image capture device is disclosed. The expandable mounting system includes: a first arm that is configured to support the image capture device and which includes a first fastener; a second arm that is pivotably connected to the first arm; a second fastener that extends through the first arm and the second arm; a third arm that is pivotably connected to the second arm via a knuckle assembly; and a third fastener that extends through the second arm and the knuckle assembly. The first arm defines a longitudinal axis and the first fastener is adjustable between an unlocked position and a locked position to allow for connection and disconnection of the image capture device to the expandable mounting system. The first fastener extends along a first axis in the locked position that is generally orthogonal in relation to the longitudinal axis of the first arm. The second fastener extends through the first arm and the second arm and is configured for adjustment to thereby fix the first arm and the second arm in relation to each other. The knuckle assembly includes a hard stop that is configured to prevent relative movement between the second arm and the third arm beyond a threshold position. The third fastener is configured for adjustment to thereby fix the second arm and the third arm in relation to each other.

In certain embodiments, the first fastener may include a first configuration and the second and third fasteners may include an identical second configuration that is different than the first configuration.

In certain embodiments, the first fastener, the second fastener, and the third fastener may each be nonremovable from the expandable mounting system.

In certain embodiments, the first fastener may be configured for pivotable adjustment and the second fastener and the third fastener may be configured for rotational adjustment.

In certain embodiments, the hard stop may be configured to allow for approximately 180° of relative movement between the second arm and the third arm.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIGS. 3A-B are block diagrams of examples of image capture systems.

FIG. 11 is a transverse (horizontal) cross-sectional view taken along line 11-11 in

FIG. 5.

FIG. 15 is an enlargement of the area of detail identified in FIG. 5 with the second and third arms shown fully extended.

FIG. 16 is a front, plan view illustrating connection of the image capture device to the mounting system with a cam fastener shown in an unlocked position.

FIG. 17 is a front, plan view illustrating connection of the image capture device to the mounting system with the cam fastener shown in a locked position.

DETAILED DESCRIPTION

Figure 1A:
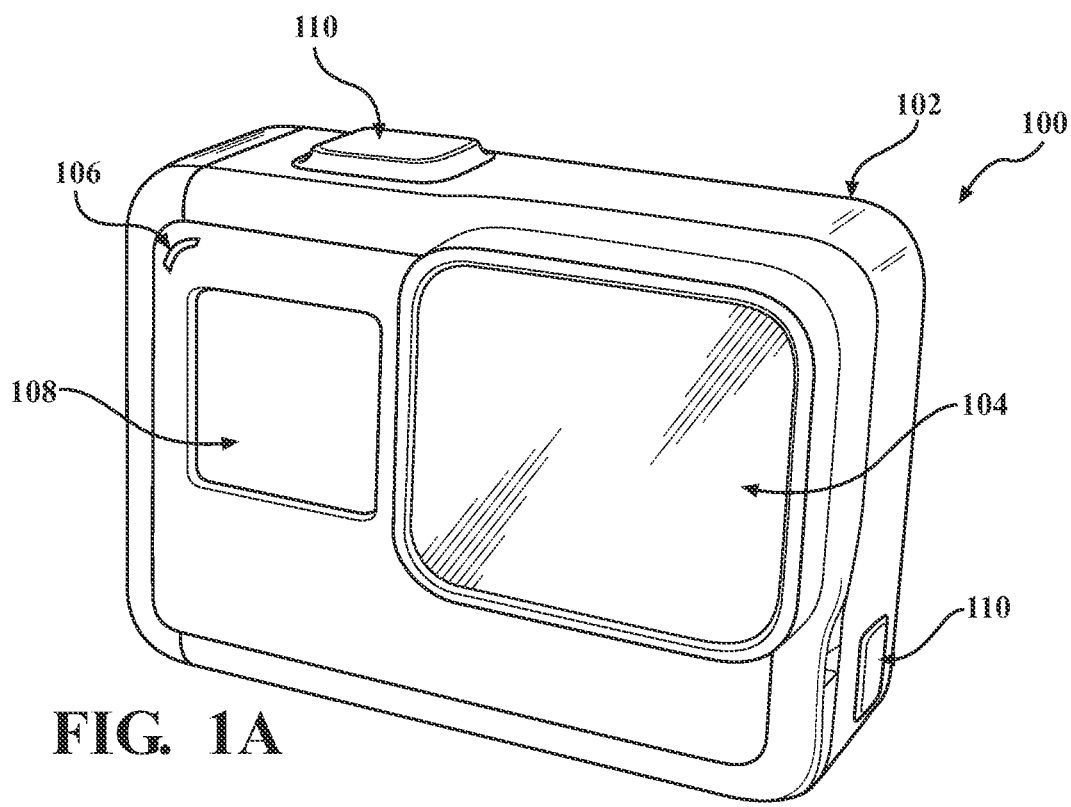
FIGS. 1A-D are isometric views of an example of an image capture device.

The present disclosure describes various embodiments of an expandable and collapsible mounting system for an image capture device. The mounting system includes a ball-and-socket joint that is configured for connection to the image capture device, as well as a plurality (set) of repositionable arms that allow for movement of the mounting system between expanded (unfolded) and collapsed (folded) configurations. More specifically, the mounting system includes: a first (upper) arm that supports the ball-and-socket joint, and, thus, the image capture device; a second (intermediate) arm; and a third (lower) arm that functions as both a handle and a stand (e.g., a tripod) for the mounting system. The arms are pivotably connected in an end-to-end arrangement which allows for versatility in the position of the image capture device relative to the user in the expanded configuration while providing a reduced (compact) profile in the collapsed configuration to increase pocketability and/or facilitate storage of the mounting system. To guard against over-extension and movement beyond a threshold position during expansion, in certain embodiments, the mounting system includes a hard stop (e.g., between the second and third arms). For example, it is envisioned that the hard stop may be configured to limit relative movement between the second and third arms to approximately 180° (e.g., approximately 150° to approximately) 210°.

The mounting system includes a series of lockable cam fasteners that facilitate connection and disconnection of the image capture device to the mounting system, as well as positioning of the image capture device and the arms in any desired orientation. Upon positioning the image capture device and the arms as desired, the cam fasteners can be locked to maintain the desired orientations. To guard against loss and/or misplacement, several of the cam fasteners are captive to (nonremovable from) the mounting system.

FIGS. 1A-D are isometric views of an example of an image capture device 100. The image capture device 100 may include a body 102 having a lens 104 structured on a front surface of the body 102, various indicators on the front surface of the body 102 (such as LEDs, displays, and the like), various input mechanisms (such as buttons, switches, and touchscreen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and an LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
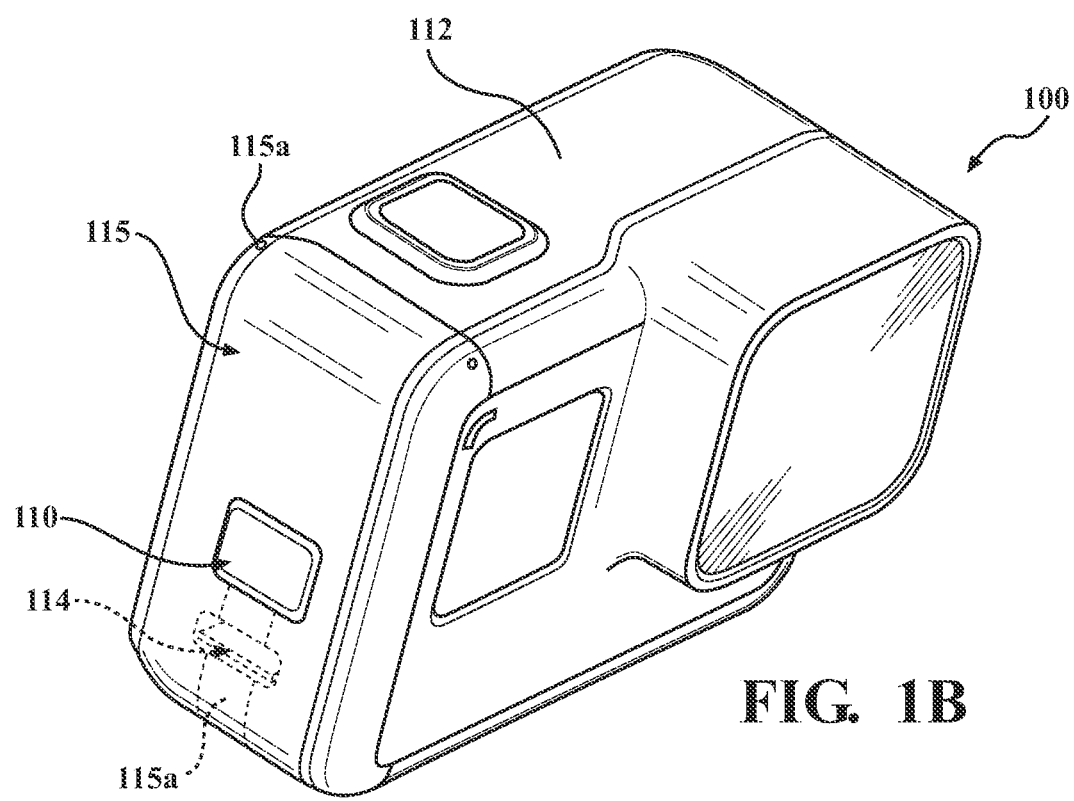
Figure 1C:
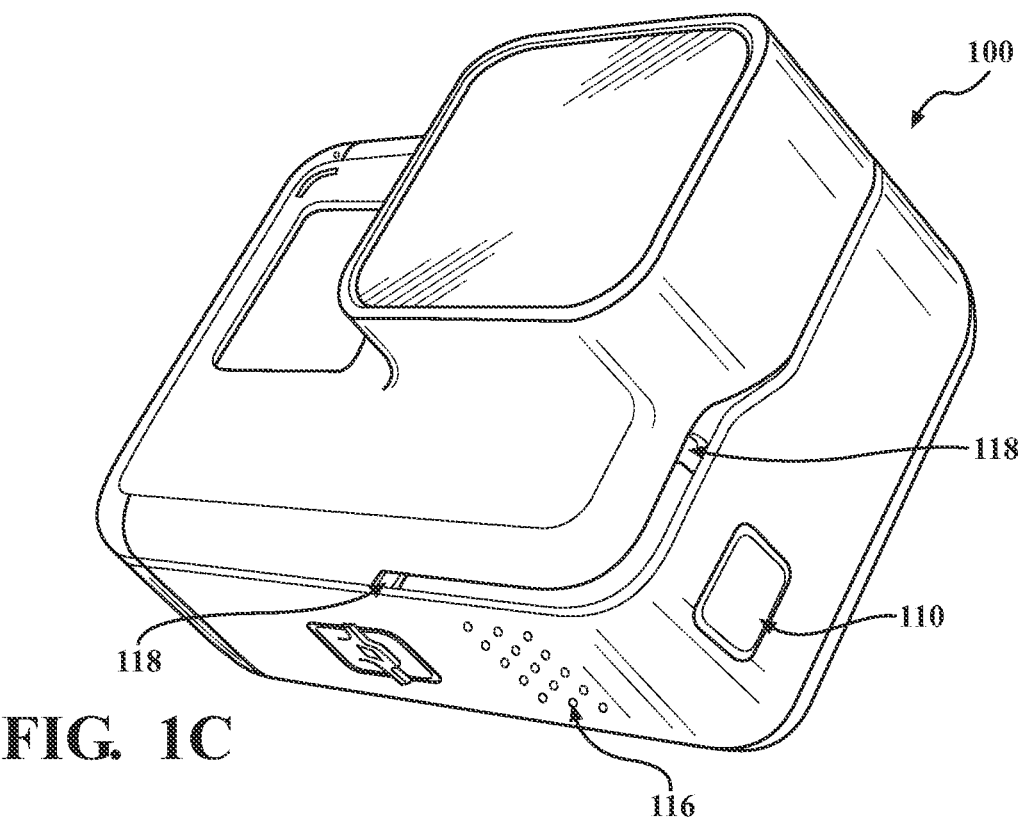
Figure 1D:
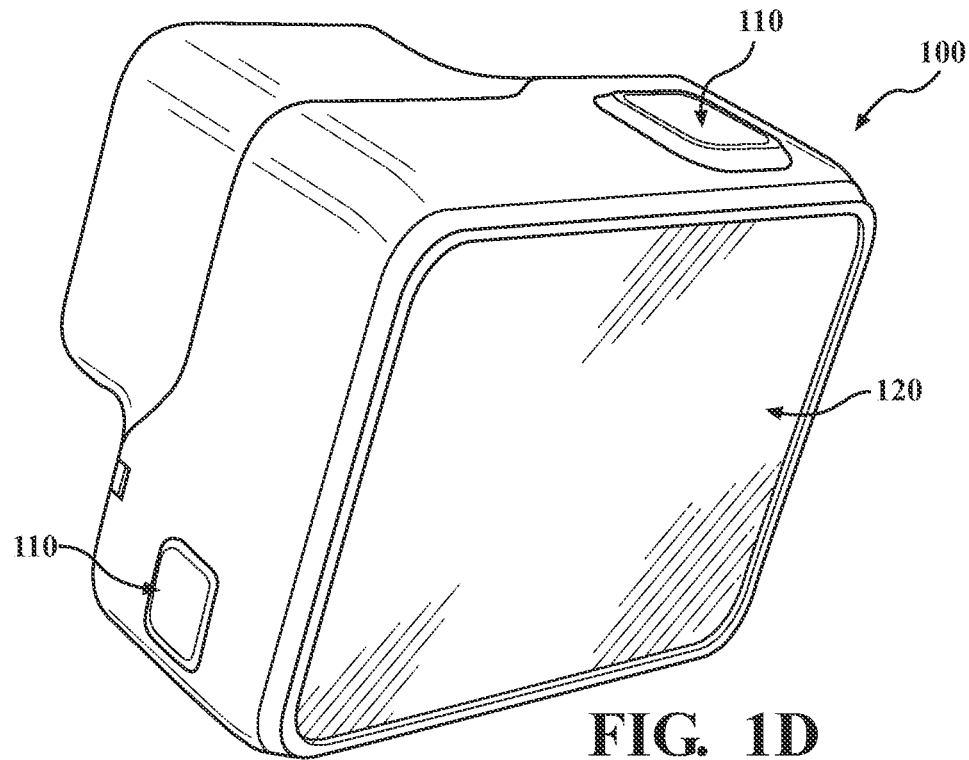

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described herein. For example, the image capture device 100 may include additional buttons or different interface features, such as interchangeable lenses, cold shoes and hot shoes that can add functional features to the image capture device 100, etc.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device, or a network, such as the Internet, may be used.

In some implementations, the computing communication link may be a Wi-Fi link, an infrared link, a Bluetooth (BT)

link, a cellular link, a ZigBee link, a near-field communications (NFC) link (such as an ISO/IEC 20643 protocol link), an Advanced Network Technology interoperability (ANT+) link, and/or any other wireless communications link or combination of links.

In some implementations, the computing communication link may be an HDMI link, a USB link, a digital video interface link, a display port interface link (such as a Video Electronics Standards Association (VESA) digital display interface link), an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
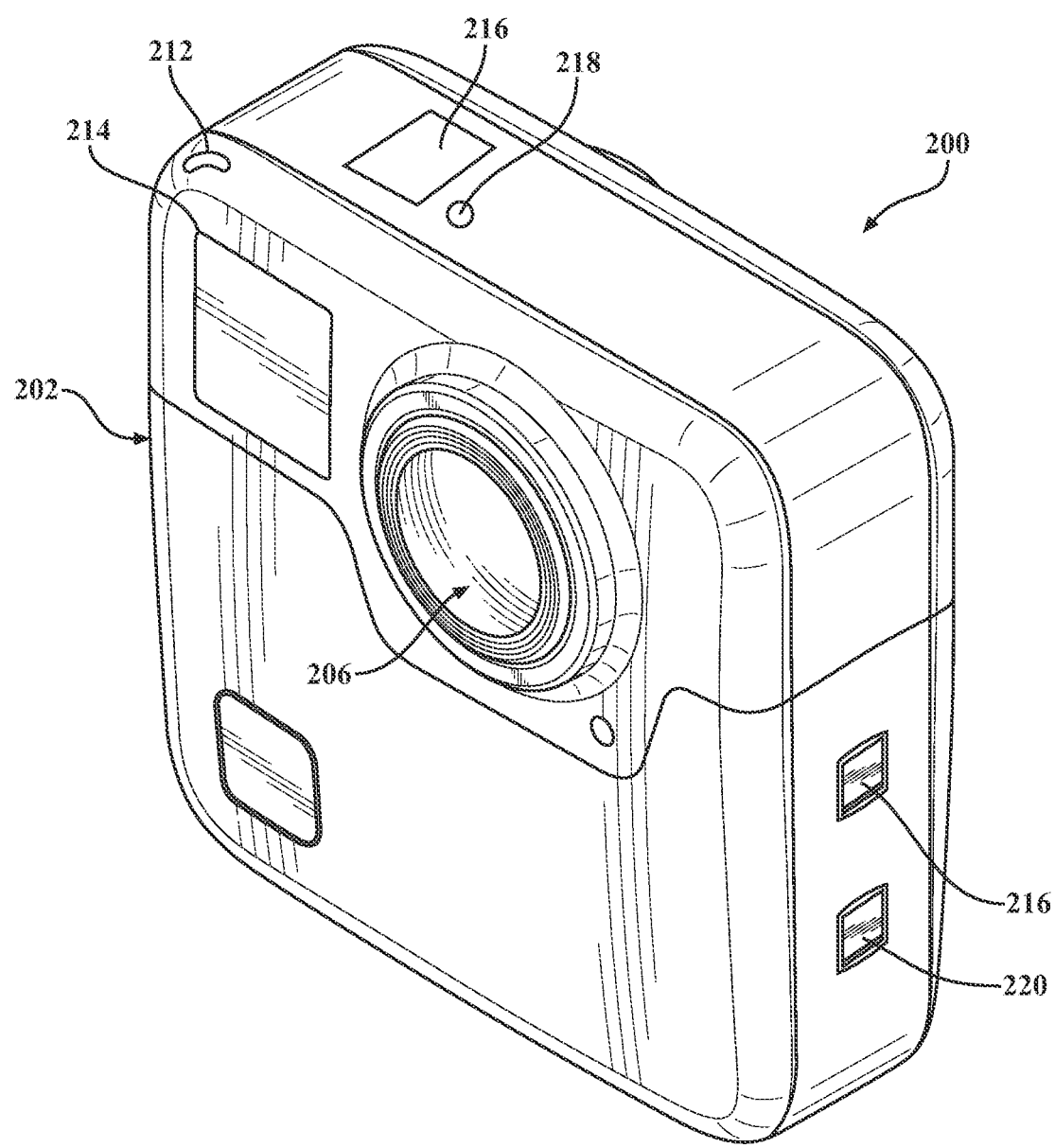
FIGS. 2A-B are isometric views of another example of an image capture device.
Figure 2B:
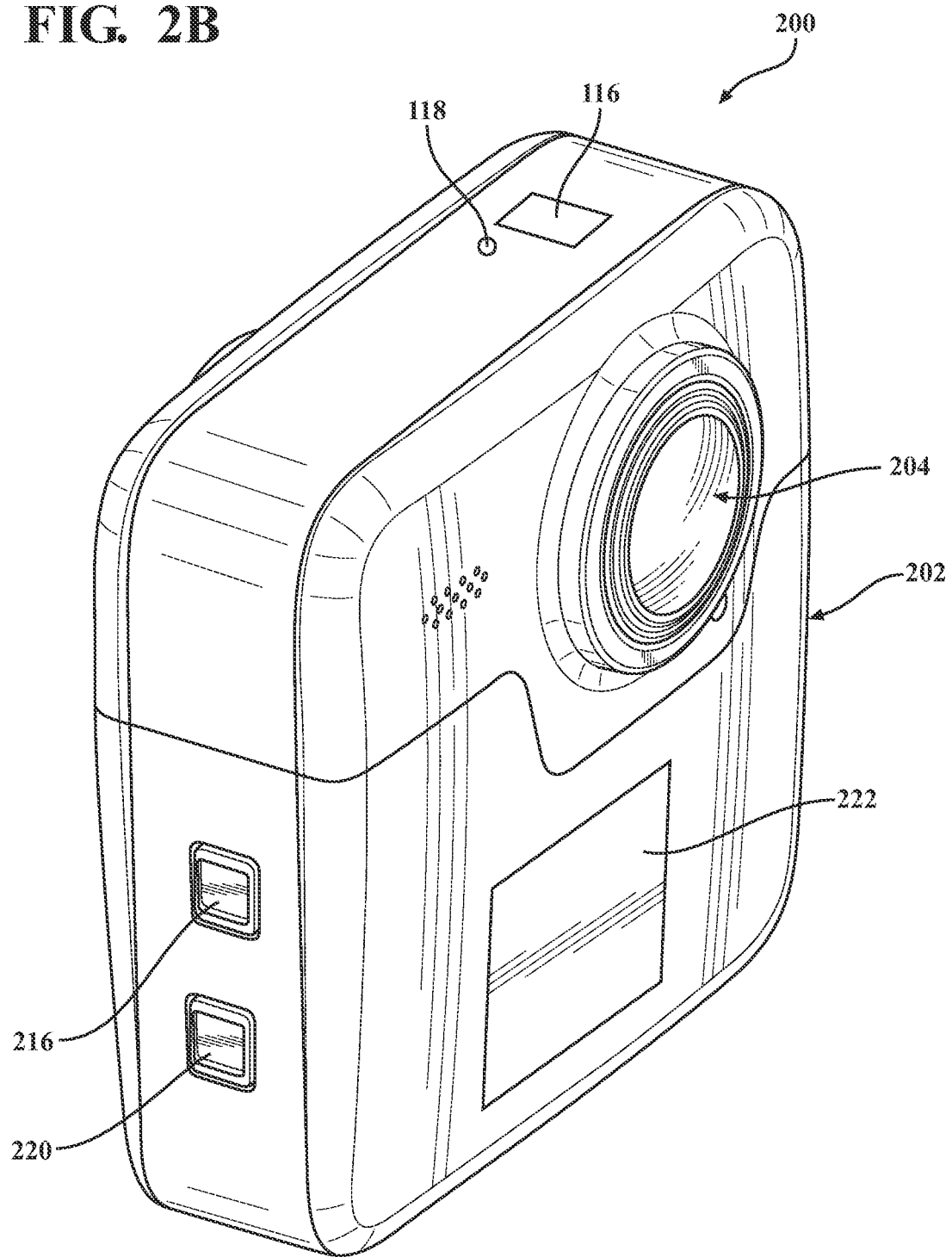

FIGS. 2A-B illustrate another example of an image capture device 200. The image capture device 200 includes a body 202 and two camera lenses 204, 206 disposed on opposing surfaces of the body 202, for example, in a back-to-back or Janus configuration. Although generally depicted as a camera, it should be appreciated that the particular configuration of the image capture device 200 may be varied in alternate embodiments of the disclosure. For example, it is envisioned that the image capture device 200 may instead take the form of a cell phone.

The image capture device may include electronics (e.g., imaging electronics, power electronics, etc.) internal to the body 202 for capturing images via the lenses 204, 206 and/or performing other functions. The image capture device may include various indicators, such as an LED light 212 and an LCD display 214.

The image capture device 200 may include various input mechanisms, such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
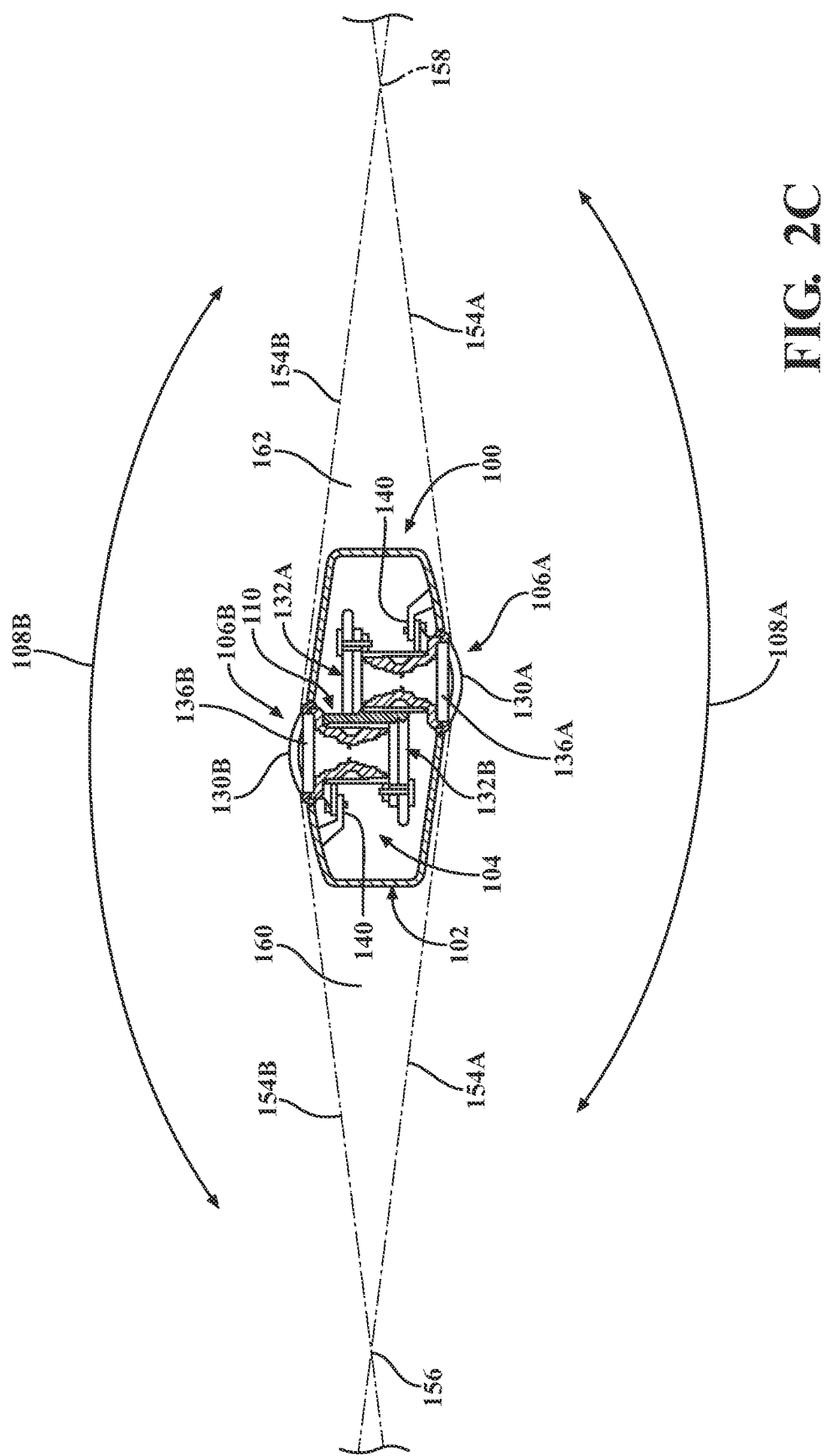
FIG. 2C is a cross-sectional view of the image capture device of FIGS. 2A-B.

FIG. 2C is a cross-sectional view of an optical module 223 of the image capture device 200 of FIGS. 2A-B. The optical module 223 facilitates the capture of spherical images, and, accordingly, includes a first image capture device 224 and a second image capture device 226. The first image capture device 224 defines a first field-of-view 228, as shown in FIG. 2C, and includes a first integrated sensor-lens assembly (ISLA) 229 that receives and directs light onto a first image sensor 230 via the lens 204. Similarly, the second image capture device 226 defines a second field-of-view 232, as shown in FIG. 2C, and includes a second ISLA 233 that receives and directs light onto a second image sensor 234 via the lens 206. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242, may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, the stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory (RAM) device, flash memory, or another suitable type of storage device, such as a non-transitory computer-readable memory. The memory of the processing apparatus 312 may include executable instructions and data that can be accessed by one or more processors of the processing apparatus 312.

For example, the processing apparatus 312 may include one or more dynamic random-access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields-of-view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a Fire Wire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may be used to implement some or all of the techniques described in this disclosure.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a Fire Wire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device, such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure.

Figure 4:
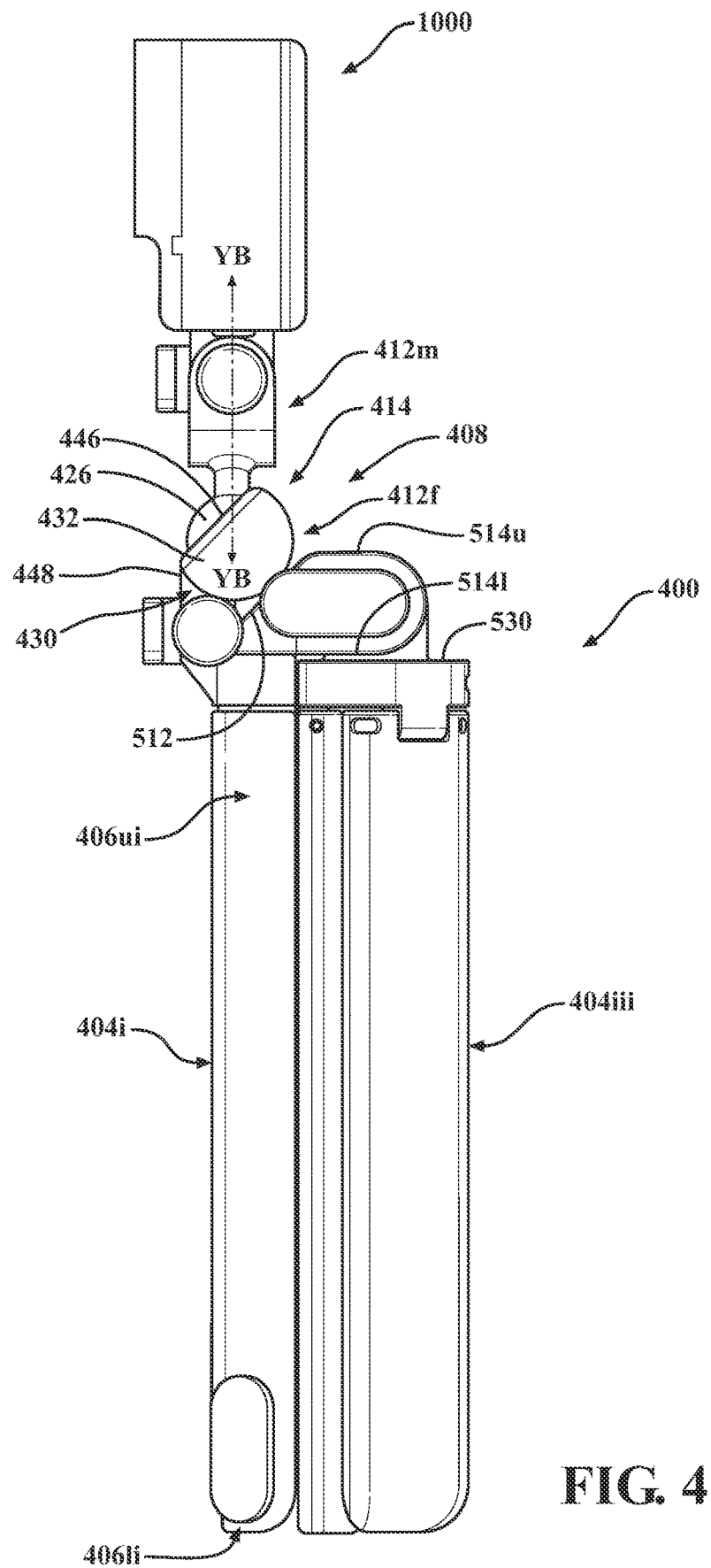
FIG. 4 is a side view of a mounting system for an image capture device including a first arm, a second arm, and a third arm shown in a collapsed (folded) configuration.
Figure 5:
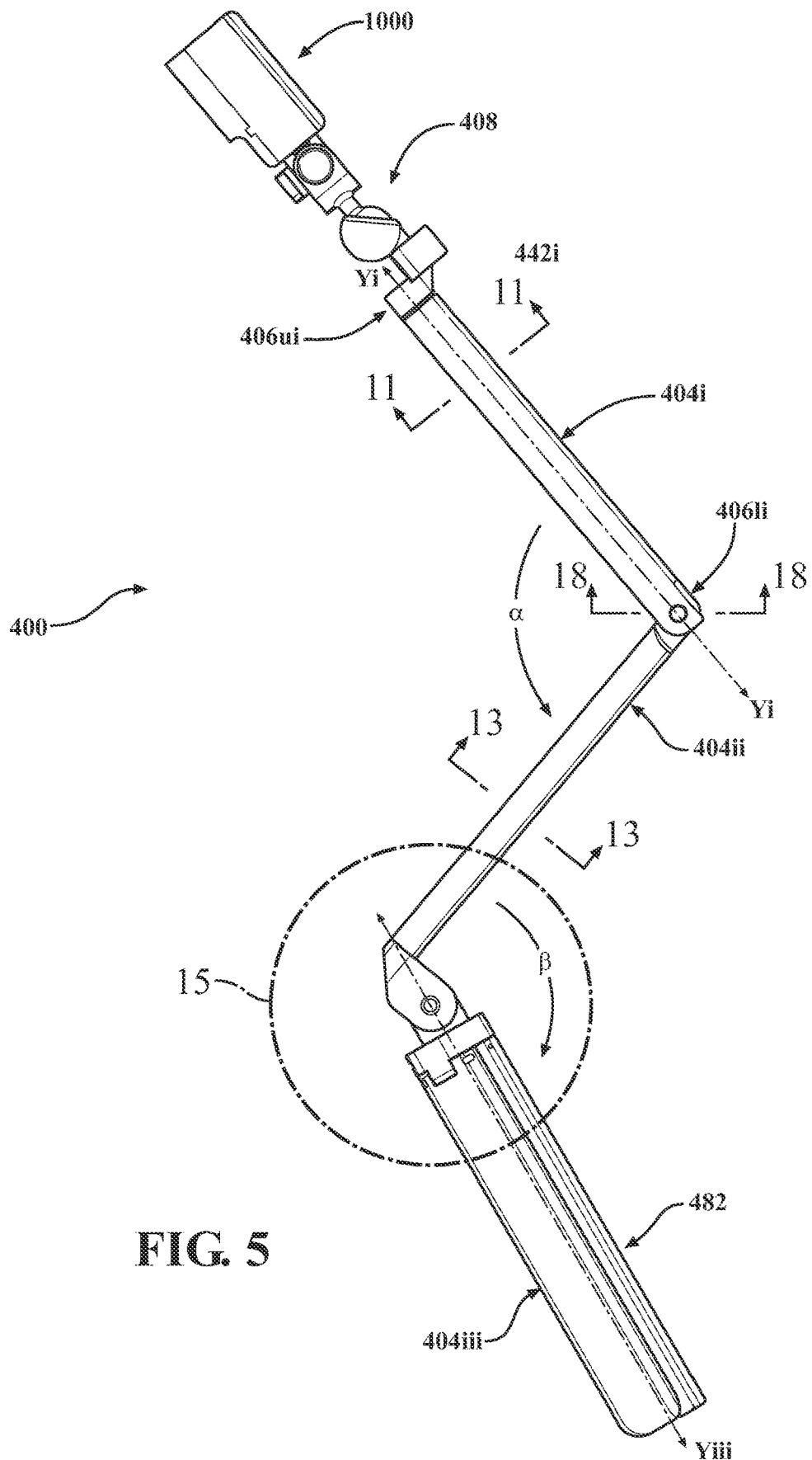
FIG. 5 is a side, plan view of the mounting system shown in an expanded (unfolded) configuration with the arms extended.
Figure 6A:
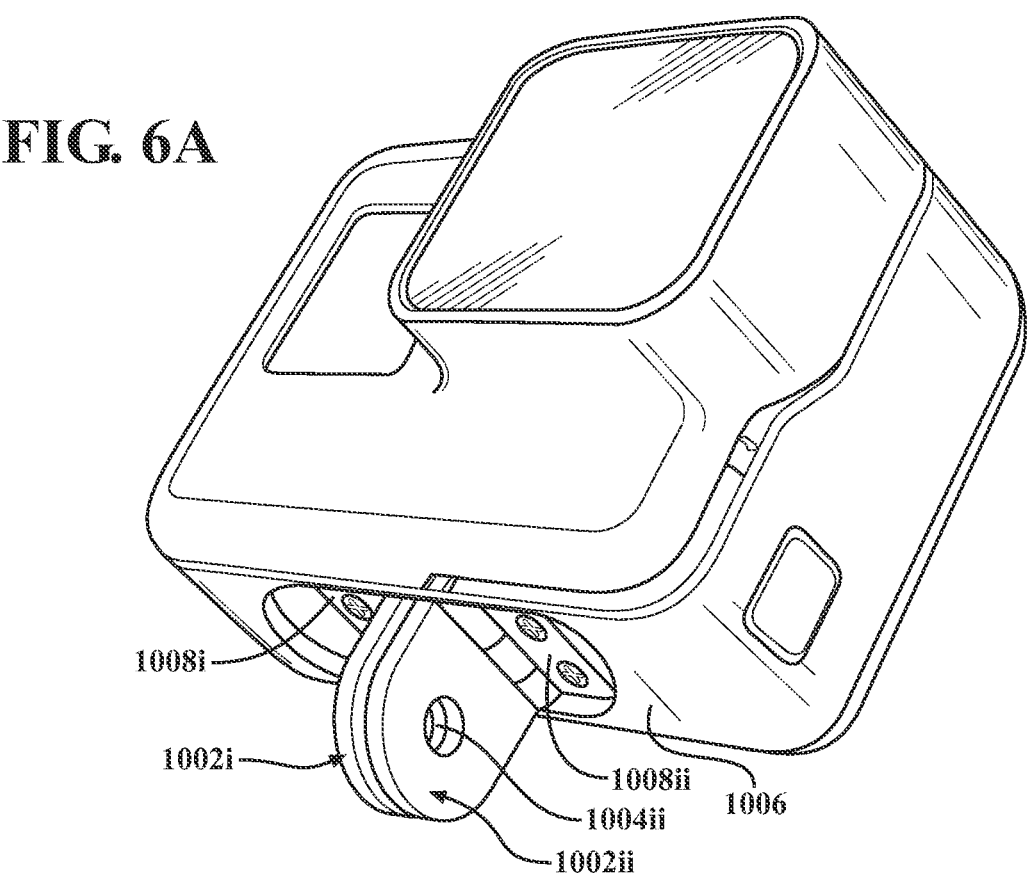
FIG. 6A is a bottom, perspective view of an alternate embodiment of the image capture device including a plurality (set) of fingers to facilitate connection to the mounting system.
Figure 6B:
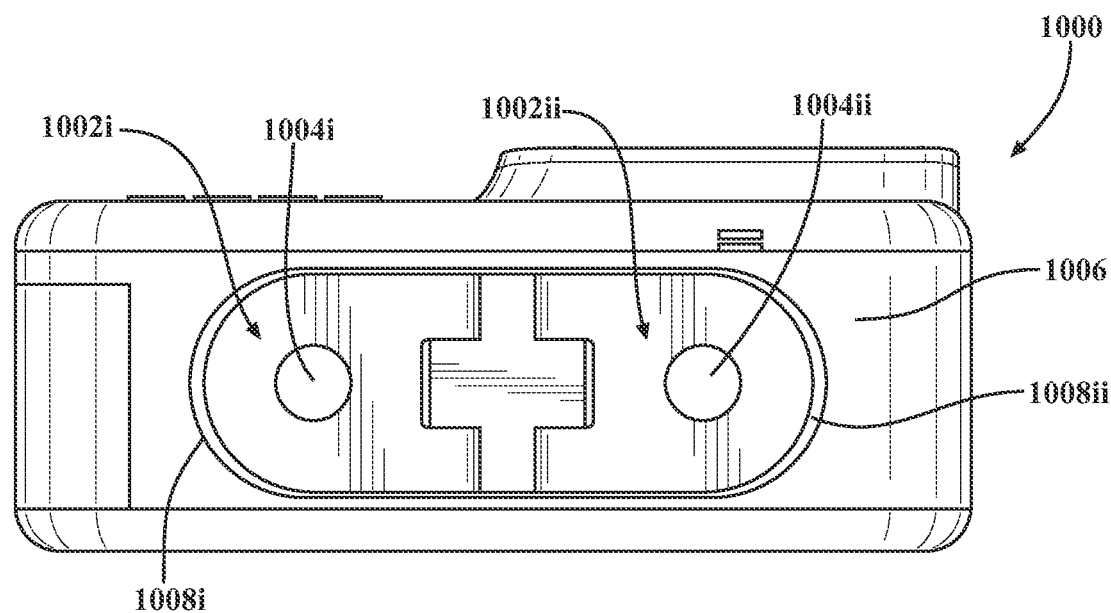
FIG. 6B is a bottom view of the image capture device seen in FIG. 6A with the finger shown collapsed.

Referring now to FIGS. 4 and 5, a mounting system 400 is disclosed that is configured for use with an image capture device. More specifically, FIG. 4 provides a side view of the mounting system 400 shown in a collapsed (folded) configuration, and FIG. 5 provides a side view of the mounting system 400 shown in an expanded (unfolded) configuration. The mounting system 400 may be configured for use with any of the image capture devices described herein, and may be either directly or indirectly connected thereto. For example, FIGS. 6A and 6B provide bottom views of another embodiment of the image capture device, which is identified by the reference character 1000. The image capture device 1000 is substantially similar to, and is representative of, the various embodiments of the image capture devices described hereinabove (e.g., the image capture devices 100, 200), but for the inclusion of fingers 1002i, 1002ii. As such, in the discussion that follows, references to the image capture device will generally be made with reference to the image capture device 1000.

The fingers 1002*i*, 1002*ii* each include an opening 1004, and extend downwardly from a lower surface 1006 of the image capture device 1000 for engagement with a corresponding plurality (set) of fingers 402*i*, 402*ii*, 402*iii* included on the mounting system 400, as described in further detail below. Although shown as including two fingers 1002 in the embodiment of the image capture device 1000 illustrated throughout the figures, it should be appreciated that the particular number of fingers 1002 may be varied in alternate embodiments of the disclosure (e.g., in correspondence with the number of fingers 402 included on the mounting system 400).

As seen in FIGS. 6A and 6B, the fingers 1002*i*, 1002*ii* may be (pivotably) collapsed when not in use to reduce the overall profile of the image capture device 1000. For example, it is envisioned that the fingers 1002*i*, 1002*ii* may be received within corresponding recesses 1008*i*, 1008*ii* formed in the lower surface 1006 of the image capture device 1000 such that the fingers 1002*i*, 1002*ii* are generally flush with the lower surface 1006 in the collapsed configuration. Alternatively, in certain embodiments, it is envisioned that the fingers 1002*i*, 1002*ii* may be fixed (immovable) structures.

Figure 7A:
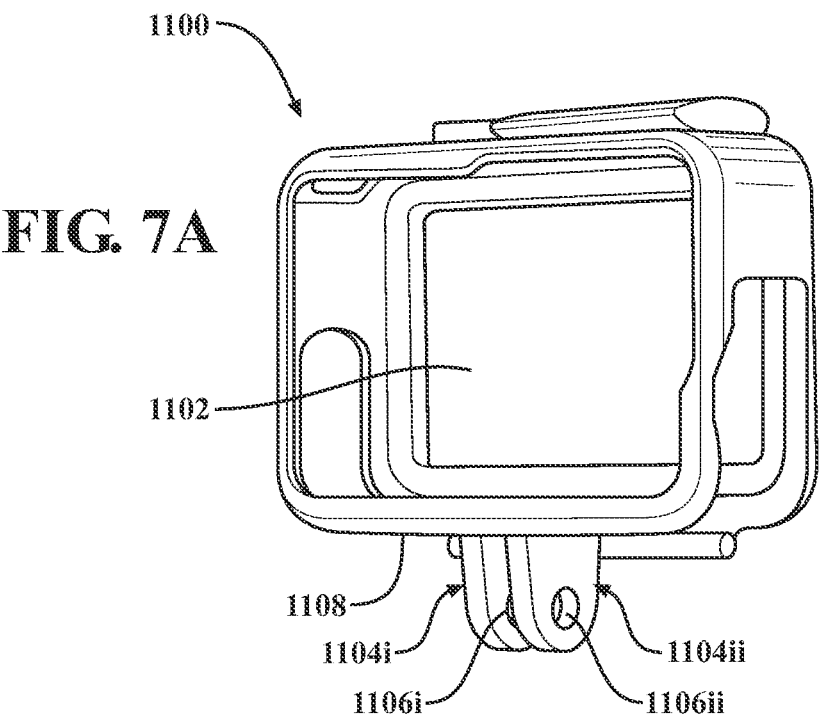
FIG. 7A is a front, perspective view of a housing for use with the image capture device to connect the image capture device to the mounting system.
Figure 7B:
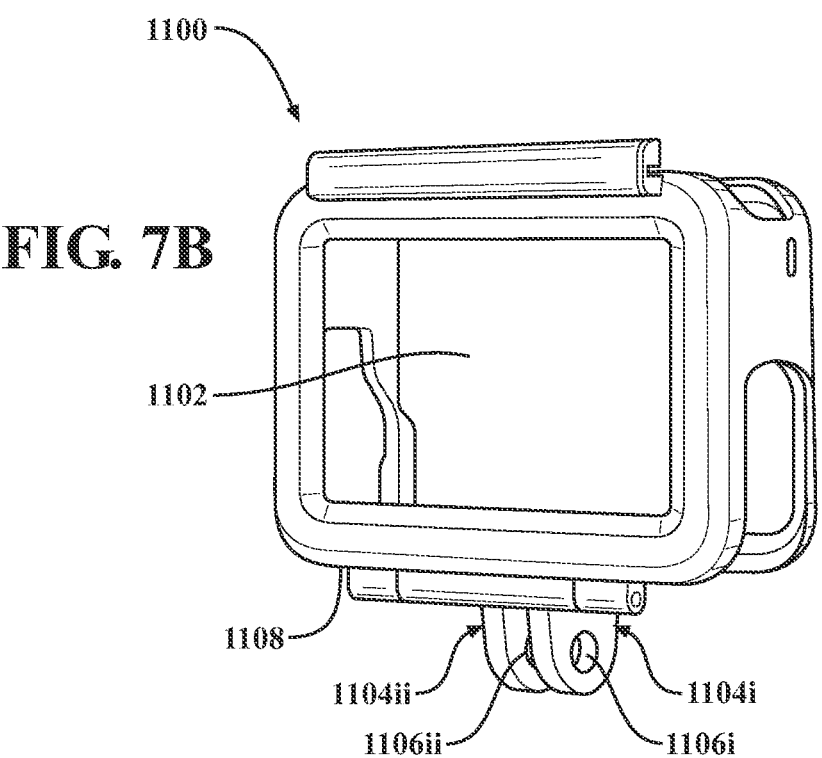
FIG. 7B is a rear, perspective view of the housing seen in FIG. 7A.

Rather than the direct connection established by the fingers 1002*i*, 1002*ii*, it is envisioned that any of the image capture devices described herein (e.g., the image capture devices 100, 200, 1000) may be indirectly connected to the mounting system 400 via a removable housing. FIGS. 7A and 7B, for example, provide respective front and rear perspective views of one embodiment of such a housing, which is identified by the reference character 1100. The housing 1100 defines an internal cavity 1102 that is configured to receive the image capture device 100, 200, 1000, and it is envisioned that the housing 1100 may be either unitary in construction, or that the housing 1100 may include a series of discrete components (e.g., separable front and rear housing portions). The housing 1100 includes a plurality (set) of fingers 1104*i*, 1104*ii* that each include an opening 1106. The fingers 1104*i*, 1104*ii* extend downwardly from a lower surface 1108 of the housing 1100, and are configured for engagement with corresponding structure included on the mounting system 400, which is discussed in detail below. As mentioned in connection with the image capture device 1000, it is envisioned that the fingers 1104, 1104*ii* may be collapsed when not in use so as to reduce the overall profile of the housing 1100, or, alternatively, that the fingers 1104*i*, 1104*ii* may be fixed (immovable) structures.

With reference again to FIGS. 4 and 5, the mounting system 400 includes: a first (upper) arm 404*i* that supports the image capture device 1000 (either directly or indirectly via the housing 1100 seen in FIGS. 7A and 7B); a second (intermediate) arm 404*ii* that is pivotably connected to the first arm 404*i*; and a third (lower) arm 404*iii* that is pivotably connected to the second arm 404*ii*. The arms 404*i*, 404*ii*, 404*iii* are connected in an end-to-end arrangement such that, during expansion and collapse, the arms 404*i*, 404*ii* are relatively movable through a (first) range of angular motion a, and the arms 404*ii*, 404*iii* are relatively movable through a (second) range of angular motion B. Whereas the range of angular motion a is slightly less than 360° (e.g., approximately 330° to approximately) 355°, as discussed in further detail below, the range of angular motion B is approximately 180° (e.g., approximately 150° to approximately) 210°.

Figure 8:
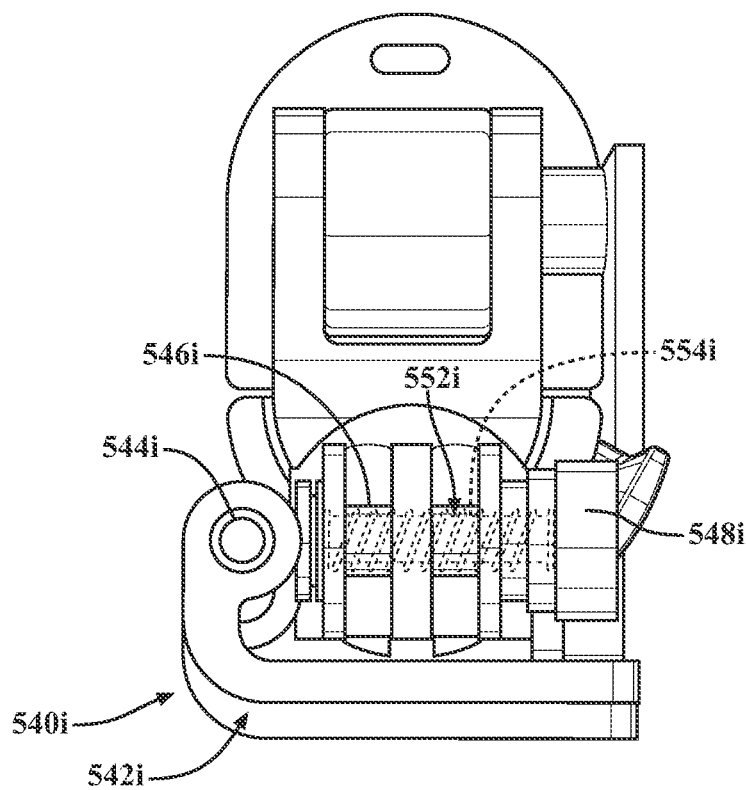
FIG. 8 is a top, plan view of the mounting system shown in the collapsed configuration.
Figure 9:
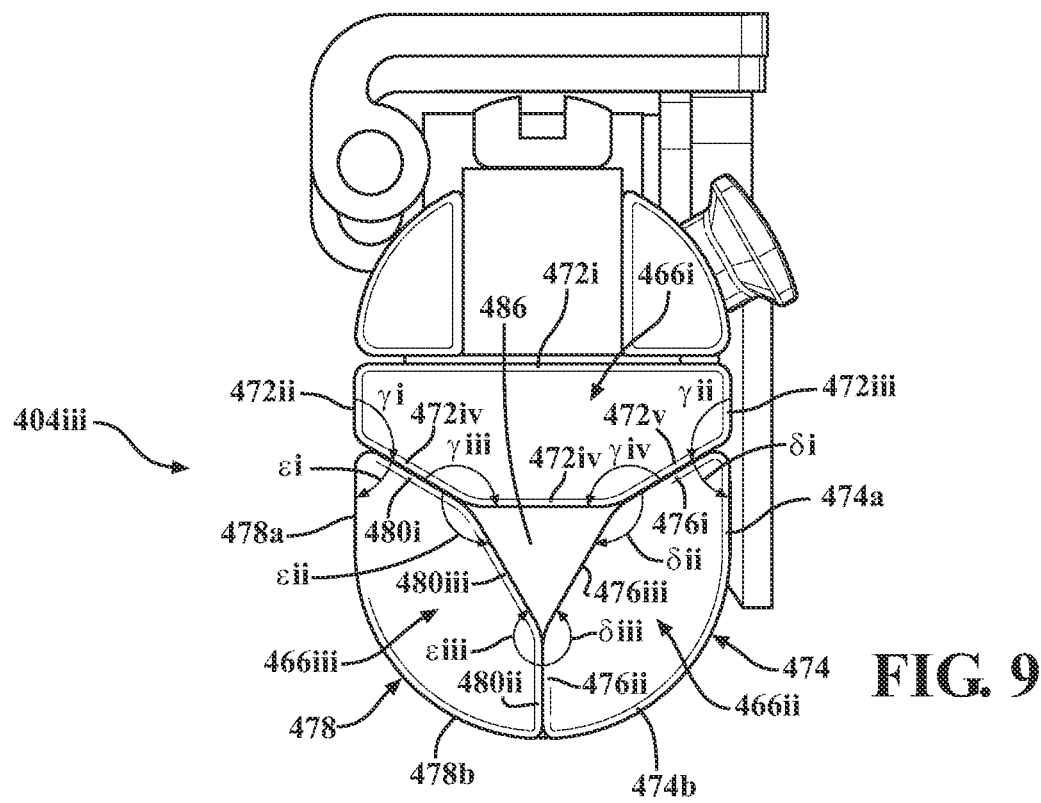
FIG. 9 is a bottom, plan view of the mounting system shown in the collapsed configuration.
Figure 10A:
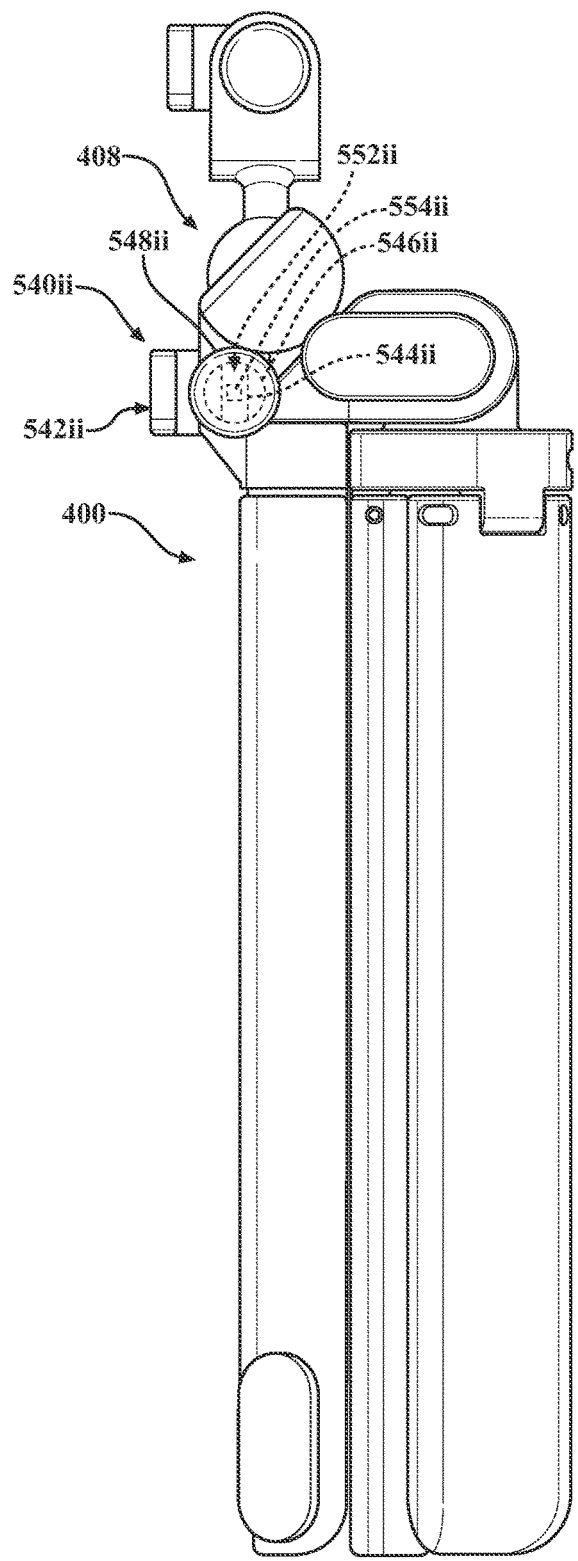
FIG. 10A is a (first) side, plan view of the mounting system shown in the collapsed configuration.
Figure 10B:
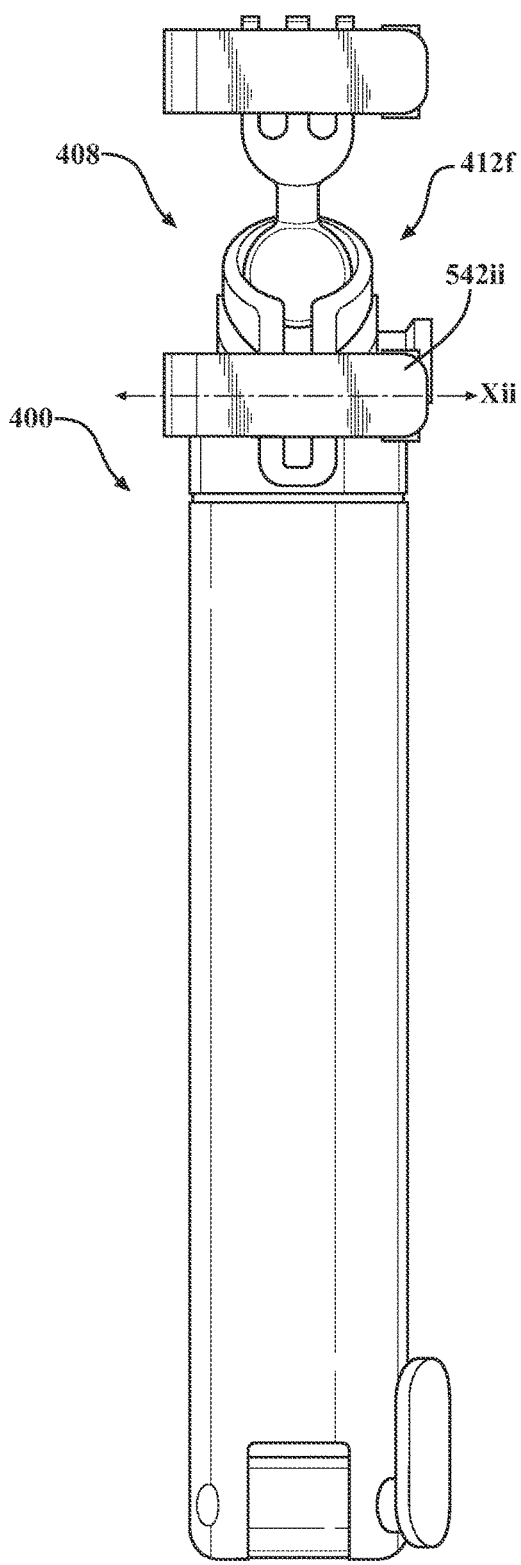
FIG. 10B is a front, plan view of the mounting system shown in the collapsed configuration.
Figure 10C:
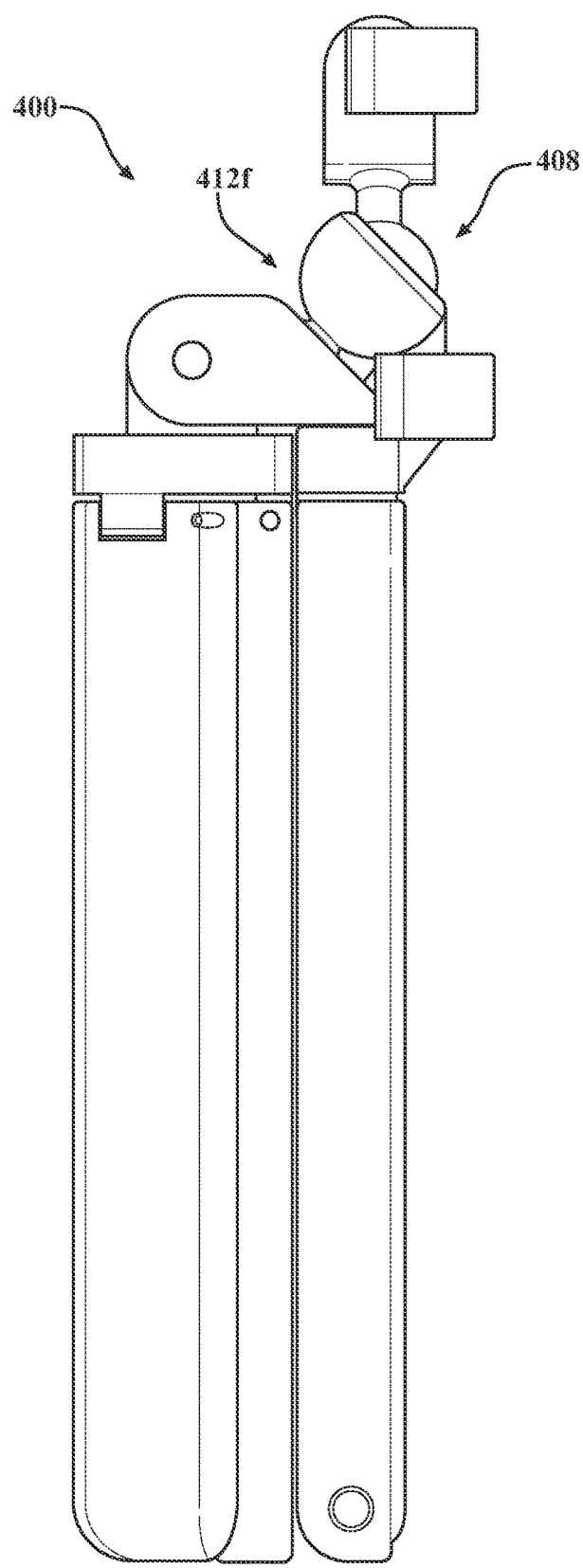
FIG. 10C is a (second) side, plan view of the mounting system shown in the collapsed configuration.
Figure 10D:
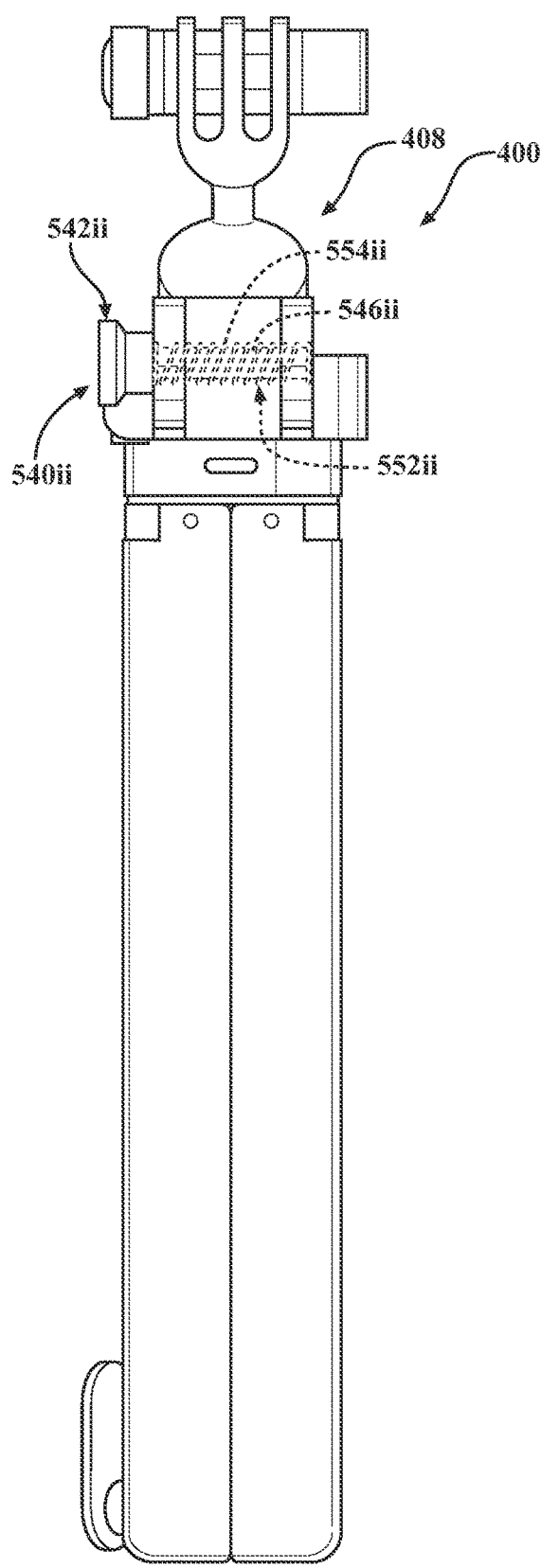
FIG. 10D is a rear, plan view of the mounting system shown in the collapsed configuration.

In the collapsed configuration (FIG. 4), the arms 404*i*, 404*ii*, 404*iii* are positioned in adjacent (e.g., contacting) relation so as to reduce the overall transverse (horizontal) cross-sectional area of the mounting system 400. More specifically, the arms 404*i*, 404*ii*, 404*iii* are oriented in generally parallel relation so as to create a compact profile that enhances pocketability and facilitates storage and/or transport of the mounting system 400, as seen in FIGS. 8 and 9, which offer top and bottom views of the mounting system 400, respectively, and FIGS. 10A-10D, which offer various plan views of the mounting system 400 separated by 90°. As discussed in further detail below, the arms 404*i*, 404*ii*, 404*iii* include complementary configurations that impart a generally ovate transverse (horizontal) cross-sectional profile to the mounting system 400 in the collapsed configuration, which can be seen in FIGS. 8 and 9, for example, which further enhances the pocketability of the mounting system 400.

In moving from the collapsed configuration to the expanded configuration(s), the arms 404*i*, 404*ii*, 404*iii* are movable and positionable in a plurality of relative positions to support the image capture device 1000 in a variety of orientations. In a position of maximum expansion, the arms 404*i*, 404*ii*, 404*iii* are generally alignable along a common longitudinal axis such that the mounting system 400 assumes a generally linear configuration to maximize spacing between the user and the image capture device 1000. In those positions short of maximum expansion, however, one or more of the arms 404*i*, 404*ii*, 404*iii* extends at an angle in relation to one or more of the others.

Figure 11:
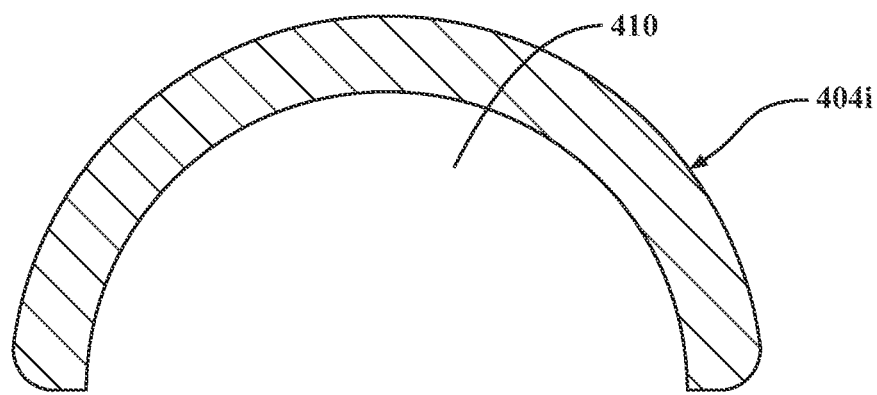

The first arm 404*i* includes a (first) upper end 406*ui* with a connection assembly 408, and an opposite (second) lower end 406*li* that is pivotably connected to the second arm 404*ii*. As seen in FIG. 11, which provides a transverse (horizontal) cross-sectional view of the first arm 404*i* taken through line 11-11 in FIG. 5, the first arm 404*i* includes a generally crescent-shaped transverse (horizontal) cross-sectional configuration defining a channel 410. The channel 410 is configured to accommodate the second arm 404*ii* such that the second arm 404*ii* is positionable within the channel 410 when the mounting system 400 is in the collapsed configuration, as described in further detail below.

Figure 12:
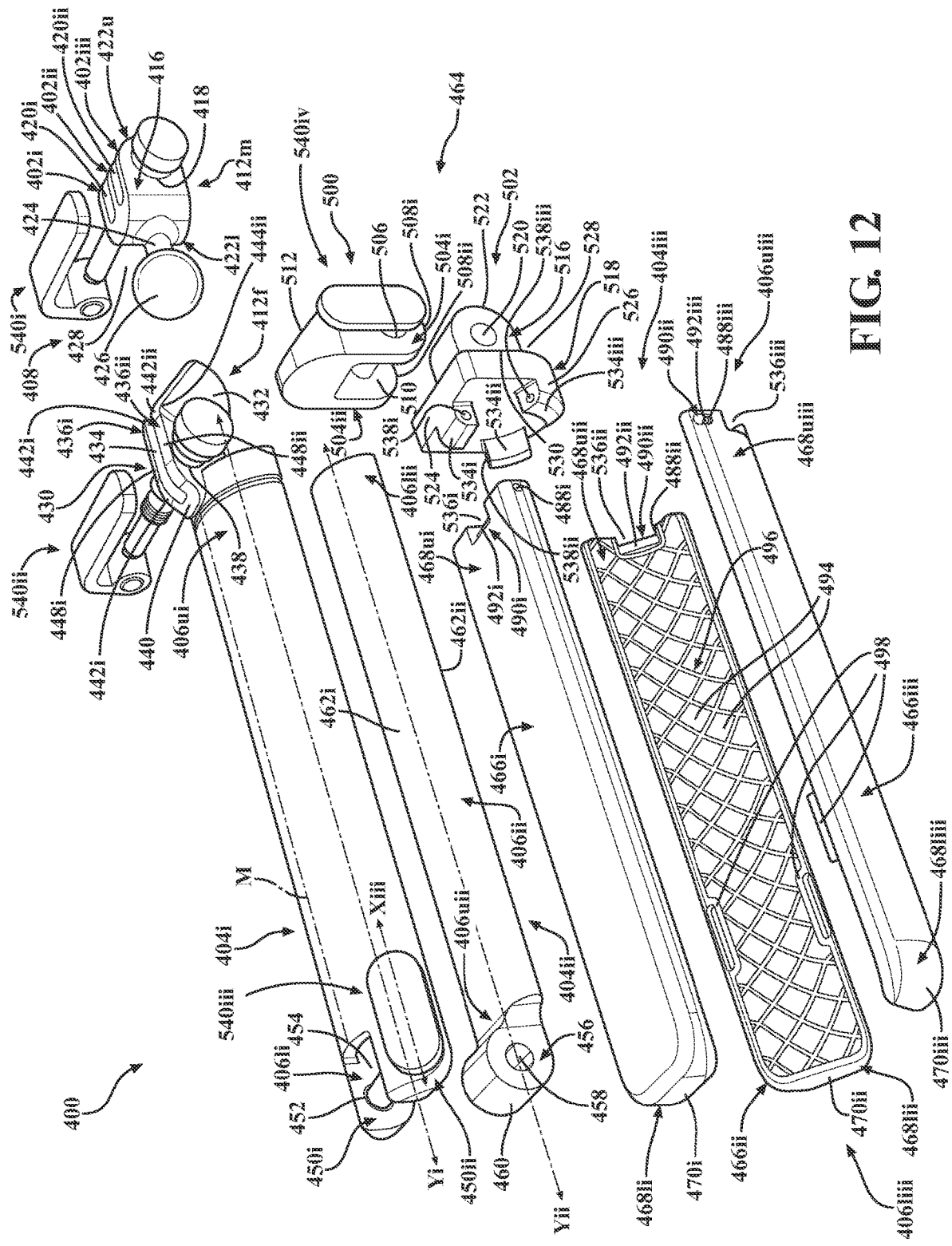
FIG. 12 is a top, perspective view of the mounting system shown with parts separated.

With reference now to FIG. 12 as well, which provides an exploded view of the mounting system 400, the connection assembly 408 will be discussed. The connection assembly 408 is configured to connect the image capture device 1000 and the mounting system 400, and includes respective male and female components 412*m*, 412*f*, which are configured in the form of a ball-and-socket joint 414 in the embodiment of the disclosure shown throughout the figures. It should be appreciated, however, that the specific configuration and/or style of connection of the respective male and female components 412*m*, 412*f* may be varied in alternate embodiments without departing from the scope of the present disclosure.

The male component 412*m* includes a body portion 416 defining a plurality (set) of fingers 402*i*, 402*ii*, 402*iii*. The fingers 402*i*, 402*ii*, 402*iii* each include an opening 418 and define channels 420*i*, 420*ii* that are configured to receive the fingers 1002*i*, 1002*ii* extending from the image capture device 1000 (FIGS. 6A, 6B) (and/or the fingers 1104*i*, 1104*ii* extending from the housing 1100 (FIGS. 7A, 7B)). Although shown as including three fingers 402 and two channels 420 in the embodiment illustrated throughout the figures, it should be appreciated that the particular number of fingers 402 and channels 420 may be varied in alternate embodiments of the disclosure (e.g., depending on the number of fingers 1002, 1104 respectively included on the image capture device 1000 and/or the housing 1100).

The body portion 416 includes (e.g., is formed partially or entirely from) a compliant (e.g., flexible) material, such as plastic, for example, and defines a generally U-shaped longitudinal (vertical) cross-sectional configuration with radiused upper and lower ends 422*u*, 422*l*, respectively. A stem 424 extends from the lower end 422*l* to a generally spherical ball member 426 that is configured for receipt by the female component 412*f*, as described in further detail below. As seen in FIG. 12, a (generally annular) gap 428 is defined between the lower end 422*l* of the body portion 416 and the ball member 426.

In the particular embodiment of the disclosure shown throughout the figures, the body portion 416, the stem 424, and the ball member 426 are shown as being integrally (e.g., monolithically) formed. It should be appreciated, however, that one or more of the body portion 416, the stem 424, and the ball member 426 may be formed as separate, discrete components in alternate embodiments of the disclosure. For example, it is envisioned that the stem 424 may be connected to the body portion 416 and/or to the ball member 426 by a mechanical fastener (e.g., a screw, a pin, a rivet, or the like), via an adhesive, etc. Additionally, while the stem 424 and the ball member 426 are shown as being generally aligned with a central longitudinal axis YB defined by the body portion 416 in the particular embodiment of the disclosure shown throughout the figures, in alternate embodiments, it is envisioned that the stem 424 and the ball member 426 may extend at an angle to the axis YB (i.e., such that the ball member 426 is offset from the body portion 416).

The female component 412*f* includes (e.g., is formed partially or entirely from) a compliant (e.g., flexible) material, such as plastic, for example, which may be the same material used in construction of the male component 412*m*, or a different material. The female component 412*f* is supported by the upper end 406*ui* of the first arm 404*i*, and includes a neck 430 and a socket 432. In the particular embodiment of the disclosure shown throughout the figures, the female component 412*f* (e.g., the neck 430) is shown as being integrally (e.g., monolithically) formed with the upper end 406*ui* of the first arm 404*i*. It should be appreciated, however, that the female component 412*f* and the upper end 406*ui* of the first arm 404*i* may be formed as separate, discrete components in alternate embodiments of the disclosure. For example, it is envisioned that the neck 430 may be connected to the upper end 406*ui* of the first arm 404*i* by a mechanical fastener (e.g., a screw, a pin, a rivet, or the like), via an adhesive, etc.

The neck 430 includes a divide 434 defining opposite struts 436*i*, 436*ii*, each of which includes an opening 438. The struts 436*i*, 436*ii* are connected at a base 440 such that the neck 430 defines a generally U-shaped longitudinal (vertical) cross-sectional configuration. In various embodiments, it is envisioned that the divide 434 may extend entirely through the neck 430, or, alternatively, that the divide 434 may only extend partially through the neck 430, as shown throughout the figures, such that the neck 430 further includes an end wall that connects the struts 436*i*, 436*ii* and extends between the base 440 and the socket 432.

In the illustrated embodiment, the neck 430 defines (first and second) bends 442*i*, 442*ii* (FIG. 12). The bend 442*i* is configured such that the base 440 extends at an angle (e.g., substantially within the range of approximately 30° to approximately) 60° in relation to a longitudinal axis Yi defined by the first arm 404*i*, and the struts 436*i*, 436*ii* extend in generally parallel relation to the longitudinal axis Yi. In alternate embodiments, however, it is envisioned that the bend 442*i* may be eliminated such that the base 440 and the struts 436*i*, 436*ii* each extend in generally parallel relation to the longitudinal axis Yi defined by the first arm 404*i*.

In the embodiment of the disclosure illustrated throughout the figures, the neck 430 is illustrated as being centered with respect to the first arm 404*i* such that the struts 436*i*, 436*ii* span a midline M (FIG. 12) of the first arm 404*i*. In alternate embodiments of the disclosure, however, it is envisioned that the location of the neck 430 may be varied such that the neck 430 is spaced (angularly) from the midline M of the first arm 404*i*.

The socket 432 is supported by the neck 430 adjacent the bend 442*ii*, and is configured to removably receive the male component 412*m* (i.e., the ball member 426) such that the male component 412*m* and the female component 412*f*, and, thus, the image capture device 1000 and the mounting system 400, are relatively rotatable through a 360° range of motion. More specifically, the socket 432 is generally hemispherical in configuration, and extends angularly between the struts 436*i*, 436*ii* defined by the neck 430. Due to the inclusion of the divide 434, and the resultant separation between the struts 436*i*, 436*ii*, the socket 432 extends less than 360°, and defines opposing ends 444*i*, 444*ii*.

Due to inclusion of the bend 442*ii*, which extends between the struts 436*i*, 436*ii* and the ends 444*i*, 444*ii* of the socket 432, the socket 432 extends from the neck 430 at an angle. More specifically, the socket 432 defines an uppermost (quasi-circumferential) surface 446 (FIG. 4) that extends transversely in relation to outer surfaces 448*i*, 448*ii* of the struts 436*i*, 436*ii*, respectively, and the longitudinal axis Yi of the first arm 404*i*. Although shown as extending at an angle of approximately 45°, it should be appreciated that the particular configuration of the socket 432 may be varied so as to alter the orientation of the uppermost surface 446 of the socket 432 in any suitable or desired manner.

During relative movement between the male component 412*m* and the female component 412*f*, the uppermost surface 446 of the socket 432 is positionable within the gap 428 defined between the lower end 422*l* of the body portion 416 and the ball member 426 such that the uppermost surface 446 of the socket 432 is engageable with the stem 424 of the male component 412*m*. It is envisioned that contact between the uppermost surface 446 and the stem 424 may serve to restrict relative movement between the male component 412*m* and the female component 412*f*, and, thus, inhibit (if not entirely prevent) damage to the components 412*m*, 412*f* and/or inadvertent disconnection of the components 412*m*, 412*f*.

In the particular embodiment of the disclosure shown throughout the figures, the socket 432 is shown as being integrally (e.g., monolithically) formed with the neck 430. It should be appreciated, however, that the socket 432 and the neck 430 may be formed as a separate, discrete component in alternate embodiments of the disclosure. For example, it is envisioned that the socket 432 may be connected to the neck 430 by a mechanical fastener (e.g., a screw, a pin, a rivet, or the like), via an adhesive, etc.

With continued reference to FIG. 12, the lower end 406*li* of the first arm 404*i* includes (e.g., is formed partially or entirely from) a compliant (e.g., flexible) material, such as plastic, for example, and includes a forked configuration defining fingers 450*i*, 450*ii* with radiused corner portions, each of which includes an opening 452. The fingers 450*i*, 450*ii* define a (first) receiving space 454 that is configured to receive the second arm 404*ii* such that the arms 404*i*, 404*ii* are relatively movable (pivotable), as described in further detail below.

The second arm 404*ii* includes a (first) upper end 406*uii* that is pivotably connected to the lower end 406*li* of the first arm 404*i*, and a (second) lower end 406*lii* that is pivotably connected to the third arm 404*iii*. More specifically, the upper end 406*uii* of the second arm includes a (first) eye member 456 with a through-hole 458 that is configured for positioning within the receiving space 454 defined by the fingers 450*i*, 450*ii* at the lower end 406*li* of the first arm 404*i*. As seen in FIG. 12, for example, the eye member 456 includes an arcuate outer surface 460 that facilitates relative (pivotable) movement between the first arm 404*i* and the second arm 404*ii*.

Figure 13:
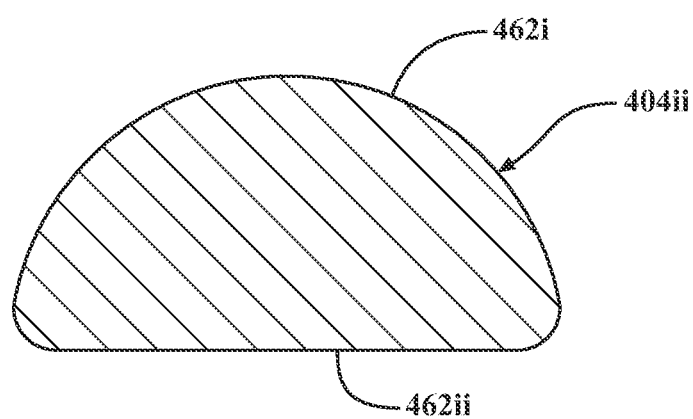
FIG. 13 is a transverse (horizontal) cross-sectional view taken along line 13-13 in FIG. 5.

As seen in FIG. 13, which provides a transverse (horizontal) cross-sectional view of the second arm 404*ii* taken through line 13-13 in FIG. 5, the second arm 404*ii* includes a generally D-shaped transverse (horizontal) cross-sectional configuration defining a (first) outer surface 462*i* that is arcuate in configuration and a (second) outer surface 462*ii* that is generally planar (e.g., flat) in configuration. The outer surface 462*i* defines an outer contour with a curvature corresponding to that defined by an inner contour of the channel 410 in the first arm 404*i* such that the second arm 404*ii* is receivable by the first arm 404*i* during collapse of the mounting system 400. Depending upon the particular configurations of the channel 410 and the second arm 404*ii*, it is envisioned that the second arm 404*ii* may be substantially or entirely received by the first arm 404*i* to further reduce the overall profile of the mounting system 400 in the collapsed configuration. Given the corresponding configurations of the arms 404*i*, 404*ii*, upon positioning (nesting) of the second arm 404*ii* within the channel 410 defined by the first arm 404*i*, the arms 404*i*, 404*ii* collectively define a generally D-shaped transverse (horizontal) cross-sectional configuration that creates one-half of the aforementioned generally ovate transverse (horizontal) cross-sectional profile of the mounting system 400 in the collapsed configuration (FIGS. 8, 9).

While the first arm 404*i* is shown as including the fingers 450*i*, 450*ii* and the second arm 404*ii* is illustrated as including the eye member 456 in the illustrated embodiment, it should be appreciated that the positioning of the fingers 450*i*, 450*ii* and the eye member 456 may be reversed in alternate embodiments without departing from the scope of the present disclosure. More specifically, it is envisioned instead that the first arm 404*i* may include the eye member 456 and that the second arm 404*ii* may include the fingers 450*i*, 450*ii*.

With continued reference to FIG. 12, the third arm 404*iii* includes an upper end 406*uiii* that is pivotably connected to the lower end 406*lii* of the second arm 404*ii* via a knuckle assembly 464, and an opposite lower end 406*liii*, as well as: a (first) segment 466*i*; a (second) segment 466*ii*; and a (third) segment 466*iii*.

The segment 466*i* includes a (first) upper end 468*ui* that is pivotably connected to the knuckle assembly 464 and an opposite (second) lower end 468*li* defining a foot portion 470*i* that is configured to support the segment 466*i* on a surface. With reference to FIG. 9 as well, the segment 466*i* includes a polygonal transverse (horizontal) cross-sectional configuration. More specifically, the segment 466*i* includes: a transverse (horizontal) irregular hexagonal cross-sectional configuration with a (first) side 472*i*; (second and third) sides 472*ii*, 472*iii* that extend in generally parallel relation to each other and from the side 472*i* in generally orthogonal relation; (fourth and fifth) sides 472*iv*, 472*v* that extend inwardly from the sides 472*ii*, 472*iii*, respectively; and a (sixth) side 472*vi* that extends in generally parallel relation to the first side 472*i*. The sides 472*iv*, 472*v* extend from the sides 472*ii*, 472*iii* so as to define angles γi, γii, respectively, and the side 472*vi* connects the sides 472*iv*, 472*v* so as to define angles γiii, γiv, respectively.

The segment 466*ii* includes a (first) upper end 468*uii* that is pivotably connected to the knuckle assembly 464 and an opposite (second) lower end 468*lii* defining a foot portion 470*ii* that is configured to support the segment 466*ii* on a surface. As seen in FIG. 9, the second segment 466*ii* includes a non-polygonal transverse (horizontal) cross-sectional configuration. More specifically, the second segment 466*ii* includes: an outer wall 474; (first and second) sides 476*i*, 476*ii* that extend inwardly from the outer wall 474; and a (third) side 476*iii* that extends between the sides 476*i*, 476*ii*. The outer wall 474 includes a linear portion 474*a* and a non-linear (arcuate) portion 474*b* that extends from the linear portion 474*a* so as to define an arc of approximately 90°. The side 476*i* extends from the linear portion 474*a* of the outer wall 474 so as to define an angle di that is supplementary to the angle γii, and the side 476*ii* extends from the non-linear portion 474*b* in generally orthogonal relation. The side 476*iii* connects the sides 476*i*, 476*ii* so as to define angles δii, δiii, respectively, wherein the angle dii corresponds to (e.g., is similar or identical to) the angle γiv.

The segment 466*iii* is identical to the second segment 466*ii*, and includes a (first) upper end 468*uiii* that is pivotably connected to the knuckle assembly 464 and an opposite (second) lower end 468*liii* defining a foot portion 470*iii* that is configured to support the segment 466*iii* on a surface. As seen in FIG. 9, the third segment 466*iii* includes a non-polygonal transverse (horizontal) cross-sectional configuration. More specifically, the third segment 466*iii* includes: an outer wall 478; (first and second) sides 480*i*, 480*ii* that extend inwardly from the outer wall 478; and a (third) side 480*iii* that extends between the sides 480*i*, 480*ii*. The outer wall 478 includes a linear portion 478*a* and a non-linear (arcuate) portion 478*b* that extends from the linear portion 478*a* so as to define an arc of approximately 90°. The side 480*i* extends from the linear portion 478*a* of the outer wall 478 so as to define an angle si that is supplementary to the angle γi, and the side 480*ii* extends from the non-linear portion 478*b* in generally orthogonal relation. The side 480*iii* connects the sides 480*i*, 480*ii* so as to define angles εii, εiii, respectively, wherein the angle εii corresponds to (e.g., is similar or identical to) the angle γiii and the angle εiii is identical to the angle δiii.

In various embodiments of the disclosure, it is envisioned that the values for the angles γ, δ, ε may be altered to achieve any desired transverse (horizontal) cross-sectional configurations for the segments 466*i*, 466*ii*, 466*iii*.

Figure 14:
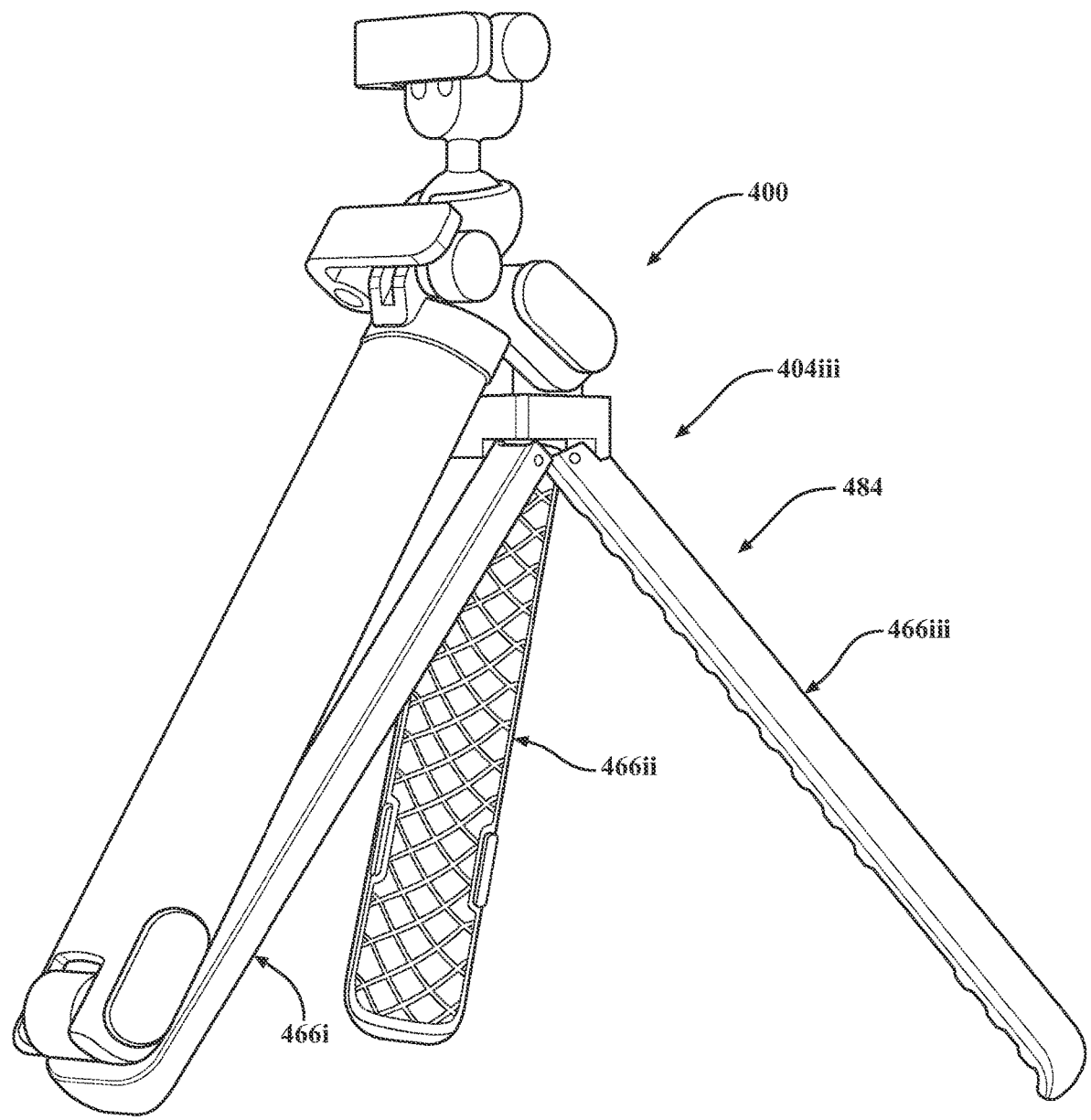
FIG. 14 is a side, perspective view of the mounting system shown in the collapsed configuration with the third arm shown in an open configuration and functioning as a stand.

The third arm 404*iii* is reconfigurable between a closed configuration, in which the segments 466*i*, 466*ii*, 466*iii* are positioned in generally adjacent relation so as to define a handle 482, as seen in FIG. 5, and an open configuration, in which the segments 466*i*, 466*ii*, 466*iii* are separated from each other so as to define a stand 484 (e.g., a tripod), as seen in FIG. 14, which provides a side, perspective view of the mounting system 400 shown in the collapsed configuration with the third arm shown in the open configuration. The third arm 404*iii*, thus, serves dual purposes. As can be appreciated through reference to FIG. 5, in the closed configuration, the segments 466*i*, 466*ii*, 466*iii* each extend in generally parallel relation to a longitudinal axis Yiii defined by the third arm 404*iii*, and the handle 482 defines a generally D-shaped transverse (horizontal) cross-sectional configuration including a generally triangular void 486 (FIG. 9) that is collectively defined by the side 472*vi* of the segment 466*i*, the side 476*iii* of the segment 466*ii*, and the side 480*iii* of the segment 466*iii*. The generally D-shaped transverse (horizontal) cross-sectional configuration of the third arm 404*iii* supplements the generally D-shaped transverse (horizontal) cross-sectional configuration defined by the arms 404*i*, 404*ii* upon positioning (nesting) of the second arm 404*ii* within the channel 410 (FIG. 11) defined by the first arm 404*i*, and completes the aforementioned generally ovate transverse (horizontal) cross-sectional profile of the mounting system 400 in the collapsed configuration (FIGS. 8, 9).

To facilitate movement of the third arm 404*iii* between the closed configuration and the open configuration, the segments 466*i*, 466*ii*, 466*iii* are each pivotably connected to the knuckle assembly 464. More specifically, the upper end 468*ui* of the segment 466*i* includes a through-hole 488*i* that is configured to receive a pivot member 490*i* (e.g., a pin 492*i*); the upper end 468*uii* of the segment 466*ii* includes a through-hole 488*ii* that is configured to receive a pivot member 490*ii* (e.g., a pin 492*ii*); and the upper end 468*uiii* of the segment 466*iii* includes a through-hole 488*iii* that is configured to receive a pivot member 490*iii* (e.g., a pin 492*iii*). The pivot members 490*i*, 490*ii*, 490*iii* extend through the through-holes 488*i*, 488*ii*, 488*iii* in the segments 466*i*, 466*ii*, 466*iii*, respectively, and into corresponding structures defined by the knuckle assembly 464, as described in further detail below.

As seen in FIG. 12, for example, in certain embodiments of the disclosure, the segments 466*i*, 466*ii*, 466*iii* may include reliefs 494 defining an internal webbing 496. The webbing 496 reduces the weight of the third arm 404*iii*, and, thus, the mounting system 400 as a whole, without sacrificing strength and rigidity.

With continued reference to FIG. 12, in certain embodiments, the segments 466*i*, 466*ii*, 466*iii* of the third arm 404*iii* may include a plurality (set) of bumpers (spacers) 498. The bumpers 498 are positioned at equivalent (or generally equivalent) heights such that adjacent bumpers 498 are positioned for contact with one another when the third arm 404*iii* is in the closed configuration, thereby facilitating registration of the segments 466*i*, 466*ii*, 466*iii* and inhibiting relative movement between the segments 466*i*, 466*ii*, 466*iii*. The bumpers 498, thus, serve to enhance the stability of the third arm 404*iii* such that the handle 482 (FIG. 5) has the tactile feel of a solid (e.g., unitary) component. While it is contemplated that each of the arms 404*i*, 404*ii*, 404*iii* may include a pair of bumpers 498, as can be appreciated through reference to FIG. 12, for example, it should be appreciated that the number of bumpers 498 included on each of the arms 404*i*, 404*ii*, 404*iii* may be varied without departing from the scope of the present disclosure.

With reference now to FIGS. 4, 12, and 15, the knuckle assembly 464 of the third arm 404*iii* will be discussed. FIG. 15 provides an enlargement of the area of detail identified in FIG. 5, and illustrates the aforementioned pivotable connection between the second arm 404*ii* and the third arm 404*iii* established by the knuckle assembly 464. More specifically, the knuckle assembly 464 includes a yoke component 500 that is connected to the lower end 406*lii* of the second arm 404*ii*, and an eye assembly 502 that is connected to the yoke component 500 and is configured for engagement with (receipt by) the yoke component 500. It should be appreciated, however, that the positioning of the yoke component 500 and the eye assembly 502 may be reversed in alternate embodiments without departing from the scope of the present disclosure. More specifically, it is envisioned instead that the yoke component 500 may be connected to the third arm 404*iii* and that the eye assembly 502 may be connected to the second arm 404*ii*.

The yoke component 500 includes (e.g., is formed partially or entirely from) a compliant (e.g., flexible) material, such as plastic, for example, and defines a generally U-shaped transverse (horizontal) cross-sectional configuration. More specifically, the yoke component 500 includes a forked configuration defining fingers 504*i*, 504*ii* each having an opening 506 and radiused ends 508*i*, 508*ii*, respectively. The fingers 504*i*, 504*ii* define a (second) receiving space 510 that is configured to receive the eye assembly 502 to allow for relative (pivotable) movement between the yoke component 500 and the eye assembly 502, as described in further detail below.

The yoke component 500 includes an (upper) beveled surface 512 (FIGS. 4, 15); an upper, horizontal (first) contact surface 514*u* that is collectively defined by upper (outer) edges of the fingers 504*i*, 504*ii*, respectively; and a lower, horizontal contact surface 514*l* that is collectively defined by lower (inner) edges of the fingers 504*i*, 504*ii*, respectively. The beveled surface 512 extends at an angle in relation to both a longitudinal axis Yii of the second arm 404*ii* and the contact surfaces 514*u*, 514*l*, and creates a negative space that accommodates the female component 412*f* of the connection assembly 408 when the mounting system 400 is in the collapsed configuration, as can be appreciated through reference to FIG. 4, for example.

In the particular embodiment of the disclosure shown throughout the figures, the yoke component 500 is shown as being integrally (e.g., monolithically) formed with the lower end 406*lii* of the second arm 404*ii*. It should be appreciated, however, that, in alternate embodiments of the disclosure, the yoke component 500 may be formed as a separate, discrete component that may be connected to the second arm 404*ii*. For example, it is envisioned that the yoke component 500 and the second arm 404*ii* may be connected via an adhesive or welding, through the use of mechanical fasteners (e.g., screws, pins, rivets, or the like), etc.

The eye assembly 502 includes a (second) eye member 516, and a base component 518 that supports the eye member 516. The eye member 516 includes a through-hole 520, and is configured for positioning within the receiving space 510 defined by the fingers 504*i*, 504*ii* of the yoke component 500. As seen in FIG. 12, for example, the eye member 516 includes an arcuate outer surface 522 that facilitates relative (pivotable) movement between the yoke component 500 and the eye assembly 502, and, thus, relative (pivotable) movement between the second arm 404*ii* and the third arm 404*iii*.

The base component 518 includes a generally planar end wall 524 and an arcuate outer wall 526, and, thus, defines a generally D-shaped transverse (horizontal) cross-sectional configuration, as seen in FIG. 12, for example. The eye member 516 is positioned on the base component 518 so as to define a peripheral space 528, which is also generally D-shaped in configuration, that accommodates the yoke component 500 such that the fingers 504*i*, 504*ii* of the yoke component 500 are positioned radially outward of the eye member 516. More specifically, the base component 518 defines an upper, horizontal (second) contact surface 530 (FIGS. 4, 12, 15) that extends in generally orthogonal relation to the longitudinal axes Yii, Yiii defined by the first and second arms 404*i*, 404*ii*, respectively, and in generally parallel relation to the contact surfaces 514*u*, 514*l* defined by the fingers 504*i*, 504*ii* of the yoke component 500 when the mounting system 400 is in the collapsed configuration.

The contact surface 514*u* defined by the fingers 504*i*, 504*ii* and the contact surface 530 defined by the base component 518 collectively function to define a hard stop 532 (FIG. 15) that restricts relative movement between the arms 404*ii*, 404*iii* to a range of motion less than 360° such that movement beyond a threshold position is inhibited (if not entirely prevented). In the particular embodiment of the disclosure shown throughout the figures, for example, the contact surfaces 514*u*, 530 are configured for contact with each other such that the hard stop 532 limits the range of relative motion between the arms 404*ii*, 404*iii* to approximately 180° (e.g., approximately 150° to approximately) 210°. It should be appreciated, however, that this range of motion may be increased in alternate embodiments of the disclosure by altering the specific configuration of the knuckle assembly 464 (e.g., the yoke component 500 and/or the eye assembly 502).

The base component 518 further includes brackets 534 that facilitate connection of the third arm 404*iii* to the knuckle assembly 464. More specifically, the base component 518 includes: a (first) bracket 534*i* that is configured for positioning within a notch 536*i* defined in the upper end 468*ui* of the segment 466*i*; a (second) bracket 534*ii* that is configured for positioning within a notch 536*ii* defined in the upper end 468*uii* of the segment 466*ii*; and a (third) bracket 534*iii* that is configured for positioning within a notch 536*iii* defined in the upper end 468*uiii* of the segment 466*iii*. As seen in FIG. 12, for example, in the particular embodiment of the disclosure illustrated, the brackets 534*i*, 534*ii*, 534*iii* are angularly separated by approximately 60°. It should be appreciated, however, that the spacing and/or the number of brackets 534 may be altered in various embodiments without departing from the scope of the present disclosure (e.g., depending upon the number and/or the location of the segments 466 of the third arm 404*iii*).

The bracket 534*i* includes a through-hole 538*i* that is configured to receive the pivot member 490*i* so as to allow for relative (pivotable) movement between the bracket 534*i* and the segment 466*i* of the third arm 404*iii*. Similarly, the bracket 534*ii* includes a through-hole 538*ii* that is configured to receive the pivot member 490*ii* so as to allow for relative (pivotable) movement between the bracket 534*ii* and the segment 466*ii* of the third arm 404*iii*, and the bracket 534*iii* includes a through-hole 538*iii* that is configured to receive the pivot member 490*iii* so as to allow for relative (pivotable) movement between the bracket 534*iii* and the segment 466*iii* of the third arm 404*iii*.

In certain embodiments, it is envisioned that the brackets 534*i*, 534*ii*, 534*iii* (e.g., the through-holes 538*i*, 538*ii*, 538*iii*) may be configured to receive the respective pivot members 490*i*, 490*ii*, 490*iii* in an interference fit so as to allow for more precise (e.g., incremental) positioning of the segments 466*i*, 466*ii*, 466*iii* of the third arm 404*iii* when the third arm 404*iii* is in the open configuration (i.e., when the third arm 404*iii* is functioning as the stand 484 (FIG. 14)).

With reference now to FIGS. 8, 10A-10D, 12, and 16-21, the mounting system 400 includes a plurality (set) of cam fasteners 540 that are used to connect the various components of the mounting system 400. More specifically, in the embodiment of the disclosure shown throughout the figures, the mounting system 400 includes: a (first) cam fastener 540*i* (FIGS. 12, 16, 17) that is associated with the male component 412*m* of the connection assembly 408; a (second) cam fastener 540*ii* (FIGS. 10A-10D, 12) that is associated with the female component 412*f* of the connection assembly 408; a (third) cam fastener 540*iii* (FIGS. 12, 18, 19) that is associated with the arms 404*i*, 404*ii*; and a (fourth) cam fastener 540*iv* (FIGS. 12, 20, 21) that is associated with the knuckle assembly 464, and, thus, the respective second and third arms 404*ii*, 404*iii*.

The cam fastener 540*i* includes: a lever (latch) 542*i* with a cam member 544*i*; a shaft 546*i* that extends from the lever 542*i*; and an end cap 548*i* that receives the shaft 546*i*. The shaft 546*i* includes a threaded end 550*i* that engages corresponding threading (not shown) in the end cap 548*i* such that the end cap 548*i* is rotatably connectable to and disconnectable from the shaft 546*i*. The shaft 546*i* is configured for insertion through the openings 418 (FIG. 12) in the fingers 402*i*, 402*ii*, 402*iii* of the male component 412*m* of the connection assembly 408, and through the openings 1004 (FIGS. 6A, 6B) in the fingers 1002*i*, 1002*ii* of the image capture device 1000 (or the openings 1106 (FIGS. 7A, 7B) in the fingers 1104*i*, 1104*ii* on the housing 1100). Upon insertion of the shaft 546*i* through the fingers 402*i*, 402*ii*, 402*iii* and the fingers 1002*i*, 1002*ii* (or the fingers 1104*i*, 1104*ii*), the end cap 548*i* is connectable to the shaft 546*i* such that the lever 542*i* and the end cap 548*i* are positioned on opposite sides of the body portion 416 of the male component 412*m*.

The cam fastener 540*i* is movable (adjustable) between unlocked and locked positions, seen in FIGS. 16 and 17, respectively, which provide front, plan views illustrating connection of the image capture device 1000 (and/or the housing 1100 (FIGS. 7A, 7B)) to the mounting system 400. When the cam fastener 540*i* is in the unlocked position, the lever 542*i* extends along an axis Xi that is in generally orthogonal relation to both the longitudinal axis Yi of the first arm 404*i* (FIG. 12) and the shaft 546*i*. To move the cam fastener 540*i* into the locked position, the lever 542*i* is rotated approximately 90°. When the cam fastener 540*i* is in the locked position, the axis Xi defined by the lever 542*i* extends in generally orthogonal relation to the longitudinal axis Yi of the first arm 404*i*, but in generally parallel relation to the shaft 546*i*.

As the cam fastener 540*i* moves from the unlocked position to the locked position, the cam member 544*i* is caused to rotate via connection to the lever 542*i*, which results in linear (axial, longitudinal) movement of the shaft 546*i* in a direction away from the end cap 548*i*. The threaded engagement between the shaft 546*i* and the end cap 548*i*, however, inhibits (if not entirely prevents) relative movement between the shaft 546*i* and the end cap 548*i*, whereby a compressive force is applied to the fingers 402*i*, 402*ii*, 402*iii* of the male component 412*m*. The compressive force applied to the fingers 402*i*, 402*ii*, 402*iii* causes inward deflection (e.g., towards the finger 402*ii*), and, thus, compression of the fingers 1002*i*, 1002*ii* on the image capture device 1000 (or the fingers 1104*i*, 1104*ii* on the housing 1100). Upon sufficient linear movement of the lever 542*i* and the shaft 546*i*, and sufficient rotational movement of the cam member 544*i*, the camming effect created by the cam member 544*i* is overcome, which maintains the locked position of the cam fastener 540*i*.

As the cam fastener 540*i* moves from the locked position to the unlocked position, the cam member 544*i* rotates, and the shaft 546*i* moves linearly in a direction towards the end cap 548*i*, which alleviates the compressive force applied to the fingers 402*i*, 402*ii*, 402*iii* of the male component 412*m* and the fingers 1002*i*, 1002*ii* on the image capture device 1000 (or the fingers 1104*i*, 1104*ii* on the housing 1100). Upon sufficient linear movement of the lever 542*i* and the shaft 546*i*, and sufficient rotational movement of the cam member 544*i*, the camming effect created by the cam member 544$i$ is overcome, which maintains the unlocked position of the cam fastener 540$i$.

In certain embodiments, such as that shown throughout the figures, it is envisioned that the cam fastener 540$i$ may further include a biasing member 552$i$ to bias the cam fastener 540$i$ towards the unlocked position. For example, it is envisioned that the biasing member 552$i$ may include a spring 554$i$ that is positioned either internally within or externally about the shaft 546$i$.

To adjust the engagement between the fingers 402$i$, 402$ii$, 402$iii$ of the male component 412$m$ and the fingers 1002$i$, 1002$ii$ on the image capture device 1000 (or the fingers 1104$i$, 1104$ii$ on the housing 1100) when the cam fastener 540$i$ is in the locked position, it is envisioned that the end cap 548$i$ may be rotated. More specifically, tightening the end cap 548$i$ (via rotation in a first direction) will result in additional linear movement of the shaft 546$i$ towards the end cap 548$i$, thereby increasing the compressive force applied to the fingers 402$i$, 402$ii$, 402$iii$ and the fingers 1002$i$, 1002$ii$ (or the fingers 1104$i$, 1104$ii$). Oppositely, loosening the end cap 548$i$ (via rotation in a second direction opposite to the first direction) will result in linear movement of the shaft 546$i$ away from the end cap 548$i$, thereby decreasing the compressive force applied to the fingers 402$i$, 402$ii$, 402$iii$ and the fingers 1002$i$, 1002$ii$ (or the fingers 1104$i$, 1104$ii$). To facilitate rotation of the end cap 548$i$, it is envisioned that the end cap 548$i$ may be configured for manual engagement. Additionally, or alternatively, it is envisioned that the end cap 548$i$ may be configured for engagement with a tool (not shown), such as a screwdriver or the like.

In certain embodiments, it is envisioned that the end cap 548$i$ may be captive to the mounting system 400 such that the end cap 548$i$ is nonremovably connected to the male component 412$m$ of the connection assembly 408, but rotatable in relation to the male component 412$m$ in the manner discussed above (e.g., to guard against misplacement or loss of the end cap 548$i$).

The cam fastener 540$ii$ is substantially similar to the cam fastener 540$i$ in both structure and operation, and includes: a lever (latch) 542$ii$ with a cam member 544$ii$ (FIG. 10A); a shaft 546$ii$ that extends from the lever 542$ii$; and an end cap 548$ii$ that receives the shaft 546$ii$. The shaft 546$ii$ is configured for insertion through the openings 438$i$ in the struts 436$i$, 436$ii$ of the neck 430 such that the lever 542$ii$ and the end cap 548$ii$ are positioned on opposite sides of the neck 430, and the shaft 546$ii$ includes a threaded end 550$ii$ that engages corresponding threading (not shown) in the end cap 548$ii$. As discussed above in connection with the cam fastener 540$i$, it is envisioned that the shaft 546$ii$ and the end cap 548$ii$ may be removably connected to each other (via relative rotation between the shaft 546$ii$ and the end cap 548$ii$). Alternatively, as illustrated in connection with the embodiment seen throughout the figures, in contrast, it is envisioned that the shaft 546$ii$ and the end cap 548$ii$ may be configured such that the shaft 546$ii$ and the end cap 548$ii$ are not disconnectable, whereby the cam fastener 540$ii$ may be captive to (nonremovable from) the female component 412$f$ of the connection assembly 408 in its entirety. As such, it is envisioned that the cam fasteners 540$i$, 540$ii$ may be either identical or non-identical.

The cam fastener 540$ii$ is movable between an unlocked position and a locked position, which allows for not only connection and disconnection of the male component 412$m$ and the female component 412$f$, but regulation of the position of the male component 412$m$, and, thus, the image capture device 1000 (or the housing 1100), in relation to the female component 412$f$, and, thus, the first arm 404$i$. When the cam fastener 540$ii$ is in the unlocked position, the lever 542$ii$ extends along an axis Xii that is generally orthogonal in relation to both the longitudinal axis Yi of the first arm 404$i$ and the shaft 546$ii$. To move the cam fastener 540$ii$ into the locked position, the lever 542$ii$ is rotated approximately 90° such that the axis Xii defined by the lever 542$ii$ extends in generally orthogonal relation to the longitudinal axis Yi of the first arm 404$i$, but in generally parallel relation to the shaft 546$ii$. When the cam fasteners 540$i$, 540$ii$ are each in the locked position, the axes Xi, Xii respectively defined by the levers 542$i$, 542$ii$ extend in generally parallel relation.

As the cam fastener 540$ii$ moves from the unlocked position to the locked position (e.g., after insertion of the ball member 426 into the socket 432), the cam member 544$ii$ is caused to rotate via connection to the lever 542$ii$, which results in linear (axial, longitudinal) movement of the shaft 546$ii$ in a direction away from the end cap 548$ii$. The engagement between the shaft 546$ii$ and the end cap 548$ii$, however, inhibits (if not entirely prevents) relative movement between the shaft 546$ii$ and the end cap 548$ii$, whereby a compressive force is applied to the struts 436$i$, 436$ii$ of the neck 430. The compressive force applied to the struts 436$i$, 436$ii$ causes inward deflection of the struts 436$i$, 436$ii$ (i.e., movement towards each other), and, thus, the ends 444$i$, 444$ii$ of the socket 432. As the ends 444$i$, 444$ii$ of the socket 432 are deflected inwardly, the socket 432 is compressed into secured, frictional engagement with the ball member 426, which allows for not only connection of the male component 412$m$ to the female component 412$f$, but adjustment in the relative positioning between the image capture device 1000 (or the housing 1100) and the first arm 404$i$. Upon sufficient linear movement of the lever 542$ii$ and the shaft 546$ii$, and sufficient rotational movement of the cam member 544$ii$, the camming effect created by the cam member 544$ii$ is overcome, which maintains the engagement of the socket 432 and the ball member 426, and, thus, connection of the respective male and female components 412$m$, 412$f$, as well as connection of the image capture device 1000 (or the housing 1100) and the mounting system 400.

As the cam fastener 540$ii$ moves from the locked position to the unlocked position, the cam member 544$ii$ rotates and the shaft 546$ii$ moves linearly in a direction towards the end cap 548$ii$, which alleviates the compressive force applied to the struts 436$i$, 436$ii$, and, thus, the compressive force applied to the socket 432 and the ball member 426. Alleviating the compressive force applied to the socket 432 and the ball member 426 allows for relative movement between the male component 412$m$ and the female component 412$f$, and, thus, repositioning of the image capture device 1000 (or the housing 1100) in relation to the mounting system 400, and/or removal of the ball member 426 from the socket 432 to allow for disconnection of the image capture device 1000 (or the housing 1100) from the mounting system 400. Upon sufficient linear movement of the lever 542$ii$ and the shaft 546$ii$, and sufficient rotational movement of the cam member 544$ii$, the camming effect created by the cam member 544$ii$ is overcome, which maintains the unlocked position of the cam fastener 540$ii$.

In certain embodiments, such as that shown throughout the figures, it is envisioned that the cam fastener 540$ii$ may further include a biasing member 552$ii$ (FIG. 10A) to bias the cam fastener 540$ii$ towards either the unlocked position or the locked position. For example, it is envisioned that the biasing member 552$ii$ may include a spring 554$ii$ that is positioned either internally within or externally about the shaft 546$ii$.

To adjust the engagement between the socket 432 and the ball member 426 when the cam fastener 540ii is in the locked position, it is envisioned that the end cap 548ii may be rotated. More specifically, tightening the end cap 548ii (via rotation in a first direction) will result in additional linear movement of the shaft 546ii towards the end cap 548ii, thereby increasing the compressive force applied to the struts 436i, 436ii and the ball member 426 via the socket 432. Oppositely, loosening the end cap 548ii (via rotation in a second direction opposite to the first direction) will result in linear movement of the shaft 546ii away from the end cap 548ii, thereby decreasing the compressive force applied to the struts 436i, 436ii and the ball member 426 via the socket 432.

In certain embodiments, it is envisioned that the end cap 548ii may be captive to the mounting system 400 such that the end cap 548ii is nonremovably connected to the female component 412f of the connection assembly, but rotatable in relation to the female component 412f in the manner discussed above (e.g., to guard against misplacement or loss of the end cap 548ii).

Figure 18:
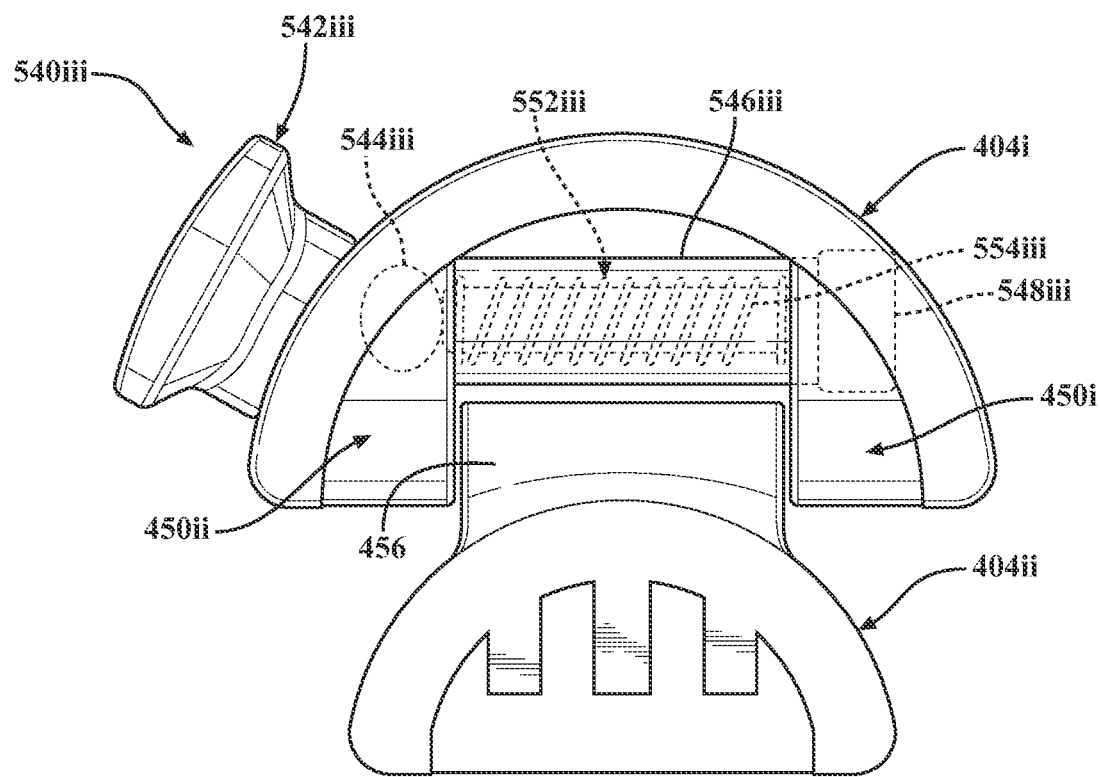
FIG. 18 is a transverse (horizontal) cross-sectional view taken along line 18-18 in FIG. 5 with parts separated.
Figure 19:
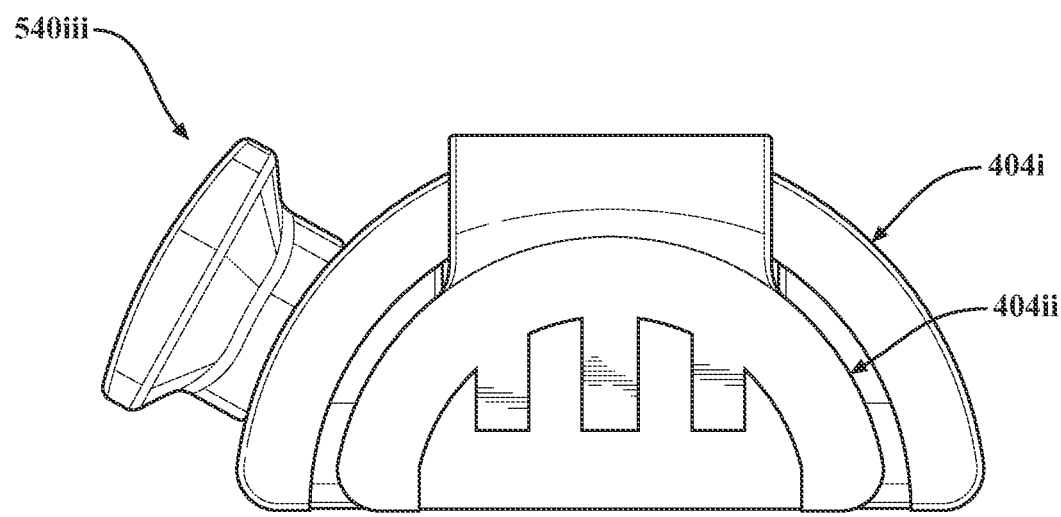
FIG. 19 is a transverse (horizontal) cross-sectional view of the structures seen in FIG. 18 with parts connected.

The cam fastener 540iii is substantially similar to the cam fasteners 540i, 540ii in both structure and operation, and includes: a lever (latch) 542iii with a cam member 544iii; a shaft 546iii that extends from the lever 542iii; and an end cap 548iii (FIG. 10C) that is connected to the shaft 546iii. It is envisioned that the shaft 546iii and the end cap 548iii may be configured for threaded engagement, as discussed above in connection with the cam fasteners 540i, 540ii, or, alternatively, that the shaft 546iii and the end cap 548iii may be fixedly connected, as seen in FIGS. 18 and 19, for example.

The cam fastener 540iii extends through (and between) the lower end 406li of the first arm 404i and the upper end 406uii of the second arm 404ii. More specifically, the shaft 546iii of the cam fastener 540iii extends through the finger 450i, into and through the eye member 456, and through the finger 450ii such that the lever 542iii and the end cap 548iii are positioned on opposite sides of the arms 404i, 404ii. As mentioned above, however, in certain embodiments, it is envisioned that the positioning of the fingers 450i, 450ii and the eye member 456 may be reversed (i.e., such that the eye member 456 is included on the first arm 404i and the fingers 450i, 450ii are included on the second arm 404ii). Consequently, in such embodiments, the cam fastener 540iii may be supported by the second arm 404ii rather than by the first arm 404i.

In the particular embodiment shown throughout the figures, the end cap 548iii is illustrated as being positioned internally within the finger 450i (e.g., to promote foldability of the mounting system 400 and/or reduce the overall profile of the mounting system 400 in the collapsed configuration). Embodiments in which the end cap 548iii may be configured as an external structure, however, would not be beyond the scope of the present disclosure.

As discussed above in connection with the cam fastener 540ii, it is envisioned that the shaft 546iii and the end cap 548iii may be removably connected to each other. Alternatively, as illustrated in connection with the embodiment seen throughout the figures, in contrast, it is envisioned that the shaft 546iii and the end cap 548iii may be configured such that the shaft 546iii and the end cap 548iii are not disconnectable, whereby the cam fastener 540iii may be captive to (nonremovable from) the mounting system 400 in its entirety.

The cam fastener 540iii is movable between an unlocked position and a locked position to regulate the relative positions of the arms 404i, 404ii. More specifically, when the cam fastener 540iii is in the unlocked position, the arms 404i, 404ii are relatively movable, which allows for additional variation in position of the image capture device 1000 (or the housing 1100). When the cam fastener 540iii is in the locked position, however, relative movement between the arms 404i, 404ii is inhibited (if not entirely prevented), to thereby maintain the elected orientation.

In the unlocked position, the lever 542iii of the cam fastener 540iii extends along an axis Xiii (FIG. 12) that is generally orthogonal in relation to the longitudinal axis Yi defined by the first arm 404i and generally parallel in relation to the axes Xi, Xii respectively defined by the levers 542i, 542ii of the cam fasteners 540i, 540ii in the locked position. To move the cam fastener 540iii into the locked position, the lever 542iii is rotated approximately 90° such that the axis Xiii defined by the lever 542iii extends in generally parallel relation to the longitudinal axis Yi defined by the first arm 404i and in generally orthogonal relation to the shaft 546iii and the axes Xi, Xii respectively defined by the levers 542i, 542ii of the cam fasteners 540i, 540ii in the locked position.

As the cam fastener 540iii moves from the unlocked position to the locked position, the cam member 544iii is caused to rotate via connection to the lever 542iii, which results in linear (axial, longitudinal) movement of the shaft 546iii in a direction away from the end cap 548iii. The engagement between the shaft 546iii and the end cap 548iii, however, inhibits (if not entirely prevents) relative movement between the shaft 546iii and the end cap 548iii, whereby a compressive force is applied to the fingers 450i, 450ii at the lower end 406li of the first arm 404i. The compressive force applied to the fingers 450i, 450ii causes inward deflection of the fingers 450i, 450ii (i.e., movement towards each other), and, thus, frictional contact with the eye member 456 to inhibit (if not entirely prevent) relative movement between the arms 404i, 404ii such that the arms 404i, 404ii are fixedly positioned in relation to each other. Upon sufficient linear movement of the lever 542iii and the shaft 546iii, and sufficient rotational movement of the cam member 544iii, the camming effect created by the cam member 544iii is overcome, which maintains the frictional contact between the fingers 450i, 450ii and the eye member 456, and, thus, the relative positions of the arms 404i, 404ii.

As the cam fastener 540iii moves from the locked position to the unlocked position, the cam member 544iii rotates and the shaft 546iii moves linearly in a direction towards the end cap 548iii, which alleviates the compressive force applied to the fingers 450i, 450ii, and, thus, the compressive force applied to the eye member 456, to again allow for relative movement between the arms 404i, 404ii. Upon sufficient linear movement of the lever 542iii and the shaft 546iii, and sufficient rotational movement of the cam member 544iii, the camming effect created by the cam member 544iii is overcome, which maintains the unlocked position of the cam fastener 540iii.

In certain embodiments, such as that shown throughout the figures, it is envisioned that the cam fastener 540iii may further include a biasing member 552iii to bias the cam fastener 540iii towards either the unlocked position or the locked position. For example, it is envisioned that the biasing member 552iii may include a spring 554iii that is positioned either internally within or externally about the shaft 546iii.

Figure 20:
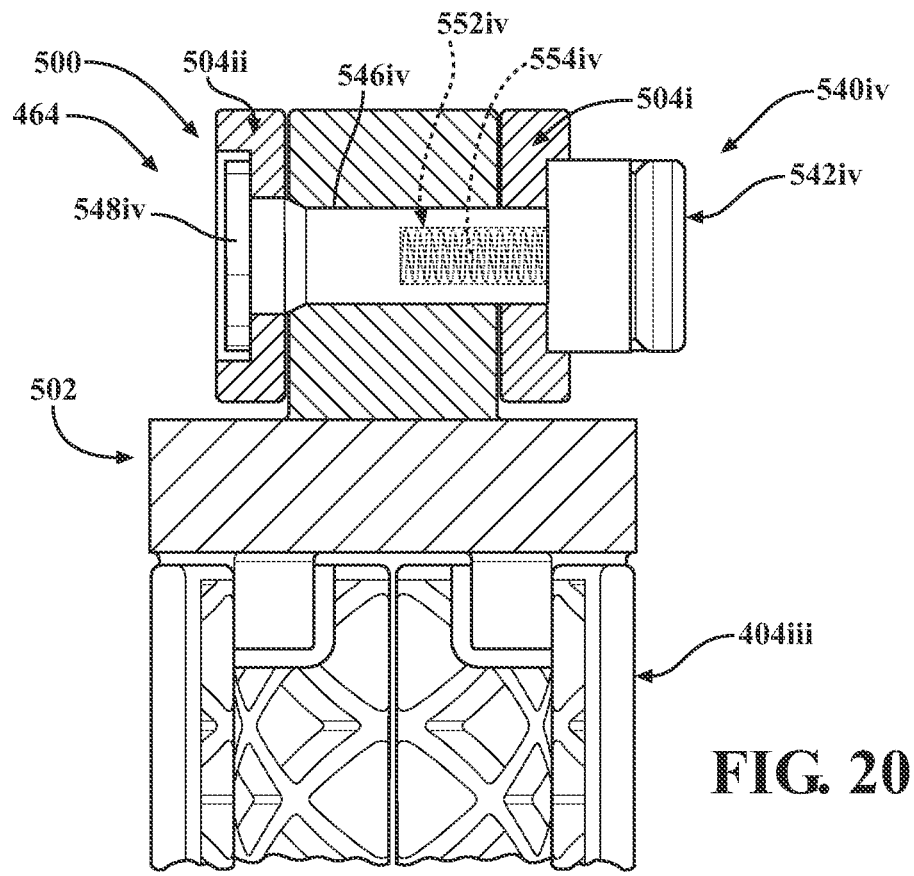
FIG. 20 is a partial, longitudinal (vertical) cross-sectional view of the third arm and a knuckle assembly including a cam fastener shown in a locked position.
Figure 21:
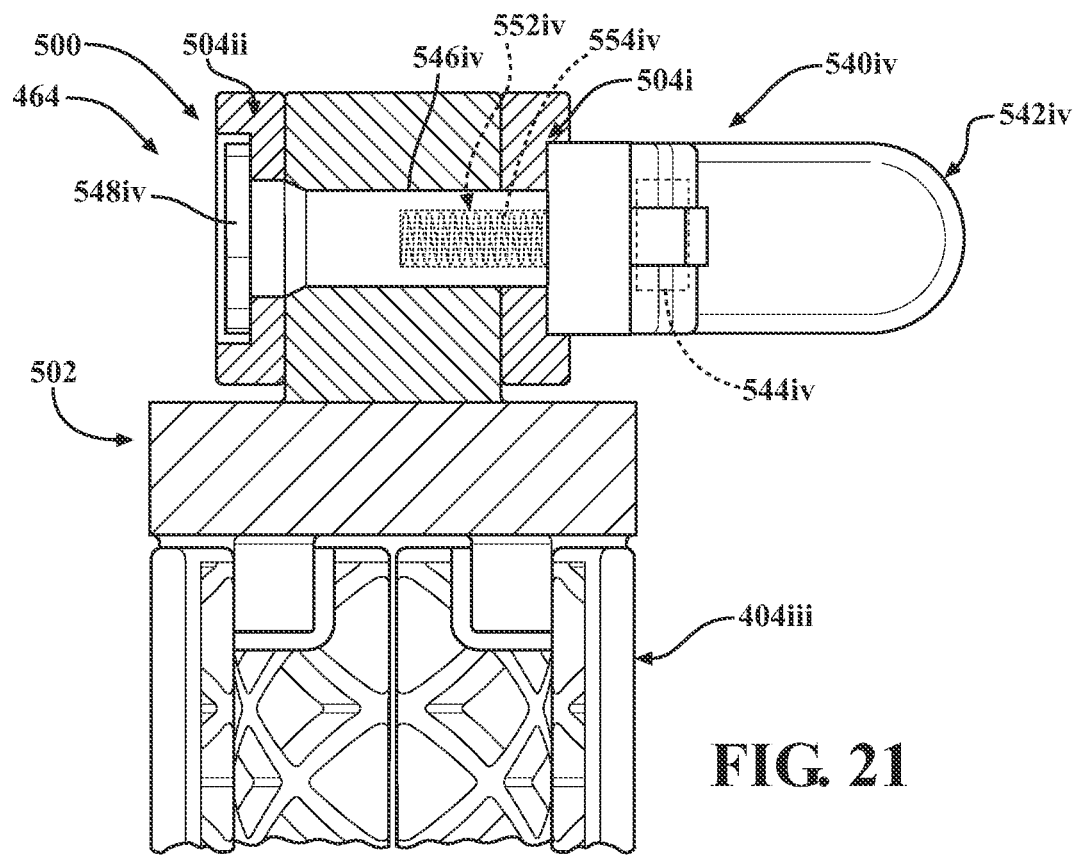
FIG. 21 is a partial, longitudinal (vertical) cross-sectional view of the third arm and the knuckle assembly with the cam fastener seen in FIG. 20 shown in a locked position.

The cam fastener 540iv is substantially similar to the cam fastener 540iii in both structure and operation, and includes: a lever (latch) 542iv with a cam member 544iv; a shaft 546iv that extends from the lever 542iv; and an end cap 548iv that is connected to the shaft 546*iv*. It is envisioned that the shaft 546*iv* and the end cap 548*iv* may be configured for threaded engagement, as discussed above in connection with the cam fasteners 540*i*, 540*ii*, 540*iii*, or, alternatively, that the shaft 546*iv* and the end cap 548*iv* may be fixedly connected, as seen in FIGS. 20 and 21, for example. As such, in certain embodiments, it is envisioned that the cam fastener 540*iv* may be identical to the cam fastener 540*iii*.

The cam fastener 540*iv* connects together the yoke component 500 (FIGS. 12, 15) and the eye assembly 502 of the knuckle assembly 464, and, thus, connects together the second arm 404*ii* and the third arm 404*iii*. More specifically, the shaft 546*iv* of the cam fastener 540*iv* extends through the opening 506 in the finger 504*i*, through the eye member 516, and through the opening 506 in the finger 504*ii* such that the lever 542*iv* and the end cap 548*iv* are positioned on opposite sides of the yoke component 500. As mentioned above, however, in certain embodiments, it is envisioned that the positioning of the yoke component 500 and the eye assembly 502 may be reversed (i.e., such that the yoke component 500 is connected to the third arm 404*iii* and the eye assembly 502 is connected to the second arm 404*ii*). Consequently, in such embodiments, the cam fastener 540*iv* may be supported by (adjacent to) the third arm 404*iii* rather than by the second arm 404*ii*.

In the particular embodiment shown throughout the figures, the end cap 548*iv* is illustrated as being positioned internally within the finger 504*ii* (e.g., to promote foldability of the mounting system 400 and/or reduce the overall profile of the mounting system 400 in the collapsed configuration). Embodiments in which the end cap 548*iv* may be configured as an external structure, however, would not be beyond the scope of the present disclosure.

As discussed above in connection with the cam fastener 540*iii*, it is envisioned that the shaft 546*iv* and the end cap 548*iv* may be removably connected to each other. Alternatively, as illustrated in connection with the embodiment seen throughout the figures, it is envisioned that the shaft 546*iv* and the end cap 548*iv* may be configured such that the shaft 546*iv* and the end cap 548*iv* are not disconnectable, whereby the cam fastener 540*iv* may be captive to (nonremovable from) the mounting system 400 in its entirety.

The cam fastener 540*iv* is movable between an unlocked position and a locked position to regulate the relative positions of the arms 404*ii*, 404*iii*. More specifically, when the cam fastener 540*iv* is in the unlocked position, the arms 404*ii*, 404*iii* are relatively movable, which allows for additional variation in position of the image capture device 1000 (or the housing 1100). When the cam fastener 540*iv* is in the locked position, however, relative movement between the arms 404*ii*, 404*iii* is inhibited (if not entirely prevented), to thereby maintain the elected orientation.

In the unlocked position, the lever 542*iv* of the cam fastener 540*iv* extends along an axis Xiv that is generally parallel in relation to not only the shaft 546*iv*, but the axes Xi, Xii respectively defined by the levers 542*i*, 542*ii* of the cam fasteners 540*i*, 540*ii* in the locked position, and generally orthogonal in relation to the longitudinal axis Yii defined by the second arm 404*ii*. To move the cam fastener 540*iv* into the locked position, the lever 542*iv* is rotated approximately 90° such that the axis Xiv defined by the lever 542*iv* extends in generally orthogonal relation to not only the shaft 546*iv*, but the axes Xi, Xii, Xiii respectively defined by the levers 542*i*, 542*ii*, 542*iii* of the cam fasteners 540*i*, 540*ii*, 540*iii* in the locked position, as seen in FIG. 12, for example.

As the cam fastener 540*iv* moves from the unlocked position to the locked position, the cam member 544*iv* is caused to rotate via connection to the lever 542*iv*, which results in linear (axial, longitudinal) movement of the shaft 546*iv* in a direction away from the end cap 548*iv*. The engagement between the shaft 546*iv* and the end cap 548*iv*, however, inhibits (if not entirely prevents) relative movement between the shaft 546*iv* and the end cap 548*iv*, whereby a compressive force is applied to the fingers 504*i*, 504*ii* of the yoke component 500. The compressive force applied to the fingers 504*i*, 504*ii* causes inward deflection of the fingers 504*i*, 504*ii* (i.e., movement towards each other), and, thus, frictional contact with the eye assembly 502 (e.g., the eye member 516) to inhibit (if not entirely prevent) relative movement between the arms 404*ii*, 404*iii* such that the arms 404*ii*, 404*iii* are fixedly positioned in relation to each other. Upon sufficient linear movement of the lever 542*iv* and the shaft 546*iv*, and sufficient rotational movement of the cam member 544*iv*, the camming effect created by the cam member 544*iv* is overcome, which maintains the frictional contact between the fingers 504*i*, 504*ii* and the eye assembly 502 (e.g., the eye member 516), and, thus, the relative positions of the arms 404*ii*, 404*iii*.

As the cam fastener 540*iv* moves from the locked position to the unlocked position, the cam member 544*iv* rotates and the shaft 546*iv* moves linearly in a direction towards the end cap 548*iv*, which alleviates the compressive force applied to the fingers 504*i*, 504*ii*, and, thus, the compressive force applied to the eye assembly 502 (e.g., the eye member 516) to again allow for relative movement between the arms 404*ii*, 404*iii*. Upon sufficient linear movement of the lever 542*iv* and the shaft 546*iv*, and sufficient rotational movement of the cam member 544*iv*, the camming effect created by the cam member 544*iv* is overcome, which maintains the unlocked position of the cam fastener 540*iv*.

In certain embodiments, such as that shown throughout the figures, it is envisioned that the cam fastener 540*iv* may further include a biasing member 552*iv* to bias the cam fastener 540*iv* towards either the unlocked position or the locked position. For example, it is envisioned that the biasing member 552*iv* may include a spring 554*iv* that is positioned either internally within or externally about the shaft 546*iv*.

Use of the mounting system 400 will now be discussed with general reference to FIGS. 4, 5, and 12. While the mounting system 400 is described in connection with the image capture device 1000 throughout the following discussion, it should be appreciated that the following discussion is equally applicable to the housing 1100 (FIGS. 7A, 7B).

Initially, the cam fastener 540*i* is removed from the mounting system 400 to allow for connection of the image capture device 1000. More specifically, the end cap 548*i* is removed from the shaft 546*i*, and the shaft 546*i* is removed from the male component 412*m* of the connection assembly 408. The image capture device 1000 can then be connected to the male component 412*m* by positioning the fingers 1002*i*, 1002*ii* between the fingers 402*i*, 402*ii*, 402*iii* on the male component 412*m*. Once so positioned, the cam fastener 540*i* can be reconnected to the mounting system 400 by inserting the shaft 546*i* through the openings 418 in the fingers 402*i*, 402*ii*, 402*iii* and through the openings 1004 in the fingers 1002*i*, 1002*ii* such that the image capture device 1000 is connected to the male component 412*m* via the shaft 546*i*. The end cap 548*i* can then be rotatably (threadably) connected to the shaft 546*i*, and the cam fastener 540*i* can be moved into the locked position via movement of the lever 542*i* to thereby secure together the image capture device 1000 and the male component 412*m* via compression of the fingers 402*i*, 402*ii*, 402*iii* and the fingers 1002*i*, 1002*ii*.

Subsequently, the male component 412*m*, and, thus, the image capture device 1000, can be connected to the female component 412*f* of the connection assembly 408. More specifically, the cam fastener 540*ii* is positioned in the unlocked position via movement of the lever 542*ii*, and the ball member 426 is inserted into the socket 432. The image capture device 1000 can then be positioned as desired in relation to the first arm 404*i* via movement of the ball member 426 within the socket 432. The generally spherical configuration of the ball member 426 and the generally hemispherical configuration of the socket 432 allows for wide variation in the relative positioning between the male component 412*m* and the female component 412*f*, and, thus, flexibility in the orientation of the image capture device 1000 relative to the mounting system 400.

Once positioned as desired, the connection between the male component 412*m* and the female component 412*f*, as well as the relative positions of the image capture device 1000 and the first arm 404*i*, can be maintained by positioning the cam fastener 540*ii* in the locked position via movement of the lever 542*ii* to thereby compress the socket 432 into secured (frictional) contact with the ball member 426.

Prior or subsequent to connection of the image capture device 1000 to the mounting system 400, the cam fasteners 540*iii*, 540*iv* can be moved into the unlocked position to allow for unfolding of the arms 404*i*, 404*ii*, 404*iii* and positioning of the arms 404*i*, 404*ii*, 404*iii* in any desired orientation. During relative movement between the arms 404*i*, 404*ii*, the first arm 404*i* is pivoted in relation to the second arm 404*ii* (or vice versa), during which, the shaft 546*iii* of the cam fastener 540*iii* rotates in relation to the eye member 456 (or vice versa). Similarly, during relative movement between the arms 404*ii*, 404*iii*, the second arm 404*ii* is pivoted in relation to the third arm 404*iii* (or vice versa) via the knuckle assembly 464. More specifically, the yoke component 500 is pivoted in relation to the eye assembly 502 (or vice versa), during which, the shaft 546*iv* of the cam fastener 540*iv* rotates in relation to the eye member 516 (or vice versa).

During repositioning of the arm 404*ii* and/or the arm 404*iii*, movement beyond the threshold position is inhibited (if not entirely prevented) by the hard stop 532. More specifically, in the illustrated embodiment, upon reaching the threshold position, the yoke component 500 is positioned in generally orthogonal relation to the base component 518 of the eye assembly 502 such that the fingers 504*i*, 504*ii* are positioned in generally parallel relation to the contact surface 530 defined by the base component 518. Contact between the fingers 504*i*, 504*ii* and the contact surface 530 inhibits (if not entirely prevents) continued relative movement between the arms 404*ii*, 404*iii* beyond the threshold position.

Once the arms 404*i*, 404*ii*, 404*iii* are oriented as desired, the relative positions of the arms 404*i*, 404*ii*, 404*iii* can be maintained by positioning the cam fasteners 540*iii*, 540*iv* in the locked position via movement of the respective levers 542*iii*, 542*iv*. More specifically, as the cam fastener 540*iii* is moved into the locked position, the fingers 450*i*, 450*ii* are compressed into secured (frictional) contact with the eye member 456, and as the cam fastener 540*iv* is moved into the locked position, the fingers 504*i*, 504*ii* are compressed into secured (frictional) contact with the eye member 516.

In certain embodiments, it is envisioned that the fingers 450*i*, 450*ii* at the lower end 406*li* of the first arm 404*i* and the eye member 456 may be configured to establish an interference fit sufficient to temporarily maintain the relative positions of the arms 404*i*, 404*ii* until the cam fastener 540*iii* can be moved into the locked position. Similarly, it is envisioned that the fingers 504*i*, 504*ii* of the yoke component 500 and the eye member 516 may be configured to establish an interference fit sufficient to temporarily maintain the relative positions of the arms 404*ii*, 404*iii* until the cam fastener 540*iv* can be moved into the locked position.

During use, the mounting system 400 may be collapsed and expanded as desired. In the collapsed configuration, or in one or more partially extended configurations (e.g., those in which one or more of the arms 404*i*, 404*ii*, 404*iii* is extended relative to the others), the third arm 404*iii* may be moved from the closed (handle) configuration (seen in FIGS. 4 and 5) into the open configuration (seen in FIG. 14) by pivoting the segments 466*i*, 466*ii*, 466*iii* in relation to the base component 518 of the knuckle assembly 464 for use as the stand 484.

Figure 22:
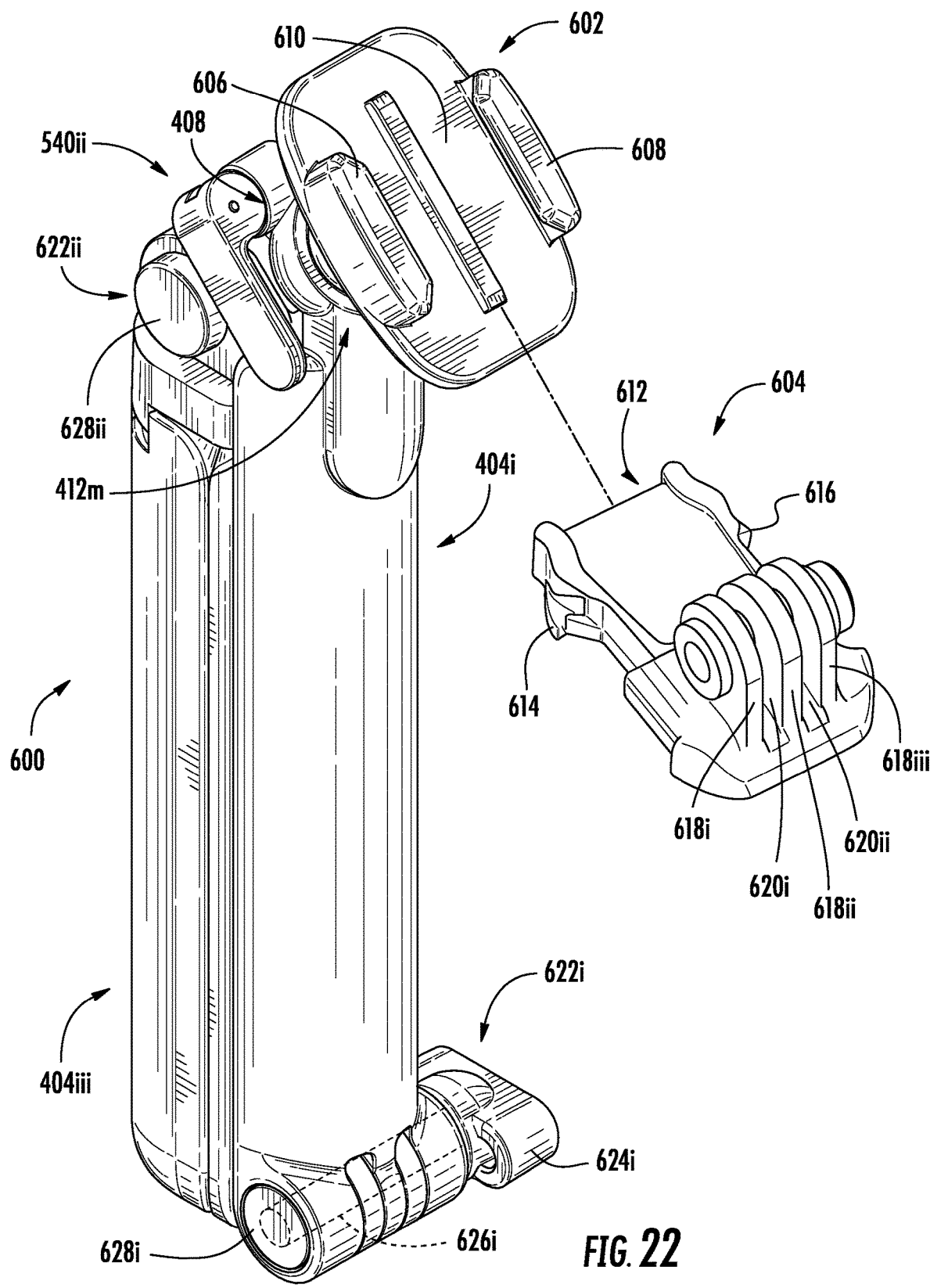
FIG. 22 is a side, perspective view of an alternate embodiment of the mounting system shown in the collapsed configuration.
Figure 23:
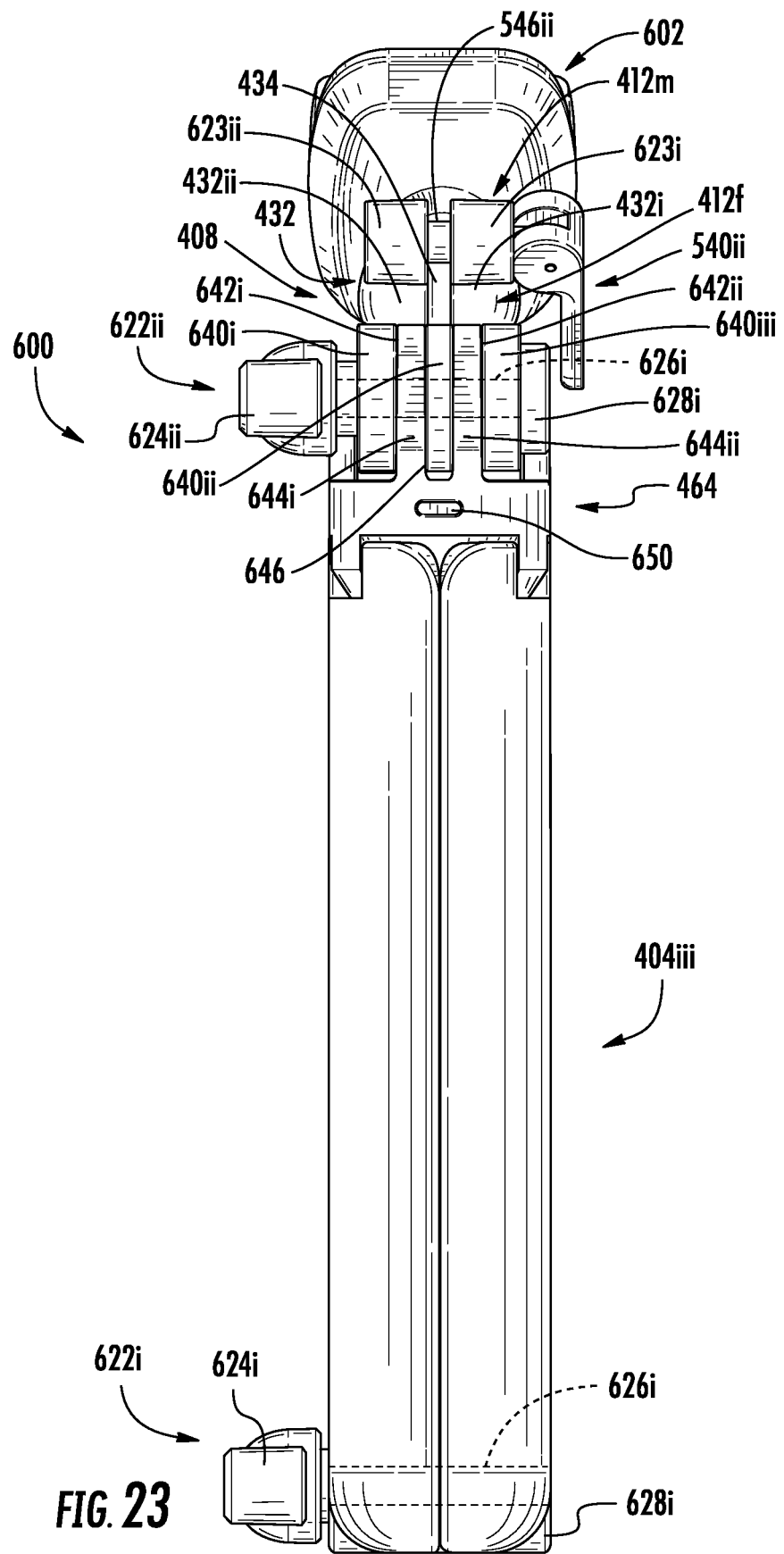
FIG. 23 is a rear, plan view of the mounting system seen in FIG. 22.
Figure 24:
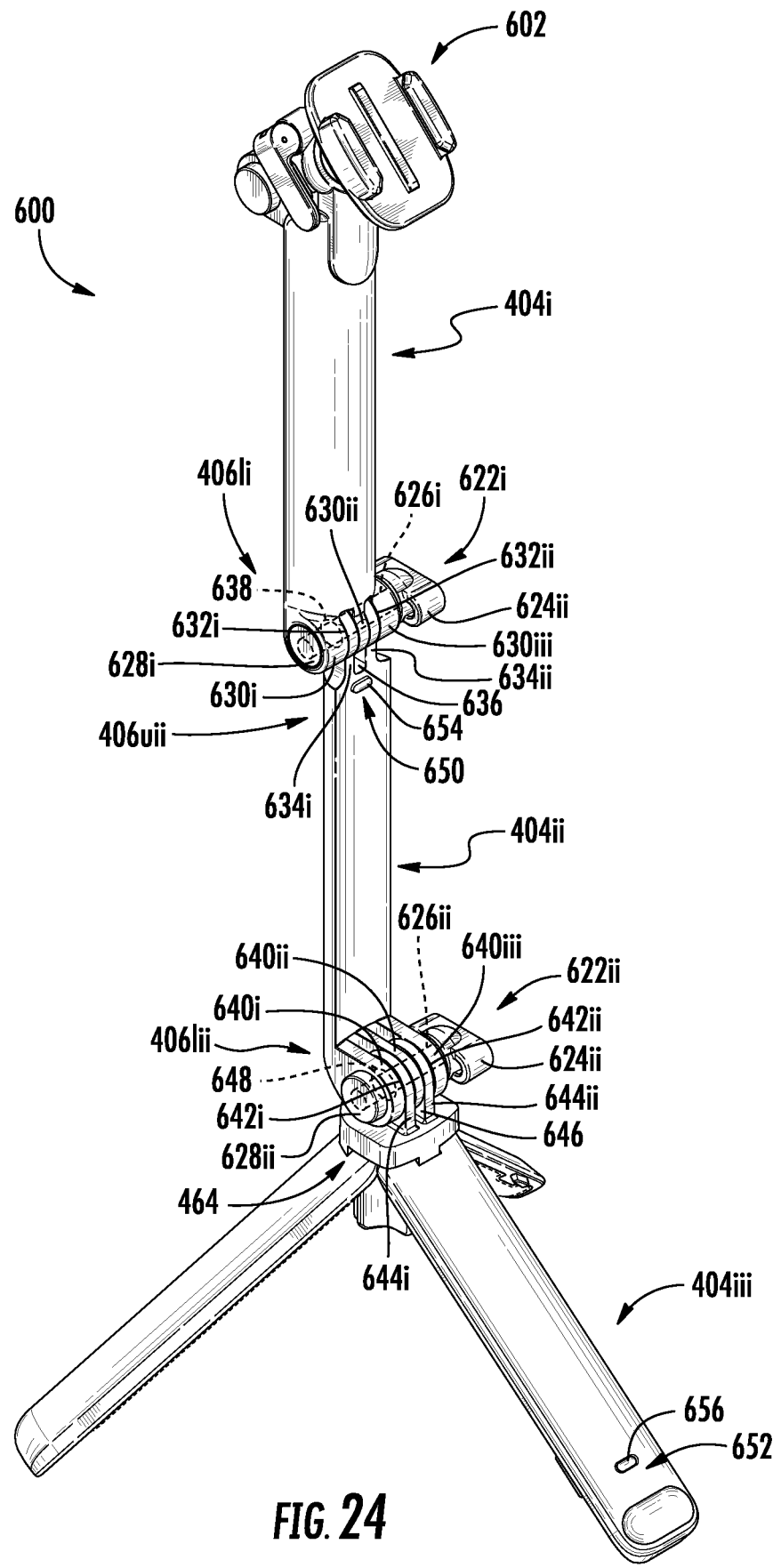
FIG. 24 is a side, perspective view of the mounting system seen in FIG. 22 shown in the expanded configuration.

Referring now to FIGS. 22-24, another embodiment of the mounting system will be discussed, which is identified by the reference character 600. More specifically, FIG. 22 provides a side, perspective view of the mounting system 600 shown in the collapsed (folded) configuration; FIG. 23 provides a rear, plan view of the mounting system 600 shown in the collapsed (folded) configuration; and FIG. 24 provides a side, perspective view of the mounting system 600 shown in the expanded (unfolded) configuration. The mounting system 600 is substantially similar to the mounting system 400 discussed above. As such, the mounting system 600 will only be described with respect to any differences from the mounting system 400 and identical reference characters will be utilized to identify components common to each of the mounting systems 400, 600.

As discussed above, the connection assembly 408 is configured to connect the mounting system 600 to the image capture device 1000 (FIG. 6A), the housing 1100 (FIG. 7A), or any other suitable image capture device, system, accessory, or component (e.g., a smart phone). However, rather than the aforedescribed body portion 416 (FIG. 12), the male component 412*m* of the mounting system 600 includes respective first and second mounts 602, 604 that are configured for releasable connection.

The first mount 602 includes a pair of supports 606, 608 (FIG. 22) defining a channel 610 that is configured to receive the second mount 604 such that the second mount 604 is slidable into and out of the channel 610 during connection and disconnection of the mounts 602, 604. Although the first mount 602 is shown as being unitarily (e.g., integrally, fixedly) formed with the male component 412*m*, embodiments are also envisioned in which the male component 412*m* and the first mount 602 may be configured for disconnection and reconnection.

The second mount 604 includes a body portion 612 and a pair of deflectable tabs 614, 616 that are configured for respective engagement (contact) with the supports 606, 608 on the first mount 602. More specifically, during connection of the mounts 602, 604, the tabs 614, 616 are deflected inwardly by the respective supports 606, 608 as the second mount 604 enters the channel 610. Upon sufficient advancement of the second mount 604 through the channel 610, as the tabs 614, 616 pass the supports 606, 608, the tabs 614, 616 return to their normal (initial) configuration (FIG. 22) such that the tabs 614, 616 secure the second mount 604 within the channel 610 via engagement (contact) with the supports 606, 608, respectively.

The second mount 604 includes a plurality (set) of fingers 618i, 618ii, 618iii that extend transversely from (e.g., in (generally) orthogonal relation to) the body portion 612. The fingers 618i, 618ii, 618iii are substantially similar (if not identical) to the aforedescribed fingers 402i, 402ii, 402iii (FIG. 12). More specifically, the fingers 618i, 618ii, 618iii define channels 620i, 620ii that are configured to receive the fingers 1002i, 1002ii extending from the image capture device 1000 (FIGS. 6A, 6B) (and/or the fingers 1104i, 1104ii extending from the housing 1100 (FIGS. 7A, 7B)) such that the second mount 604 is connectable to the image capture device 1000 and the housing 1100. Although shown as including three fingers 618 and two channels 620 in the illustrated embodiment, it should be appreciated that the particular number of fingers 618 and channels 620 may be varied in alternate embodiments of the disclosure (e.g., depending on the number of fingers 1002, 1104 respectively included on the image capture device 1000 and/or the housing 1100).

In contrast to the mounting system 400, which utilizes a plurality (set) of similar cam fasteners 540, the mounting system 600 includes a plurality (set) of dissimilar fasteners. More specifically, in the particular embodiment illustrated, the mounting system 600 includes the aforedescribed cam fastener 540ii, which is associated with the female component 412f (FIG. 23) of the connection assembly 408, and rotatable fasteners 622i 622ii, which replace the cam fasteners 540iii, 540iv (FIG. 12), respectively. In additional embodiments of the disclosure, it is also envisioned that the cam fastener 540i seen in FIG. 12 may be replaced by a rotatable fastener 622. The mounting system 400 thus includes a first fastener (e.g., the cam fastener 540ii) having a first configuration and second and third fasteners (e.g., the rotatable fasteners 622i, 622ii) having a second configuration that is different than the first configuration. More specifically, whereas the cam fastener 540ii is configured for pivotable adjustment, the fasteners 622i, 622ii are configured for rotatable adjustment.

In the embodiment of the mounting system 400 seen in FIGS. 22-24, the divide 434 (FIG. 23) in the socket 432 of the female component 412f is located so as to define first and second sections (e.g., halves) 432i, 432ii of the socket 432, which include first and second bushings (receptacles) 623i, 623ii that are configured to receive and support the cam fastener 540ii such that the shaft 546ii extends therethrough. The bushing 623ii is configured to receive the end cap 548ii such that, upon movement of the cam fastener 540ii from the unlocked position (FIG. 16) to the locked position (FIGS. 22-24), linear (axial, longitudinal) movement of the shaft 546ii causes corresponding linear movement of the end cap 548ii and the bushing 623ii (towards the bushing 623i) to thereby compress the socket 432 about the ball member 426 (FIG. 12) via approximation of the sections 432i, 432ii and the bushings 623i, 623ii. Upon movement of the cam fastener 540ii from the locked position to the unlocked position, linear (axial, longitudinal) movement of the shaft 546ii causes corresponding linear movement of the end cap 548ii and the bushing 623ii (away from the bushing 623i) to thereby alleviate compression of the socket 432 about the ball member 426 via separation of the sections 432i, 432ii and the bushings 623i, 623ii.

The rotatable fasteners 622i 622ii are identical in both configuration and operation and each include: a knob 624i; a shaft 626 that extends from the knob 624 such that rotation of the knob 624 causes corresponding rotation of the shaft 626; and an end cap 628 that is secured to the shaft 626. More specifically, the shaft 626 threadably engages the end cap 628 such that rotation of the shaft 626 via the knob 624 causes relative linear movement between the shaft 626 and the end cap 628. As described in further detail below, rotation of the knob 624 (and, thus, the shaft 626) in a first direction (e.g., clockwise) causes linear movement of the end cap 628 towards the knob 624 to thereby tighten the rotatable fastener 622 and rotation of the knob 624 (and, thus, the shaft 626) in a second direction opposite to the first direction (e.g., counterclockwise) causes linear movement of the end cap 628 away from the knob 624 to thereby loosen the rotatable fastener 622.

As seen in FIG. 24, the lower end 406li of the first arm 404i includes a (first) plurality (set) of fingers 630i, 630ii, 630iii defining channels 632i, 632ii, which replace the fingers 450i, 450ii (FIG. 12), and the upper end 406uii of the second arm 404ii includes a corresponding (second) plurality (set) of fingers 634i, 634ii defining a channel 636, which replace the eye member 456 (FIGS. 5, 12). The fingers 630, 634 extend in (generally) parallel relation to each other and the longitudinal axes Yi, Yii (FIG. 12) respectively defined by the arms 404i, 404ii. While the lower end 406li of the first arm 404i is shown as including three fingers 630 and two channels 632 and the upper end 406uii of the second arm 404ii is shown as including two fingers 634 and a single channel 636 in the illustrated embodiment, it should be appreciated that the particular number of fingers 630, 634 and channels 632, 636 may be varied in alternate embodiments without departing from the scope of the present disclosure.

The fingers 634i, 634ii are configured for insertion into the channels 632i, 632ii, respectively, and the finger 630ii is configured for insertion into the channel 636 such that the fingers 630i, 630iii are located outwardly of the fingers 634i, 634ii, as seen in FIG. 24. Each of the fingers 630, 634 includes an opening 638 that is substantially similar (if not identical to) the aforedescribed openings 1004i, 1004ii (FIG. 6B), 1106i, 1106ii (FIG. 7B), and 418 (FIG. 12). The openings 638 in the fingers 630, 634 are configured to receive the shaft 626i of the rotatable fastener 622i such that the rotatable fastener 622i extends through the arms 404i, 404ii (via the fingers 630, 634), whereby the knob 624i and the end cap 628i are positioned on opposite sides of the fingers 630, 634. The engagement between the fingers 630, 634 and reception of the rotatable fastener 622i within the openings 638 allows the arms 404i, 404ii to pivot in relation to each other about the rotatable fastener 622i during movement of the mounting system 600 between the collapsed (folded) configuration (FIGS. 22, 23) and the expanded (unfolded) configuration (FIG. 24).

Tightening of the rotatable fastener 622i applies a compressive force to the fingers 630, 634 that causes inward deflection (movement) of the fingers 630i, 630iii and the fingers 634i, 634ii towards the finger 630ii, thereby compressing the fingers 630, 634 into frictional engagement to secure (e.g., fix) the relative positions of the arms 404i, 404ii. Conversely, loosening of the rotatable fastener 622i alleviates the compressive force applied to the fingers 630, 634 to lessen the frictional engagement therebetween and allow for adjustment in the relative positions of the arms 404i, 404ii (e.g., during movement between the collapsed (folded) configuration (FIGS. 22, 23) and the expanded (unfolded) configuration (FIG. 24).

In certain embodiments, it is envisioned that the end cap 628i may be configured for rotation independently of the shaft 626i to allow for further adjustment in the engagement between the fingers 630, 634. More specifically, in such embodiments, tightening the end cap 628i via rotation in a first direction (e.g., clockwise) will result in additional linear movement of the end cap 628i towards the knob 624i, thereby increasing the compressive force applied to the fingers 630, 634, and loosening the end cap 628i via rotation in a second direction opposite to the first direction (e.g., counterclockwise) will result in linear movement of the end cap 628i away from the knob 624i, thereby alleviating the compressive force applied to the fingers 630, 634. To facilitate rotation of the end cap 628i, it is envisioned that the end cap 628i may be configured for manual engagement and/or for engagement with a tool (not shown), such as a screwdriver or the like.

In certain embodiments, to guard against misplacement or loss of the end cap 628i), it is envisioned that the end cap 628i may be captive to the mounting system 400 such that the end cap 628i is nonremovably connected to the arms 404i, 404ii, but rotatable in relation to the arms 404i, 404ii in the manner discussed above.

The lower end 406lii of the second arm 404ii includes a (third) plurality (set) of fingers 640i, 640ii, 640iii defining channels 642i, 642ii, which replace the yoke component 500 (FIG. 12), and the knuckle assembly 464 includes a corresponding (fourth) plurality (set) of fingers 644i, 644ii defining a channel 646, which replace the eye assembly 502 (FIG. 12). The fingers 640 extend transversely in relation to not only the longitudinal axes Yii, Yiii (FIG. 5) respectively defined by the arms 404ii, 404iii, but the fingers 644 as well. More specifically, in the particular embodiment illustrated, the fingers 640 extend in (generally) orthogonal relation to the longitudinal axes Yii, Yiii and the fingers 644. It should be appreciated, however, that the particular relative orientation of the fingers 640, 644 may be varied in alternate embodiments without departing from the scope of the present disclosure. Additionally, while the lower end 406lii of the second arm 404ii is illustrated as including three fingers 640 and two channels 642 and the knuckle assembly 464 is illustrated as including two fingers 644 and a single channel 646 in the illustrated embodiment, it should be appreciated that the particular number of fingers 640, 644 and channels 642, 646 may be varied in alternate embodiments without departing from the scope of the present disclosure.

The fingers 644i, 644ii are configured for insertion into the channels 642i, 642ii, respectively, and the finger 640ii is configured for insertion into the channel 646 such that the fingers 640i, 640iii are located outwardly of the fingers 644i, 644ii, as seen in FIGS. 23 and 24. Each of the fingers 640, 644 includes an opening 648 that is substantially similar (if not identical to) the opening 638 discussed above in connection with the fingers 630, 634. The openings 648 in the fingers 640, 644 are configured to receive the shaft 626ii of the rotatable fastener 622ii such that the rotatable fastener 622ii extends through the arm 404ii and the knuckle assembly 464 (via the fingers 640, 644), whereby the knob 624ii and the end cap 628ii are positioned on opposite sides of the fingers 640, 644. The engagement between the fingers 640, 644 and reception of the rotatable fastener 622ii within the openings 648 allows the arms 404ii, 404iii to pivot in relation to each other about the rotatable fastener 622ii (via the knuckle assembly 464) during movement of the mounting system 600 between the collapsed (folded) configuration (FIGS. 22, 23) and the expanded (unfolded) configuration (FIG. 24).

Tightening of the rotatable fastener 622ii applies a compressive force to the fingers 640, 644 that causes inward deflection (movement) of the fingers 640i, 640iii and the fingers 644i, 644ii towards the finger 640ii, thereby compressing the fingers 640, 644 into frictional engagement to secure (e.g., fix) the relative positions of the arms 404ii, 404iii. Conversely, loosening of the rotatable fastener 622ii alleviates the compressive force applied to the fingers 640, 644 to lessen the frictional engagement therebetween and allow for adjustment in the relative positions of the arms 404ii, 404iii (e.g., during movement between the collapsed (folded) configuration (FIGS. 22, 23) and the expanded (unfolded) configuration (FIG. 24).

In certain embodiments, it is envisioned that the end cap 628ii may be configured for rotation independently of the shaft 626ii to allow for further adjustment in the engagement between the fingers 640, 644. More specifically, in such embodiments, tightening the end cap 628ii via rotation in a first direction (e.g., clockwise) will result in additional linear movement of the end cap 628ii towards the knob 624ii, thereby increasing the compressive force applied to the fingers 640, 644, and loosening the end cap 628i via rotation in a second direction opposite to the first direction (e.g., counterclockwise) will result in linear movement of the end cap 628ii away from the knob 624ii, thereby alleviating the compressive force applied to the fingers 640, 644. To facilitate rotation of the end cap 628ii, it is envisioned that the end cap 628ii may be configured for manual engagement and/or for engagement with a tool (not shown), such as a screwdriver or the like.

In certain embodiments, such as that illustrated in FIGS. 22-24, for example, it is envisioned that the second arm 404ii and/or the third arm 404iii may include one or more corresponding indexing (alignment) members 650, 652 that are configured for engagement (contact) to inhibit (if not entirely prevent) relative lateral movement of the arms 404ii, 404iiii when the mounting system 600 is in the collapsed configuration (FIGS. 22, 23). For example, in the illustrated embodiment, the indexing member 650, 652 respectively include a protrusion 654 and a recess (indentation) 656 that is configured to receive the protrusion 654 such that, upon collapse of the mounting system 600, the protrusion 654 is received by the recess 656 to inhibit (if not entirely prevent) rattling or other such movement of the arms 404ii, 404iii along axes that are transverse in relation to the longitudinal axes Yii, Yiii (FIG. 5).

In certain embodiments, the second arm has a first end portion that is pivotably connected to the first arm such that the first arm and the second arm are relatively movable about a first pivot axis through a first range of angular motion, and the third arm is pivotably connected to a second end portion of the second arm that is opposite to the first end portion such that the second arm and the third arm are relatively movable about a second pivot axis through a second range of angular motion that is different than the first range of angular motion.

In certain embodiments, the first pivot axis and the second pivot axis extend in non-orthogonal (e.g., generally parallel) relation.

In certain embodiments, the corresponding planar surfaces on the second arm and the knuckle assembly extend in non-parallel relation to a longitudinal axis of the third arm when the mounting system in the unfolded configuration.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result, and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments. For example, it is envisioned that the particular configurations of the male and female components 412m, 412f (FIG. 4) may be altered in various embodiments of the disclosure (e.g., the ball-and-socket joint 414 may be replaced by corresponding mounts similar to the mounts 602, 604 (FIG. 22)).

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification, and represents embodiments of the present disclosure. Also, the phrases "at least one of A, B, and C" and "A and/or B and/or C" should each be interpreted to include only A, only B, only C, or any combination of A, B, and C.

What is claimed is:

1. A mounting system for an image capture device reconfigurable between a folded configuration and an unfolded configuration, the mounting system comprising:
    a first arm configured to support the image capture device;
    a first fastener configured to apply a compressive force to the first arm in order to secure the image capture device in relation to the mounting system;
    a second arm pivotably connected to the first arm such that the first arm and the second arm are relatively movable through a first range of angular motion;
    a second fastener connecting the first arm and the second arm, wherein the second fastener is configured to apply a compressive force to the first arm and the second arm and thereby fix the first arm and the second arm in relation to each other;
    a knuckle assembly pivotably connected to the second arm;
    a third arm connected to the knuckle assembly; and
    a third fastener extending through the second arm and the knuckle assembly such that the second arm and the third arm are relatively movable through a second range of angular motion that is less than the first range of angular motion,
    wherein the third fastener is configured to apply a compressive force to the second arm and the knuckle assembly and thereby fix the second arm and the third arm in relation to each other.

2. The mounting system of claim 1, wherein the first arm and the second arm include corresponding configurations facilitating nesting of the first arm and the second arm when the mounting system is in the folded configuration.

3. The mounting system of claim 1, wherein the first fastener, the second fastener, and the third fastener are each nonremovable from the mounting system.

4. The mounting system of claim 1, wherein the second fastener and the third fastener include identical configurations.

5. The mounting system of claim 1, wherein the second fastener and the third fastener are each configured for rotational adjustment.

6. The mounting system of claim 1, wherein the knuckle assembly defines a hard stop configured to limit the second range of angular motion.

7. The mounting system of claim 6, wherein the hard stop is configured to allow for approximately 180° of relative movement between the second arm and the third arm.

8. The mounting system of claim 6, wherein the hard stop is defined by an interface between corresponding planar surfaces on the second arm and the knuckle assembly.

9. The mounting system of claim 8, wherein the corresponding planar surfaces on the second arm and the knuckle assembly extend in non-parallel relation to a longitudinal axis of the third arm when the mounting system is in the unfolded configuration.

10. The mounting system of claim 1, wherein the third arm is reconfigurable between a closed configuration, in which the third arm defines a handle for the mounting system, and an open configuration, in which the third arm defines a stand for the mounting system.

11. The mounting system of claim 10, wherein the handle defines a generally D-shaped configuration.

12. The mounting system of claim 10, wherein the stand is configured as a tripod.

13. The mounting system of claim 12, wherein the tripod includes segments movable in relation to the knuckle assembly.

14. The mounting system of claim 13, wherein the segments each include reliefs defining internal webbing to reduce an overall weight of the third arm.

15. A mounting system for an image capture device reconfigurable between a folded configuration and an unfolded configuration, the mounting system comprising:
a first arm configured to support the image capture device;
a second arm having a first end portion pivotably connected to the first arm such that the first arm and the second arm are relatively movable about a first pivot axis through a first range of angular motion; and
a third arm pivotably connected to a second end portion of the second arm opposite to the first end portion such that the second arm and the third arm are relatively movable about a second pivot axis through a second range of angular motion different than the first range of angular motion, wherein the first pivot axis and the second pivot axis extend in non-orthogonal relation.

16. The mounting system of claim 15, wherein the second range of angular motion is less than the first range of angular motion.

17. The mounting system of claim 15, wherein the second range of angular motion is approximately 180°.

18. A mounting system for an image capture device reconfigurable between a folded configuration and an unfolded configuration, the mounting system comprising:
a first arm configured to support the image capture device;
a first fastener configured to apply a compressive force to the first arm to secure the image capture device in relation to the mounting system;
a second arm pivotably connected to the first arm;
a second fastener connecting the first arm and the second arm, the second fastener configured to apply a compressive force to the first arm and the second arm and thereby fix the first arm and the second arm in relation to each other;
a third arm pivotably connected to the second arm; and
a third fastener connecting the second arm and the third arm, the third fastener configured to apply a compressive force to the second arm and the third arm and thereby fix the second arm and the third arm in relation to each other, wherein the first fastener, the second fastener, and the third fastener are each nonremovable from the mounting system.

19. The mounting system of claim 18, wherein the first arm includes a connection assembly configured to releasably connect the image capture device to the mounting system, the connection assembly including:
a male component; and
a female component configured to removably receive the male component.

20. The mounting system of claim 19, wherein the male component includes a ball member, and the female component includes a socket configured to receive the ball member.

* * * * *